US008200527B1

(12) United States Patent
Thompson et al.

(10) Patent No.: US 8,200,527 B1
(45) Date of Patent: Jun. 12, 2012

(54) METHOD FOR PRIORITIZING AND PRESENTING RECOMMENDATIONS REGARDING ORGANIZAION'S CUSTOMER CARE CAPABILITIES

(75) Inventors: Cameron Thompson, Lafayette, CO (US); Ryan Pellet, Denver, CO (US); Devi Jaspal, Denver, CO (US)

(73) Assignee: Convergys CMG Utah, Inc., Salt Lake City, UT (US)

(*) Notice: Subject to any disclaimer, the term of this patent is extended or adjusted under 35 U.S.C. 154(b) by 1415 days.

(21) Appl. No.: 11/741,284

(22) Filed: Apr. 27, 2007

Related U.S. Application Data

(63) Continuation-in-part of application No. 11/740,077, filed on Apr. 25, 2007, now abandoned.

(51) Int. Cl.
*G06Q 30/00* (2012.01)
(52) U.S. Cl. ............ 705/7.39; 705/7.38; 705/7.41; 705/7.42
(58) Field of Classification Search ......... 705/7.38–7.42
See application file for complete search history.

(56) References Cited

U.S. PATENT DOCUMENTS

| | | | |
|---|---|---|---|
| 6,556,974 B1* | 4/2003 | D'Alessandro | 705/7.32 |
| 6,877,034 B1* | 4/2005 | Machin et al. | 709/223 |
| 7,113,956 B1* | 9/2006 | Elias et al. | 1/1 |
| 2003/0187675 A1* | 10/2003 | Hack et al. | 705/1 |
| 2004/0039631 A1* | 2/2004 | Crockett et al. | 705/11 |
| 2004/0138944 A1* | 7/2004 | Whitacre et al. | 705/11 |
| 2005/0154635 A1* | 7/2005 | Wright et al. | 705/11 |
| 2006/0010164 A1* | 1/2006 | Netz et al. | 707/104.1 |
| 2006/0206287 A1* | 9/2006 | Rosam et al. | 702/182 |
| 2006/0233121 A1* | 10/2006 | Cooper | 370/261 |
| 2009/0073171 A1* | 3/2009 | Straub et al. | 345/440 |

OTHER PUBLICATIONS

Liu, Ben Shaw-Ching, Sudharshan, D. and Hamer, Lawrence O. "After-service response in service quality assessment." The Journal of Services Marketing.Santa Barbara, CA:2000. vol. 14, Iss. 2; p. 160, Proquest.*
"Optimizing Call Center Productivity and Performance for Increased Profitability." PR Newswire. New York: Jun. 27, 2006.*
Miller, D. Glen and Mattick, Bonnie F."The effect of trainng on the bottom line."Performance Improvement, vol. 45, No. 5, May/Jun. 2006.*
"Balanced Scorecard Excellence Achieving Strategic Business Objective Alliance." PR Newswire, Chapel Hill, NC, Apr. 14, 2005.*
"Gartner Measurement; Customer Satisfaction." Gartner, 2005, http://web.archive.org/web/20051125111815/www.gartner.com/4_dec.*
Identification of Benchmarking Organizations.
Wireless Sales and Service, Accenture, http://www.accenture.com/Global/Services/By_Industry/Communications/Services/WirelessService.htm (visited Aug. 8, 2007).
Benchmark Portal Reality Check, BenchmarkPortal.com, http://www.benchmarkportal.com/newsite/managers/ccm_questionnaire_home.tml (visited Aug. 8, 2007).

(Continued)

*Primary Examiner* — Beth V Boswell
*Assistant Examiner* — Renae Feacher
(74) *Attorney, Agent, or Firm* — Frost Brown Todd LLC

(57) ABSTRACT

Enhancements to customer care capabilities can be prioritized and presented using a repeatable methodology which allows information to be collected, processed, and utilized in a uniform fashion across engagements. Such a methodology can be designed so as to be flexible enough for any customization which is required in particular circumstances. Various tools which can be used in such a methodology include computerized surveys, evaluation formulae, prioritization graphs, and weighing scales.

8 Claims, 22 Drawing Sheets

OTHER PUBLICATIONS

Data Center Health Checkup, N'compass Services, http://www.ncompass-inc.com/services/svc_5/svc_5.htm (visited Aug. 8, 2007).

Contact Center Health Check, Integ, http://www.callcentres.net/CALLCENTRES/LIVE/me.get?site.sectionshow&CALL249 (visited Aug. 8, 2007).

Contact Center Health Check, PrairieFyre, http://www.prairiefyre.com/Solutions/ProfessionalServices/ProServCCS.htm (visited Aug. 8, 2007).

Contact Center Health Check (PDF version), Omega-Performance, http://www.omega-performance.com/healthcheck/CCHC-10.06.pdf (visited Aug. 8, 2007).

Contact Center Health Check (web version), Omega-Performance, http://www.omega-performance.com/healthcheck/default.asp (visited Aug. 8, 2007).

Global Service Operations Excellence, COPC, http://www.copc.com (visited Aug. 14, 2007).

About the Ascent Group, Inc., The Ascent Group, http://www.ascentgroup.com/about.html (visited Aug. 14, 2007).

About QCi, QCi, http://www.cqi.co.uk/public_face/Subject.asp?Name=About%20QCi&Ref=1 (visited Aug. 14, 2007).

Best Practices, LLC: Benchmarking, Business to Business Research & Consulting, Best Practices, LLC, http://www3.best-in-class.com/bestp/domrep.nsf/pages/96DEB3761738BDE485257026006CD495!OpenDocument (visited Aug. 14, 2007).

The Hackett Group Difference, The Hackett Group, https://www.thehackettgroup.com/portal/images/advisory_menu/public_site/general/thg_difference.pdf (visited Aug. 23, 2007).

From Meaningless to Measurable in 90 Days, Dr. Jon Anton and Dru Phelps, http://benchmarkportal.com/newsite/pdf/AR18_Herbalife%20Success%20storyFINAL.pdf (visited Aug. 23, 2007).

Enhancing the Customer Experience Through Marketing Transformation, BearingPoint, http://www.teradata.com/library/pdf/BearningPoint_whitepaper.pdf (visited Aug. 23, 2007).

Creating Individual Context: A Framework for Effective Customer Data Integration, BearingPoint, http://www.bearingpoint.com/Documents/StaticFiles/c3185_fs_pov.pdf (visited Aug. 23, 2007).

The Next Generation of Customer Intelligence: Real-Time Value from On-Demand Decisioning, Patrick Hayes, http://www.bearingpoint.com/Documents/StaticFiles/c3611_cus_intel_study.pdf (visited Aug. 23, 2007).

Increasing Revenue Through Automated Demand Generation, Christopher Doran, http://www.crmproject.com/15751 (visited Aug. 23, 2007 login and selection required).

Customer Contact Transformation: An Accenture Perpective: Contact Center Agent Performance, Eva Buren and Steve Sion, http://www.accenture.com/Global/Services/By_Subject/Customer_Relationship_Mgmt/R_and_I/ContactAgentPerf.htm (visited Aug. 23, 2007).

Customer Contact Transformatoin: An Accenture Perspective: Call Monitoring and Quality Management, Courtenay Huff and John Krause, http://www.accenture.com/Global/Services/By_Subject/Customer_Relationship_Mgmt/R_and_I/FromInsight.htm (visited Aug. 23, 2007).

Customer Contact Transformation: An Accenture Perspective: Contact Center Metrics, Chris Kardys and Dave Engelson, http://www.accenture.com/Global/Services/By_Subject/Customer_Relationship_Mgmt/R_and_I/ContatCenterMetrics,htm (visited Aug. 23, 2007).

Functional Benchmark: Human Resources, The Hackett Group, http://www.thehackettgroup.com/portal/images/advisory_menu/public_site/programs/benchmarking/fb_hr.pdf (visited Aug. 23, 2007).

Functional Benchmark: Information Technology, The Hackett Group, https://www.thehackettgroup.com/portal/images/advisory_menu/public_site/programs/benchmarking/fb_it.pdf (visited Aug. 23, 2007).

Customer Relationship Management done right: CRM Implementation Roadmap, IBM, http://www-935.ibm.com/services/us/gbs/bus/pdf/g510-3932-customer-relationship-management-done-right-crm-implementation-roadmap.pdf (visited Aug. 23, 2007).

Customer Relationship Management done right: A pragmatic approach to getting the most from CRM-strategy through value realization, IBM, http://www-935.ibm.com/services/us/gbs/bus/pdf/g510-3933-customer-relationship-management-done-right.pdf (visited Aug. 23, 2007).

Customer Relationship Management Done Right: Sponsorship, governance and change management, IBM, http://www-935.ibm.com/services/us/gbs/bus/pdf/g510-3934-customer-relationship-management-done-right-sponsorship-governanace-and-change-management.pdf (visited Aug. 23, 2007).

Post Merger Integration Measurement, PriceWaterhouseCoopers, http://www.pwc.com/saratoga/saratoga_case_study_northropgrumman.pdf (Aug. 23, 2007).

Attracting and Retaining Talent in the Healthcare Industry, PriceWaterhouseCoopers, http://www.pwc.com/saratoga/saratoga_case_study_oakwood.pdf (Aug. 23, 2007).

Surveying and Building your CRM Future, Saj Usman and Saideep Raj, http://www.accenture.com/Global/Services/By_Subject/Customer_Relationship_Mgmt/R_and_I/SurveyingYourCRMFuture.htm (visited Aug. 23, 2007).

Changing our Focus from Cost to Customer, Jon Anton and Tom Hammond, http://www.benchmarkportal.com/newsite/pdf/AR12_ChangingFocus-041504.pdf (visited Aug. 23, 2007).

The 'Bird of Gold': The Rice of India's Consumer Market, Jonathan Ablett, Aadarsh Baijal, Eric Beinhocker, Aunupam Bose, Diana Farrell, Ulrich Gersch, Ezra Greenberg, Shishir Gupta and Sumit Gupta, http://www.mckinsey.com/mgi/publication/india_consumer_market/ (visited Aug. 23, 2007).

* cited by examiner

| Domain | Capability | Capability | | | Weight | | | | | | | |
|---|---|---|---|---|---|---|---|---|---|---|---|---|
| | | As Built | Ideal State | Plant Variance* | | Decrease Abandon Rate | Improve Schedule Effectiveness | Decrease Cost per Capita | Improve Data Accuracy | Improve Coding | Improve Charge Capture | |
| | | | | | | 5 | 2 | 2 | 4 | 4 | 3 | 4 |
| BP | Business Intelligence | 13 | 2 | 65 | | 5 | 5 | 5 | 5 | 5 | 5 | 5 |
| BP | Customer Driven Strategy | 13 | 2 | 65 | | 2 | 2 | 2 | 2 | 0 | 0 | 0 |
| BP | Customer Driven Processes | 6.5 | 2 | 33 | | 4 | 4 | 4 | 2 | 2 | 2 | 2 |
| BP | Customer Driven Products/Offers | 10 | 2 | 50 | | 4 | 4 | 4 | 4 | 4 | 4 | 4 |
| BP | Knowledge Management | 10 | 2 | 50 | | 4 | 4 | 4 | 0 | 0 | 0 | 0 |
| TM | Talent Alignment | 10 | 2 | 50 | | 5 | 5 | 5 | 5 | 5 | 5 | 5 |
| TM | Shared Vision | 10 | 2 | 50 | | 5 | 5 | 5 | 5 | 5 | 5 | 5 |
| TM | Leadership & Principles | 12 | 2 | 60 | | 5 | 5 | 5 | 5 | 5 | 5 | 5 |
| TM | Workforce Motivation | 14 | 2 | 70 | | 5 | 5 | 5 | 5 | 5 | 5 | 5 |
| TM | Partner Support | 10 | 2 | 50 | | 4 | 4 | 4 | 2 | 2 | 2 | 2 |
| CS | Automated Channel Delivery | 15 | 2 | 75 | | 3 | 3 | 3 | 5 | 5 | 5 | 2 |
| CS | Automated Knowledge Worker | 15 | 2 | 75 | | 0 | 0 | 0 | 0 | 0 | 0 | 0 |
| CS | Quality Management | 12 | 2 | 60 | | 4 | 4 | 4 | 5 | 5 | 5 | 5 |
| CS | Application | 15 | 2 | 75 | | 4 | 4 | 4 | 3 | 3 | 3 | 3 |
| CS | Technology Architecture | 19 | 2 | 95 | | | | | | | | |
| CS | Physical Environment | | | | | | | | | | | |

Figure 4b-1

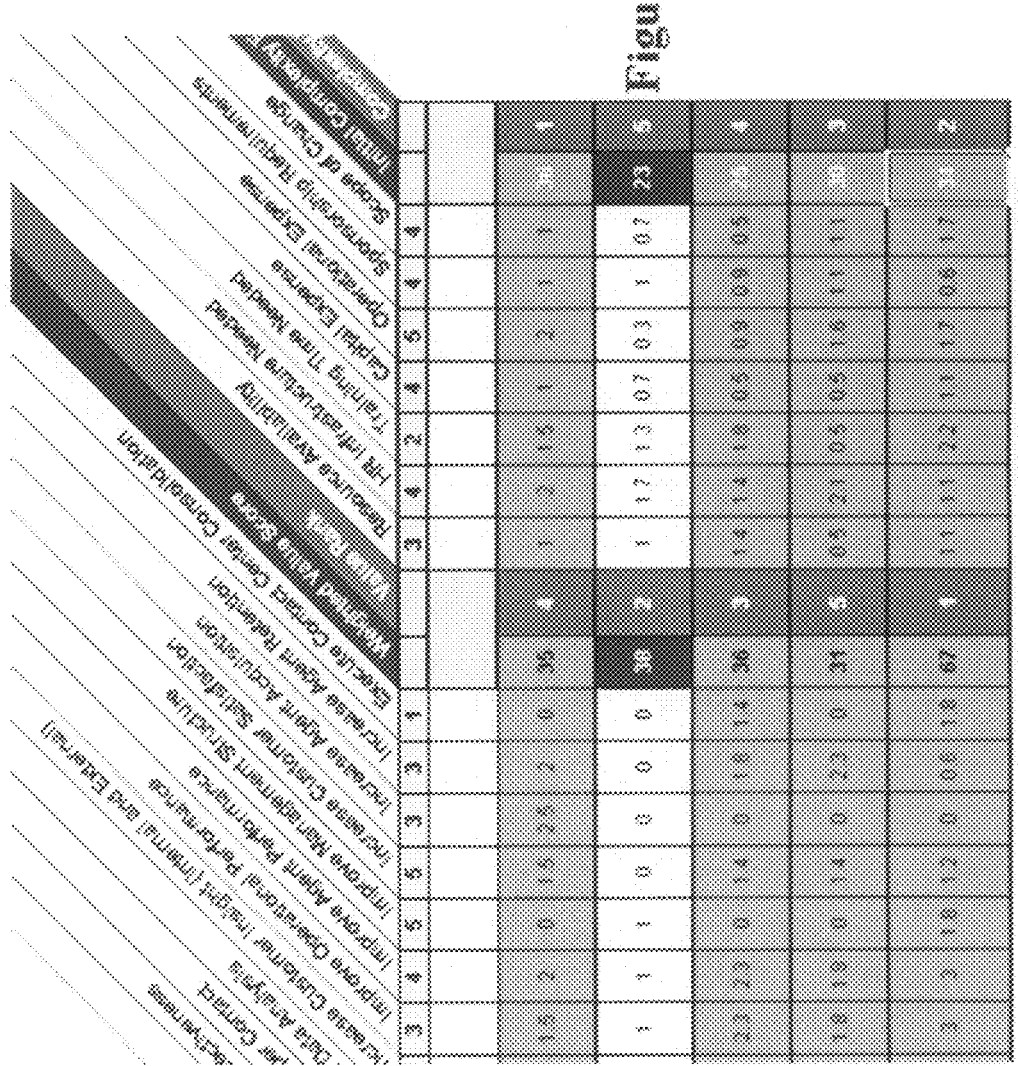

Figure 4d-1

| Capability Attribute | Attribute Capable to Rank Rank | Ideal Rank | Rank Variance | | Type | Gbl | Decrease Abandon Rate | Improve Scheduling Eff | Decrease Cost | Improve |
|---|---|---|---|---|---|---|---|---|---|---|
| Routing | | | 1.92 | | | 5 | 18 | 60 | 18 | 13 |
| Contact Handling | | | 1.99 | 1.46 | | 2 | | | | |
| Resolution Workflow Management | | | 1.92 | | | 4 | | | | |
| Voice | | | 0.67 | | | | | | | |
| Web Chat | | | 1.98 | 1.41 | | 2 | 12 | 0 | 0 | 0 |
| Email | | | 1.98 | | | | | | | |
| Live Agent | | | 1.98 | | | | | | | |
| Voice of the Customer Integration | | | 1.98 | | | | | | | |
| Survey Sampling Methodology | | | 1.97 | 1.65 | | 6 | 0 | 0 | 1 | 25 |
| Operational Change | | | 1.98 | | | | | | | |
| Voice of the Customer Reporting | | | 1.98 | | | | | | | |
| Data Integration and Linkage Analysis | | | 1.97 | | | | | | | |
| Adoption | | | 1.98 | | | | | | | |
| Quality Monitoring Process | | | 1.98 | 1.97 | | | 0 | 66 | 0 | 0 |
| Quality Feedback Process | | | 1.98 | | | | | | | |
| Quality Monitoring Metrics | | | 1.98 | | | | | | | |

METHOD FOR PRIORITIZING AND PRESENTING RECOMMENDATIONS REGARDING ORGANIZAION'S CUSTOMER CARE CAPABILITIES

This U.S. Continuation-In-Part patent application claims priority from U.S. Nonprovisional application Ser. No. 11/740,077, filed Apr. 25, 2007 now abandoned.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

This invention is in the field of customer care consulting and analysis.

BACKGROUND

The field of customer care consulting and analysis is one in which current practices are largely confined to engagement-specific, non-repeatable methodologies, with little or no automation in data collection or analysis. For example, current customer care consulting firms Omega and Benchmark Portal provide online survey tools, but those survey tools having, respectively, 15 and 13 questions, are unable to capture sufficient information for meaningful data analysis, and must be augmented by massive amounts of anecdotal and observational data which are specific to a particular client. It would be preferable to have a methodology which is both repeatable (i.e., can be used consistently across engagements) and susceptible to automation. Additionally, it would be beneficial if the methodology were capable of incorporating multiple types of data (e.g., both automatically collected data, and consultant derived data) so as to be flexible enough to adapt to a broad variety of circumstances. The disclosure set forth herein describes systems, methods and computer readable media which can be used to achieve beneficial results such as those described above, as well as to achieve other results which will be immediately apparent to those of ordinary skill in the art in view of the disclosure herein.

SUMMARY

Certain aspects of this disclosure could be implemented in a computer readable medium having stored thereon a plurality of questions, a plurality of exemplars, and a set of instructions operable to configure a computer. In such a computer readable medium, each question from the plurality of questions could be relevant to a customer care capability from a defined plurality of customer care capabilities. Further, the exemplars could be correlated with the plurality of questions such that, for each question from the plurality of questions, two or more exemplars from the plurality of exemplars could associate the question with a response format. Additionally, the set of instructions might be operable to configure the computer to determine a subset of questions from the plurality of questions for presentation to an individual. Such a subset of questions might comprise between 75 and 493 questions. Similarly, the set of instructions might be operable to configure the computer to obtain a set of response data from the individual to whom a subset of questions is presented. Such response data might correspond to one or more capabilities from the defined plurality of customer care capabilities. The response data might also be represented in the response format, and the response format might be a numeric format.

To understand the technology described in this disclosure, the phrase "computer readable medium" should be understood to include any object, substance, or combination of objects or substances, capable of storing data or instructions in a form in which they can be retrieved and/or processed by a device. A "computer readable medium" should not be limited to any particular type or organization, and should be understood to include distributed and decentralized systems however they are physically or logically disposed, as well as storage objects of systems which are located in a defined and/or circumscribed physical and/or logical space.

Similarly, the phrase "customer care capability" should be understood to refer to a competency related to one or more of an organization's customer care functions. Examples of "customer care capabilities" include business intelligence (i.e., using customer interaction data to determine the health and effectiveness of an enterprise through the eyes of the customer), talent alignment (i.e., optimizing the skills and agent profiles which align to customers based on value and/or customer segment requirements), and customer driven processes (i.e., using customer interaction data to improve business processes upstream and downstream from, as well as inside, the contact center).

Further, a "question" should be understood to refer to an expression of inquiry that invites or calls for a reply. When a question is described as "relevant" to a customer care capability, it should be understood that question is connected to, or associated with, the customer care capability. Additionally, the term "exemplar" should be understood to refer to a set of information or an object (e.g., a string of text, or a model), which is used to establish meaning or provide guidance. A "response format" should be understood to refer to a representation in which information provided as a consequence of some stimulus is expressed. To help tie these concepts together, the statement that "for each question, from a plurality of questions, two or more exemplars, from a plurality of exemplars, associate the question with a response format" should be understood to mean that, for each question, at least two exemplars are used to establish a meaning for the response format, or to provide guidance for how an answer to the question can be answered using the response format.

The term "subset" should be understood to refer to a first set, the first set consisting of one or more elements of a second set, which second set could possibly be coextensive with the first set. The verb "determine" (and various forms thereof) should be understood to refer to the act of generating, selecting or otherwise specifying something. For example, to obtain an output as the result of analysis would be an example of "determining" that output. As a second example, to choose a response from a list of possible responses would be a method of "determining" a response. The verb "present" (and various forms thereof) should be understood to refer to the act of showing, demonstrating, delivering, or the making available of something to a target audience or recipient. Thus, the act of "determining a subset of questions from a plurality of questions for presentation to an individual" should be understood to refer to the act of generating, selecting or otherwise specifying one or more questions which will be shown, delivered, or made available to a single human being.

By way of further explanation, the term "data" should be understood to refer to information which is represented in a form which is capable of being processed, stored and/or transmitted. The verb "obtain" (and various forms thereof) should be understood to refer to the act of receiving, or coming into possession of the thing "obtained." To "obtain a set of response data corresponding to one or more capabilities" should be understood to refer to the act of coming into possession or receiving information which is associated by having a relationship with the one or more capabilities. Similarly, the statement that data is "represented in a numeric format" should be understood to mean that the data is expressed in a format which comprises symbols used to designate the position of an object in a series (though it should be understood that additional modes of expression, e.g., a "don't know" value, could also be included in a numeric format to indicate no position on the series for the object). Finally, the statement that a computer readable medium has stored thereon "a set of instructions operable to configure a computer" should be understood to mean that the computer readable medium has stored thereon data which can be used to specify physical or logical operations which can be performed by a computer.

By way of additional explanation of potential implementations, one of ordinary skill in the art could, in light of this disclosure and without undue experimentation, create a computer readable medium having stored thereon a set of instructions which are operable, not only to configure a computer to determine a subset of questions for presentation to an individual, but are also operable to configure a computer to obtain a set of identifying information for the individual. For some such computer readable media, the step of determining a subset of questions for presentation to the individual could comprise comparing the set of identifying information for the individual with a subject matter expertise associated with the individual. Further, in some such implementations, the set of instructions might be further operable to obtain a set of context data from the individual. Such context data might comprise the number of years the individual has worked in an industry associated with the individual's employment.

For the purpose of clarity, certain terms used in the above description should be understood as imparting particular meanings relevant to the technology of this disclosure. For example, "identifying information" should be understood to refer to information which can be used to recognize or establish an entity as being a particular person or thing, while "subject matter expertise" should be understood to refer to particular skill or knowledge that an individual has regarding a particular topic, or domain of activity or endeavor. Thus, to tie these concepts together, an example of determining a subset of questions by comparing a set of identifying information with a subject matter expertise associated with an individual would be the act of looking up how a login or password entered by an individual (an example of identifying information) was correlated with knowledge or experience that individual supposedly possessed (subject matter expertise) and selecting questions for presentation to the individual which were designed to obtain knowledge within the individual's knowledge or experience. Additionally, the term "context data" should be understood to refer to a set of data which can be used to influence the meaning or interpretation given to other data. An example of "context data" is the number of years an individual has worked in an industry associated with his or her employment (e.g., if the individual is employed as a human resources manager in the customer service department of an organization, the number of years the individual has worked in an industry associated with his or her employment could be the number of years the individual has worked as an HR manager, or the number of years the individual has worked in customer service).

Further variations on the computer readable media described above could also be implemented by those of ordinary skill in the art without undue experimentation in light of this disclosure. For example, for a computer readable medium which has stored thereon a set of instructions operable to configure a computer to determine a subset of questions for presentation to an individual, the instructions might further be operable to configure a second computer to present the subset of questions to the user via a response interface, and/or to store a set of response data in a non-volatile memory located remotely from the second computer. Additionally, for some such computer readable media, the set of instructions might be configured to be operable even in situations in which the second computer is located remotely from the computer. Further, in some implementations in which a set of instructions is operable to store a set of response data in a non-volatile memory located remotely from a second computer, the set of instructions might be implemented so as to store the response data in the non-volatile memory when the non-volatile memory is located remotely from the computer as well.

For the purpose of clarity, certain terms used in the above description should be understood as having particular meanings in the technological context of this disclosure. For example, a "response interface" should be understood to refer to displays, tools, or channels by which an individual can provide a response to a question. Non-limiting examples of response interfaces which could be used to provide a response, which could be expressed in a numeric format, include, sliders, radio buttons, and input forms. Similarly, a "non-volatile memory" should be understood to be a computer readable medium which retains data stored thereon even in the event that an external power source is disconnected or unavailable. Non-limiting examples of "non-volatile memory" include magnetic hard disks, flash drives, and optical discs. For further illustration, the statement that a set of instructions is operable to configure a second computer to store a set of response data in non-volatile memory located "remotely" from a second computer should be understood to mean that the set of instructions is operable to configure the second computer to cause the set of response data to be preserved in a non-volatile memory which is located at some distance away from the second computer (e.g., by transmitting the set of response data across a data network to a central server which would store the data).

Of course, computer readable media which could be implemented according to this disclosure could vary in terms of organization, in addition to, or as an alternative to varying in terms of operability of instructions. For example, in some computer readable media which store a plurality of questions relevant to a plurality of customer care capabilities, the customer care capabilities might be organized into a plurality of domains. Further each capability from the plurality of customer care capabilities might comprise a plurality of attributes, and each of the questions might be associated with a single attribute of a single capability of a single domain. For the purpose of clarity, when used in this context, a "domain" should be understood to refer to a category of activities, resources, goals or values which can be used to combine different capabilities for study and analysis. Similarly, an "attribute" should be understood to refer to a particular aspect of a capability. For example, the capability of talent acquisition might comprise the attributes of recruiting channel management (establishing and maximizing recruitment channels to attract and retain the right person, at the lowest cost, in the least amount of time), candidate pipeline management (ensuring a steady stream of quality and qualified applicants for anticipated labor resource requirements), and interviewing and selection processes (formalizing the methodology and driving accountability that will result in the best candidates to be hired by the organization).

As an example of how the organization of capabilities into domains might be implemented in some computer readable media using that organization, the plurality of domains might comprise business process alignment (leveraging customer interactions to drive business strategy and processes), talent management (identifying, hiring, developing, retaining and scheduling the right resources in the right roles), customer interaction (interacting with customers through the most effective and cost efficient paths), and care infrastructure (employing and managing the technologies and resources necessary to deliver consistent world-class support). Those domains might comprise pluralities of capabilities. For example, the domain of business process alignment might comprise two or more of the capabilities of business intelligence, customer driven strategy (e.g., using customer interaction data and lifetime value to optimize marketing, sales and service strategies), customer driven processes, customer driven products and services (e.g., using customer interaction data to define products and services aligned to customer expectations and/or to shorten the product development lifecycle), and knowledge management (e.g., processes such as creating, collecting, and distributing enterprise knowledge, which could be used for purposes such as creating a self-learning enterprise). Similarly, the domain of talent management might comprise two or more of the capabilities of talent acquisition (e.g., using interaction metrics to define sales or customer service agent profiles and/or actively using such profiles to define a recruiting strategy), talent alignment, talent training (e.g., using customer interaction data to define resource skill gaps, modularizing training, and/or designing the most effective training delivery channel), talent rewards and retention (e.g., aligning incentives such as salary, benefits, rewards and recognition to customer, market, and resource requirements), and workforce management (e.g., the ability to balance customer experience with effective use of enterprise resources). The domain of customer interaction might then comprise two or more of the capabilities of channel management (e.g., balancing between customer experience and enterprise costs, for example, by leveraging alternative marketing, sales, and service channels), integrated sales management (e.g., using customer sales interaction data to define the processes, tools, skills, alignment, and rewards in a manner which encompass sales and management functions of an organization), billing delivery (e.g., the delivery of accurate, timely, and easy to understand service charges; and/or management of service to cash processes), service delivery (e.g., the tools and methodologies used for defining, performing and resolving customer interactions in an effective manner), automated channel delivery (e.g., the processes and policies used to optimize the balance between customer experience and enterprise costs, such as by containing transitions in low(er) cost/automated channels), customer experience intelligence (e.g., an organization's leveraging customer interaction data to align interaction operational practices and tools with customer satisfaction and loyalty), and quality management (e.g., the definition and establishment of practices in aligning interaction effectiveness drivers with individual agents' actions to improve program processes such as training and hiring). Finally, the last of the domains set forth above, care infrastructure, might comprise the capabilities of technology roadmapping (e.g., defining a technology strategy to drive return on investment on technology spend), application (e.g., defining an enterprise and customer facing tool set which could be used to drive profitability), technology architecture (e.g., defining the expansiveness, use, and integration of multiple integrated information assets), communication infrastructure (e.g., processes for managing telephony and network costs to balance service level agreements with overall customer service costs), security (e.g., defining an optimal balance between leveraging and protecting information assets), data management (e.g., the integrated collection, storage, use, and/or cleansing of customer data), physical environment (e.g., locating, securing, and managing the operational environment in a location where recruiting, retention, output efficiencies can occur), and systems integration (e.g., establishing clear project and program management goals and/or aligning technology consulting/strategy with on-time and on-budget delivery).

As an example of another computer readable medium which could be implemented by those of ordinary skill in the art in light of this disclosure, consider a computer readable medium having a data structure stored thereon. Such a data structure might comprise a first plurality of fields, with each field from the first plurality representing either a goal or a complexity lever, and a second plurality of fields, with each field from the second plurality representing a customer care capability. In such an implementation, each field which represents a goal might be associated with a goal weight, and each field representing a complexity lever might be associated with a complexity weight. Similarly, each field from the second plurality of fields might be associated with a worst case score for each field from the first plurality of fields.

For the purpose of clarity, certain terms used in the above description should be understood to have particular meanings in the technical context of this disclosure. For example, a "field" should be understood to refer to an element in a data structure which has a defined representation. For example, in a matrix data structure, the individual rows in that data structure would be fields which could be representative of individual units such as employees in an organization, or members in a social group. Additional examples which can be used to illustrate this concept are provided herein, though it should be understood that all such examples are intended to be illustrative, and not limiting on the scope of claims included in this application, or in future applications claiming the benefit of this application. Regarding the fields specifically described in the above paragraph, it should be understood that if a field represents a "goal" then the field represents some desired result or achievement for an organization. Similarly, if a field represents a "complexity lever", then it should be understood that the field represents something which must be overcome, a cost which must be incurred, or an investment which must be made to achieve a goal.

To further clarify the description of a data structure set forth above, it should be understood that fields can be associated with various values, such as goal weights and complexity weights. For the purpose of clarity, it should be understood that a "goal weight" refers to a measure of the significance attributed to a particular goal, while a "complexity weight" refers to a measure of the significance attributed to a particular complexity lever. Further, it should be understood that a field might be associated with more than one value. For example, the statement that each field from a second plurality of fields is associated with a worst case score for each field from a first plurality of fields should be understood to mean that each individual field from the second plurality of fields is associated with some number of worst case scores, and that the number of worst case scores is no less than the number of fields in the first plurality of fields. Additionally, the statement that each field from the second plurality of fields is associated with a worst case score for each field from the first plurality of fields could also be restated as each field from the first plurality of fields is associated with a worst case score for each field from the second plurality of fields. A concrete example of such a relationship between fields in a data structure would be a two dimensional matrix, wherein each row is associated with at least one value for each column in the matrix, and each column in the matrix is associated with at least one value for each row in the matrix. Of course, this example is not intended to imply that all such multiple values associated with a field must be simultaneously associated with a second field in a data structure. For example, in some implementations, fields representing customer care capabilities might be associated with attributes, which might not themselves be associated with fields from any other plurality of fields. For additional clarification, further examples are provided herein. It should be understood that all such examples are intended to be illustrative only, and not limiting on the scope of claims included in this application, or claims which are included in future applications claiming the benefit of this application.

As an additional example of the types of data structures which could be implemented on computer readable media based on the teachings of this disclosure, it should be understood that in some data structures comprising a plurality of fields which, like the second plurality of fields described above, represents customer care capabilities, each field from that plurality of fields might be associated with a capability score and a capability rank variance. Further, in an implementation including data structures having such a plurality of fields, the fields from that plurality of fields might further be associated with an overall impact score and an overall complexity score.

In implementations comprising a computer readable medium which has a data structure comprising a first plurality of fields representing goals and complexity levers, and which has a second plurality of fields representing customer care capabilities and associated with overall complexity and impact scores stored thereon, there might be a variety of sets of data and techniques used as a basis for the overall complexity and impact scores. For example, in some implementations, an overall impact score associated with a field from the second plurality of fields might be based on a set of data comprising goal weights associated with the fields from the first plurality of fields which represent goals; worst case scores associated with the fields from the first plurality of fields which represent goals and further associated with the field from the second plurality of fields associated with the overall impact score; and the capability rank variance associated with the field from the second plurality of fields associated with the overall impact score. Similarly, the overall complexity score associated with a field from the second plurality of fields might be based on a set of data comprising: complexity weights associated with the fields from the first plurality of fields which represent complexity levers; the worst case scores associated with the fields from the first plurality of fields which represent complexity levers and with the field from the second plurality of fields associated with the overall complexity score; and the capability rank variance associated with the field from the second plurality of fields associated with the overall complexity score.

It should further be understood that computer readable media having data structures stored thereon could also store other information. For example, a computer readable medium having stored thereon a data structure such as described above might also have stored thereon a set of instructions operable to calculate a plurality of realistic scores for the fields from the second plurality of fields in the data structure. Each of those realistic scores might themselves be associated with a field from the first plurality of fields from the data structure.

Such a set of instructions might be integrated into the data structure (as would be the case in, for example, a spreadsheet having embedded formulae for calculating one or more cell values) or could be stored externally to the data structure. Thus, the recitation of a computer readable medium having stored thereon both a data structure and a set of instructions should not be taken as limiting on the scope of claims included in this application or other applications claiming the benefit of this application, or on potential relationships between data structures and instruction sets which might be implemented based on this application by those of ordinary skill in the art.

As a further example of potential implementations of this disclosure, it should be understood that portions of this disclosure could be used to create a computer readable medium having stored thereon a set of computer executable instructions for calculating an overall impact score for an enhancement to a customer care capability of an organization based on the following formula:

$$O = \sum_{i=1}^{n} (W_i * I_i * (C_{var} * (S_{max} / (S_{max} - S_{min})) / I_{range}))$$

In that formula, O is the overall impact score, n is the number of goals in a plurality of goals relevant to the organization, $W_i$ is a goal weight for the $i^{th}$ goal in the plurality of goals, $I_i$ is a worst case score for the $i^{th}$ goal in the plurality of goals, $C_{var}$ stands for a capability rank variance for the customer care capability, $S_{max}$ stands for the maximum value on a scale used to measure a capability score for the customer care capability, $S_{min}$ stands for the minimum value on the scale used to measure the capability score for the customer care capability, and $I_{range}$ stands for the maximum value of a range used to express the worst case score $I_i$.

Of course, it should be understood that potential implementations of this application are not limited to computer readable media, whether having a data structure stored thereon or otherwise. As an example of an alternative type of implementation, it should be understood that a variety of methods could be practiced by those of ordinary skill in the art without undue experimentation in light of the teachings set forth herein. Such methods might include a variety of data or information gathering steps, such as collecting a set of data from one or more executives of an organization and/or obtaining a set of information by requesting that each individual from a plurality of identified subject matter experts complete a survey. In a method including such steps, the set of data collected from one or more executives might comprise a plurality of goals and complexity levers, while the survey completed by the subject matter experts might comprise a plurality of questions corresponding to one or more customer care capabilities from a plurality of customer care capabilities.

For the sake of clarity, certain terms used in the description above should be understood as having certain meanings in the technical context of this application. An "executive" should be understood as a person having authority for making strategic decisions in the context of an organization. "Collecting" a set of data from such people should be understood as bringing together, or gathering (potentially by eliciting) information from the executives. The verb "requesting" in the context of "obtaining a set of information by requesting" should be understood to refer to the act of asking, commanding or instructing that some act or group of acts take place which will result in the set of information being obtained. Similarly, to clarify the phrase "individual from a plurality of identified subject matter experts," the term "identified subject matter expert" should be understood to refer to someone who has been determined to have a particular subject matter expertise. When such an individual is asked to "complete a survey comprising a plurality of questions," it should be understood to mean that the subject matter expert is being asked to consider and answer to the best of his or her ability each question on the survey which is presented to him or her. It should be kept in mind that the subject matter expert might not be able to answer meaningfully each question, and that a survey in which some questions have been left unanswered for example, by making a "don't know" option or leaving a question blank could still be considered completed. The statement that the questions on such a survey "correspond to one or more customer capabilities from a plurality of customer care capabilities," should be understood to mean that the questions on the survey are associated with the specific capabilities from the plurality of capabilities to which they are identified as "corresponding."

Further refinements on methods which include data gathering and information collection steps such as set forth above could also be implemented according to the teachings of this application. For example, in some implementations in which a set of data is gathered from one or more executives of an organization, the set of data might comprise a goal list and a complexity lever list. Such a goal list could comprise a relative goal rank for each goal from the plurality of goals in the set of data gathered from the one or more executives, while the complexity lever list could comprise a relative complexity rank for each complexity lever from the plurality of complexity levers in the set of data gathered from the one or more executives. Similarly, a further refinement of a method which includes a step of obtaining a set of information could be to obtain a second set of information. Such an act could be achieved by performing one or more additional steps comprising requesting anecdotal data regarding the organization's customer care capabilities. As a further refinement which might take place in a method which comprises a step of obtaining a set of data by requesting that subject matter experts complete surveys comprising a plurality of questions corresponding to one or more customer care capabilities from a plurality of customer care capabilities, in some such methods there might be a step performed of defining the plurality of customer care capabilities by determining, from a list of potential customer care capabilities, two or more customer care capabilities which are relevant to the organization which employs the subject matter experts. Of course, it should be understood that the refinements described above, as well as additional refinements which are discussed herein, are intended to be illustrative only, and not limiting on the scope of claims included in this application, or which are included in future applications claiming the benefit of this application.

For the purpose of clarity, certain terms used above in describing the refinements should be understood as having particular meanings in the technical context of this application. For example, the term "list," as used in the context of a "goal list" or a "complexity lever list" should be understood to refer to an enumerated group of elements (e.g., goals, or complexity levers) having a definite and knowable membership (though such membership might be modified by adding elements to, or removing elements from, the list) which is expressed in a human perceptible form (e.g., written as words on a piece of paper). Similarly, a "relative rank" should be understood to refer to a position or standing on some scale in comparison to other entities also represented on that scale.

Additionally, data referred to as "anecdotal" data should be understood to be data which is based on personal observations, case study reports, or accounts of particular events, incidents or experiences.

Of course, it should further be understood that methods which could be implemented in light of the teachings of this application are not limited to data gathering or information collection steps such as described above. For example, some methods which could be implemented based on the teachings of this application might include, either in addition to, or as an alternative to, one or more of the steps described previously, steps such as: determining a goal weight for each goal from a plurality of goals; determining a complexity weight for each complexity lever from a plurality of complexity levers; and deriving a plurality of scores for each of the capabilities from a plurality of customer care capabilities. Additionally, determining or deriving steps might be linked with the data gathering and information collection steps as described previously. For example, in methods where a set of information is collected by requesting that subject matter experts complete surveys, the plurality of scores derived for each capability might comprise a plurality of realistic scores based on that set of information. Similarly, in some implementations in which a plurality of scores are derived for each capability from a plurality of customer care capabilities, that derivation might comprise utilizing a database to determine a plurality of worst case scores for each of the capabilities from the plurality of customer care capabilities. Further, some such methods might comprise the additional step of updating the database based on worst case scores for each capability from the plurality of customer care capabilities.

As has heretofore been the case, certain terms used in the description above should be understood as having particular meanings in the technical context of this application. For example, the verb "derive" (and various forms thereof) should be understood to refer to an act of determining something from one or more inputs. The term "score" should be understood to refer to a symbol, appellation, or sign used as a measurement. Similarly, the term "database" should be understood to refer to a collection data having a definite and knowable scope. It should be understood, of course, that the scope of a database, while knowable, is potentially not fixed, as a "database" can be "updated," where "updating" refers to the act of making a modification.

Continuing with the description of various methods which could be implemented by those of ordinary skill in the art in light of the teachings of this application, in some instances, a method implemented according to the teachings of this application might comprise, either in addition to, or in alternative to, one or more of the steps described above, the steps of prioritizing an enhancement for each customer care capability from a plurality of customer care capabilities; and presenting a set of results based at least in part on that prioritization of enhancements. Further, in some situations the prioritization might be based on a set of factors comprising: goal weights for a plurality of goals; complexity weights for a plurality of complexity levers; and a plurality of realistic scores derived for the capability for which the enhancement is being prioritized.

For the sake of clarity, certain terms used in the description above should be understood as having particular meanings in the technical context of this application. For example, the term "enhancement," in the context of an "enhancement" for "a customer care capability" should be understood to refer to an upgrade, improvement, or policy designed to make the particular customer care capability better in some way. It should be understood that, while an "enhancement" could refer to a specific proposal (e.g., purchase a particular software package to enhance the capability of technology roadmapping), an "enhancement" could also refer to a more generalized initiative to improve a capability (e.g., a decision to invest additional resources to determine the most effective way that a capability could be changed for the better). For additional clarification, the verb "prioritize" (and various forms thereof) should be understood to refer to the act of assigning something a place in a scale. To say that a prioritization is "based on a set of factors" should be understood to mean that the assignment of the thing being prioritized is founded on the set of elements information or data referred to as "factors." Additionally, the statement that "a set of results is based at least in part on a prioritization" should be understood to mean that some aspect of a group of one or more conclusions is founded on the prioritization.

Of course, the methods described above are not intended to be, and should not be treated as, exhaustive on the potential methods which could implemented by those of ordinary skill in the art in light of this disclosure. For example, in some methods where both a first set of information, and a second set of information are obtained, and results are presented based on a prioritization of enhancements to customer care capabilities, the presenting of the results might comprise presenting the prioritization of the enhancements to the customer care capabilities, and identifying one or more discrepancies between the first and second sets of information. Additionally, in some such methods, presenting the set of results might also comprise presenting a display depicting an organization's practices in the plurality of customer care capabilities relative to industry standard practices.

For the purpose of understanding the description set forth above, certain terms used therein should be treated as having particular meanings in the technical context of this application. For example, a "discrepancy" should be understood to refer to a divergence, disagreement, or inconsistency between two things. Similarly, the term "display" in the context of the phrase "presenting a display" should be understood to refer to a visual representation of data, for example, in the form of a chart, a list, a slide, a graph, or some other manner which can be visually perceived. When a "display" is described as "depicting an organization's practices," it should be understood that the "display" presents data which is derived from, and representative of, the practices of the organization. It should further be understood that, while the display might present the practices themselves, it could also present data which does not necessarily directly convey the practices (e.g., the display might present numeric scores representing a measurement of the practices of the organization on some scale). The statement that the display depicts the practices relative to "industry standard practices" should be understood to mean that the display presents a representation of the practices which is in comparison (e.g., by placing two measurements on a scale) with practices which are the most usual or common in the industry.

Other variations, implementations, and uses can be practiced by those of ordinary skill in the art in light of the disclosure of this application without undue experimentation. For example, while the above descriptions focused on various methods and computer readable media which could be implemented based on the teachings of this application, this application also enables the implementation of additional and alternative methods and computer readable media, as well as systems, apparatuses and other implementations which may be appropriate to particular circumstances. Thus, it should be understood that the descriptions set forth above, as well as the remainder of the material set forth herein is intended to be illustrative only, and not limiting.

BRIEF DESCRIPTION OF THE DRAWINGS

FIG. 3a-1 depicts a capability selection screen which could be used in a computerized survey tool.

FIG. 3c-1 depicts a capability selection screen which could be used in a computerized survey tool.

FIG. 3d depicts a data entry screen which could be used in a computerized survey tool.

Figure 4E-1:
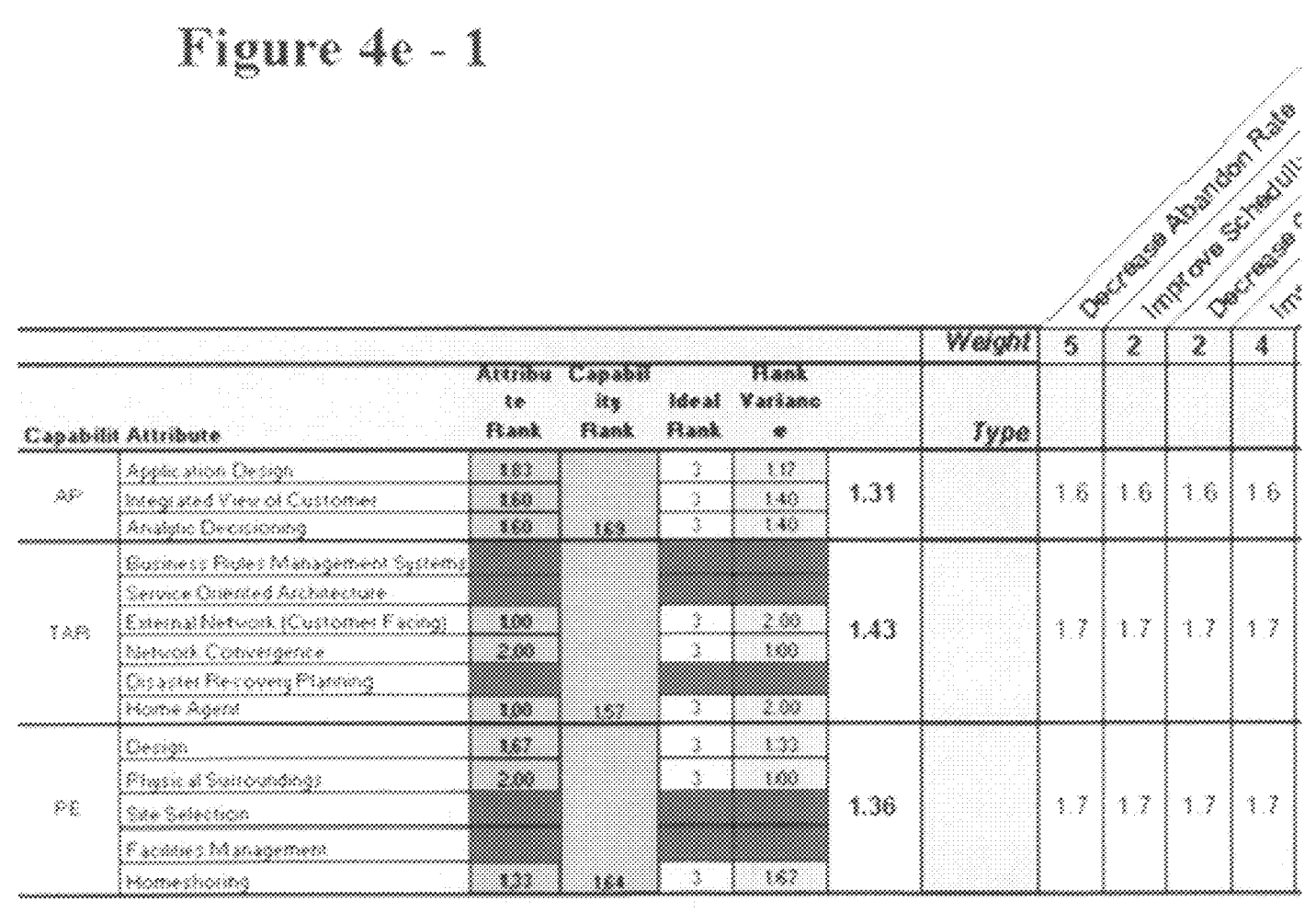

FIGS. 4a-1 to 4e-2 depict spreadsheets which could be used in the prioritization of capability enhancements.

DETAILED DESCRIPTION

This disclosure sets forth various techniques which can be used in the prioritization and presentation of enhancements to the customer care capabilities of an organization. For the sake of clarity, this disclosure is organized around an illustrative process, depicted in FIG. 1, for prioritizing and presenting enhancements to an organization's customer care capabilities. However, while the discussion is structured according to the process of FIG. 1, it should be understood that those of ordinary skill in the art will be able to practice the teachings of this disclosure in manners which diverge from the process set forth in FIG. 1 without undue experimentation. Therefore, the discussion herein should be understood as being illustrative only, and not limiting on the scope of claims which are set forth in this application, or which are included in future applications which claim the benefit of this application.

Figure 1:
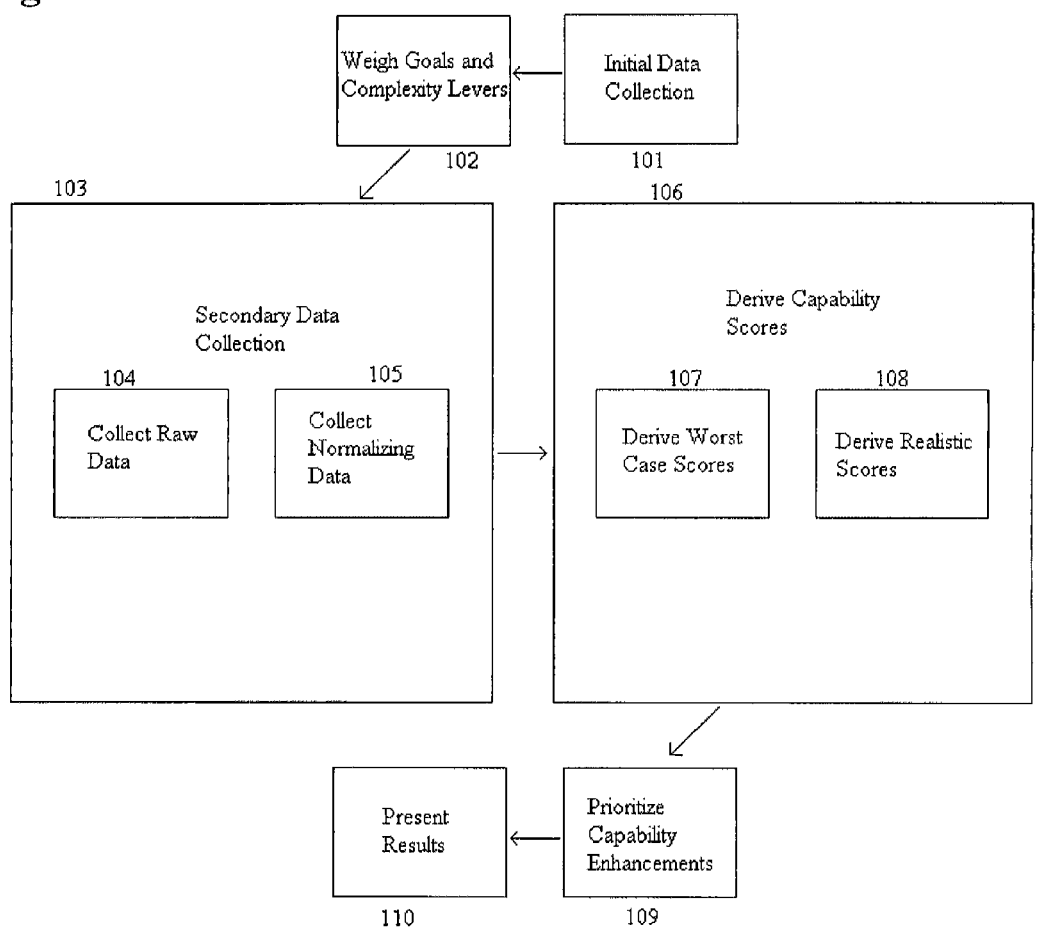
FIG. 1 depicts a sequence of events which might take place in the process of prioritizing and presenting recommendations regarding an organization's customer care capabilities.

In the illustrative process depicted in FIG. 1, prioritizing and presenting enhancements to an organization's customer care capabilities starts with an initial data collection step [101]. As shown in FIG. 1, this initial data collection [101] is used to obtain information which will be used to contextualize and evaluate information for the purpose of prioritizing and presenting capability enhancements. It should be understood that, while the diagram of FIG. 1 depicts the initial data collection [101] as a unitary step, there may be a broad variety of techniques which could be used in the initial data collection [101]. For example, in a scenario in which a consultant uses the process depicted in FIG. 1 for evaluating an organization's customer care capabilities, the initial data collection [101] could be comprised of an interview with executives of the organization which is being evaluated, during which the consultant could ask questions designed to elicit information regarding goals and complexity levers for the organization.

Depending on factors such as the expertise of the executives participating in the interview, the expertise of the consultant, and any constraints on the organization's interaction with the consultant, some techniques for eliciting information might be more appropriate than others. For example, in a scenario in which a consultant seeks to minimize the time expended in the initial data collection [101], he or she might simply ask the executives to identify goals and complexity levers for the organization, and then ask the executives to rank those goals and complexity levers in terms of their importance to the organization. Alternatively, in a scenario in which executives might not be able or willing to simply identify goals and complexity levers, the consultant might enter into a discussion with the executives during which information regarding goals and complexity levers could be identified. For example, the consultant might seek to elicit useful information by asking questions in terms which the executives are likely to understand and relate to, such as financial impacts (e.g., how are the executives planning on increasing revenue? What are the largest recurring costs for designing new products? What is the average cost of training new call center agents? Etc.). Similarly, the consultant might break down different types of goals the organization might have in order to make it easier for the executives to identify goals (e.g., what are the overall goals of the organization? What are the executives' operational goals from a customer services perspective? What are the executives' goals for the specific interaction with the consultant? Etc.). Of course, mixed strategies are also possible. For example, instead of simply asking executives to identify and rank goals and complexity levers, a consultant might ask the executives to identify and rank goals and complexity levers, but also explain how the rankings will be used in prioritizing capability enhancements for the organization. A consultant might also provide the executives with exemplary goals and complexity levers, either as a form of pump priming (i.e., with the intent of stimulating the executives to think in terms of goals and complexity levers) or as a worksheet (i.e., the consultant would provide a list of goals and complexity levers, and the executives would rank the provided goals and complexity levers according to their importance to the organization, or indicate that a particular goal or complexity lever is not applicable).

Of course, it should be understood that, while the discussion of the initial data collection [101] described various techniques which could be used by a consultant in an interview with an organization's executives, the initial data collection [101] is not limited to consultant based techniques. For example, in a scenario in which it is not feasible for a consultant to interview executives (e.g., the executives might be widely dispersed, or the organization might be a small organization which seeks to minimize costs as much as possible) the initial data collection [101] might take place through the use of surveys, which list potential goals and complexity levers and request that the survey participants (e.g., executives) rank the goals and complexity levers. Exemplary goals and complexity levers which could be used in such a survey are set forth below in tables 1 and 2.

TABLE 1

Exemplary Goals
Goals

Decrease Abandon Rate
Improve Scheduling Effectiveness
Decrease Cost Per Contact
Improve Data Analysis TABLE 1-continued Exemplary Goals
Goals Increase Customer Insight (Internal)
Increase Customer Insight (External)
Improve Operational Performance
Improve Agent Performance
Improve Management Structure
Increase Customer Satisfaction
Increase Agent Retention
Execute Contact Center Consolidation

TABLE 2

Exemplary Complexity Levers
Complexity Levers

Resource Availability
HR Infrastructure Needed
Training Time Needed
Capital Expense
Operational Requirements
Sponsorship Requirements
Scope of Change Of course, it should be understood that tables above are intended to be illustrative only of goals and complexity levers which could be used in the context of this disclosure, and is not intended to be limiting on the scope of any claims included in this application, or which are included in future applications claiming the benefit of this application.

Combined approaches could be used as well. For example, an organization might initially distribute surveys, and include in the surveys an option for the participants to indicate if they felt that there were goals and/or complexity levers for their organization which were not included in the survey. If the participants indicated that there were goals and complexity levers which were not included in the survey, or they expressed dissatisfaction with the survey in some other regard, a consultant might be dispatched to augment the surveys with interviews or other data collection techniques. As a second example of a combined technique, a consultant could initially interview executives to identify goals and complexity levers, then use the identified goals and complexity levers to build a databank from which later surveys could be drawn. Other techniques, and variations and combinations of the techniques described could also be practiced by one of ordinary skill in the art without undue experimentation in light of this disclosure.

Referring back to FIG. 1, after the initial data collection [101], the goals and complexity levers are weighed [102]. The weighing of goals and complexity levers [102] refers to the process of assigning values to the goals and complexity levers which can be used for later calculation and data analysis. As with the initial data collection [101], the weighing of goals and complexity levers [102] can proceed according to a variety of techniques. For example, in an implementation in which the initial data collection [101] yields a list of goals and complexity levers in rank order, weighing goals and complexity levers [102] can be accomplished by assigning the goals and complexity levers weights on a predetermined scale with the weights following a selected statistical distribution. An example of such statistical weighing is set forth in table 3, where 12 goals are assigned weights on a scale of 1 to 5 reflecting an approximately normal distribution.

TABLE 3

Normal Goal Weighing

| Goal | Value |
| --- | --- |
| Goal 1 | 5 |
| Goal 2 | 4 |
| Goal 3 | 4 |
| Goal 4 | 4 |
| Goal 5 | 3 |
| Goal 6 | 3 |
| Goal 7 | 3 |
| Goal 8 | 3 |
| Goal 9 | 2 |
| Goal 10 | 2 |
| Goal 11 | 2 |
| Goal 12 | 1 |

Of course, it should be understood that assigning weights according to a normal distribution is not the only technique which can be used in weighing goals and complexity levers [102]. For example, other statistical distributions, such as skewed normal distributions, student t distributions, Poisson distributions, or other distributions as might be appropriate for a given implementation or scenario can also be used. Further, the step of weighing goals and complexity levers [102] might not use a statistical distribution at all. For example, in a case where the initial data collection [101] comprises a consultant interviewing executives to identify goals and complexity levers, the weights might be assigned by the consultant based on information gathered during the interview (e.g., goals the executives explicitly state are of paramount priority could be given a high score, while goals the executives explicitly state are of secondary importance might be given low scores). It is also possible that the weighing of goals and complexity levers [102] could use a combined technique. For example, weights could be tentatively assigned according to a statistical distribution (e.g., a normal distribution, as shown in table 1), and then the tentative weights could be adjusted by a consultant based on information gathered during the initial data collection [101]. Alternatively, a consultant could initially assign weights to the goals and complexity levers, then evaluate the assignment of weights against a statistical distribution (e.g., evaluation against a normal distribution to ensure that there are not an excessive number of high and/or low weights assigned). Variations on and from the above described techniques are also possible. Thus, it should be understood that the techniques described herein are intended to be illustrative only, and not limiting on the scope of claims included in this application, or other claims which claim the benefit of this application.

Additionally, it should be understood that, while the illustrative process of FIG. 1 depicts the initial data collection [101] and the weighing of goals and complexity levers [102] as separate steps, that separation is depicted for the sake of illustration only, and should not be treated as limiting. It is contemplated that, in light of this disclosure, one of ordinary skill in the art could, without undue experimentation, practice a method which combines the initial data collection [101] and the weighing of goals and complexity levers [102]. This combination could be made, for example, by modifying an initial data collection [101] performed by a consultant interviewing executives such that, instead of the executives providing a list of goals and complexity levers in rank order, the executives themselves would provide a weighted list of goals and complexity levers. This list could then be modified by the consultant (e.g., in a case where the executives provide weights which are in conflict with past weights provided by similar organizations, the consultant might modify the weights before using them for calculation), or it could be used in its unmodified form for prioritizing and presenting capability enhancements. Similarly, the surveys described above could be modified so that the executives would provide goals and complexity levers with weights, as opposed to in order. Thus, it should be remembered that the process of FIG. 1, in addition to the sub-steps depicted in that process, is intended to be illustrative only, and not limiting.

Returning to FIG. 1, after weighing the goals and complexity levers [102], the process shown in that figure continues with a secondary data collection [103]. As shown in FIG. 1, the secondary data collection [103] is comprised of two sub-steps, collecting raw data [104], and collecting normalized data [105]. For the purpose of clarity, the sub-steps of collecting raw data [104] and collecting normalizing data [105] will be discussed below separately. However, it should be understood that the inventors contemplate that prioritization and presentation of capability enhancements can be made without subdividing the secondary data collection [103] into distinct sub-steps as shown in FIG. 1. Thus, the discussion of the secondary data collection [103] should be understood as illustrative only of a technique which can be used in the process of prioritizing and presenting capability enhancements, and should not be understood as limiting on the scope of claims included in this application, or on the scope of claims included in other applications claiming the benefit of this application.

First, the sub-step of collecting raw data [104] as shown in FIG. 1 refers to the process of collecting data which will subsequently be used to prioritize capability enhancements. Various techniques can be employed to collect the raw data [104]. For example, raw data can be collected using surveys distributed to individuals identified as being knowledgeable in specific capability areas. The individuals to whom the surveys are given could be identified in a number of manners. For example, they might have been identified as part of the initial data collection [101], or they might have been identified according to their job title (e.g., the head of a particular department might be presumed to be an expert in subject matter relevant to that department). Alternatively, the surveys might be distributed to groups of employees of the organization, or to randomly selected employees fitting defined profiles, or using various other techniques which might be appropriate in a given scenario. Additional variations are also possible. For example, where the step of collecting raw data [104] is performed by distributing surveys, the surveys might be distributed through a variety of techniques, such as paper survey distribution, email survey distribution, distribution of survey applications to employee computers, and creation of a browser based survey tool which allows users to take surveys remotely. For purposes of illustration, an exemplary computerized survey technique is described below.

Figure 2:
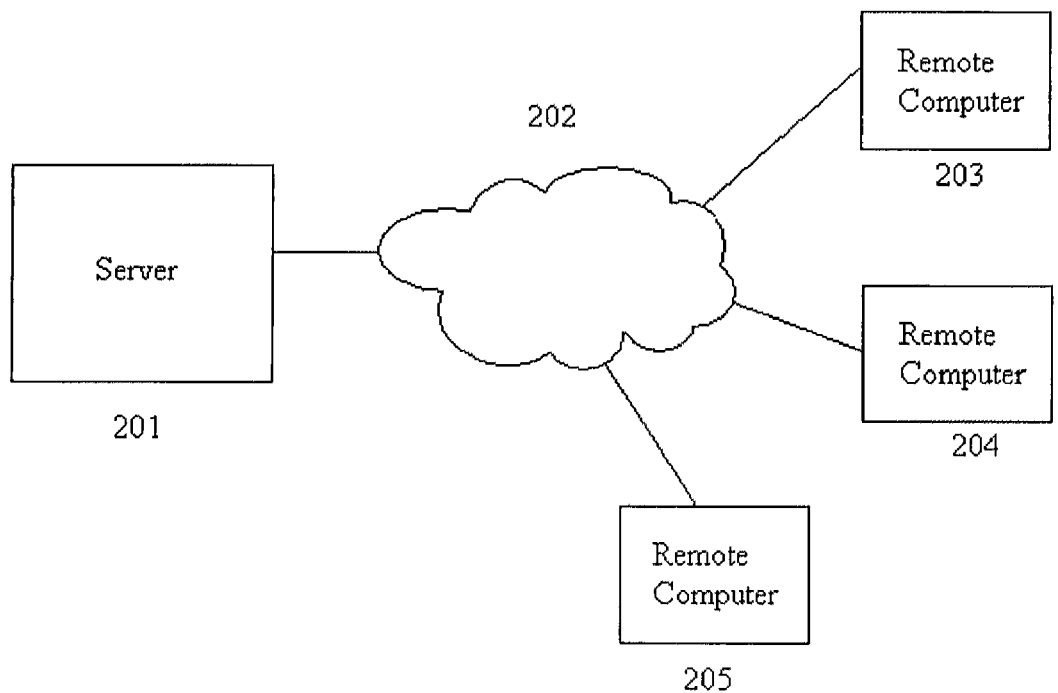
FIG. 2 depicts a system which could be used in gathering raw data through computerized surveys.

For the purpose of this example, assume that the individuals who will be taking the surveys are subject matter experts (SMEs) who were identified as such during an initial data collection [101]. Assume further that the physical system which will be used to distribute the surveys utilizes the architecture as shown in FIG. 2, in which a server [201] is connected to a plurality of remote computers [203][204][205] through a network [202]. In a system such as shown in FIG. 2, the surveys could be provided based on software stored at the server [201] which configures the server [201] to provide survey questions to a remote computer (e.g., [203]) when an authorized user logs onto the server [201] using the remote computer (e.g., [203]). The SMEs can be identified as authorized individuals using a variety of techniques. For example, the SMEs could be issued unique login IDs and/or passwords which the server [201] can use for identification. Another technique which could be used to ensure that the SMEs are recognized as authorized individuals would be to assign specific computers (e.g., remote computers [203][204][205]) to specific SMEs, so that when a computer attempts to log into the server, it will be assumed that the user of that computer is the appropriate SME. Yet another technique which could be used to ensure that the SMEs are recognized as authorized individuals is to issue each SME a physical token (e.g., a dongle) which the SME would connect to a computer used to access the server [201] that would identify the SME as an authorized individual. Of course, such techniques are provided only for the purpose of illustration, and are not intended to be limiting on the scope of claims included in this application, or which are included in other applications which claim the benefit of this application.

Figure 3A:
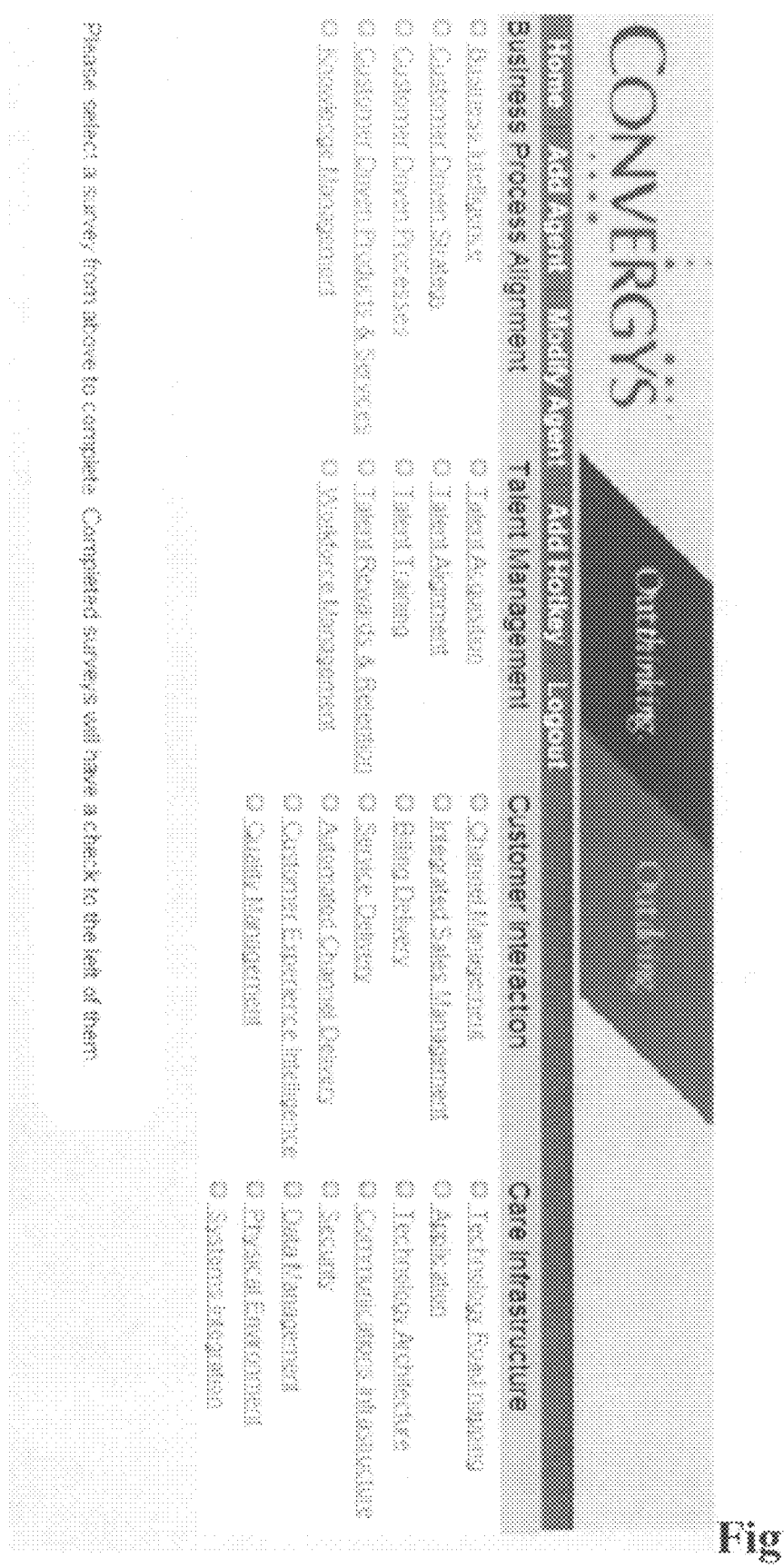
FIG. 3a depicts a capability selection screen which could be used in a computerized survey tool.
Figures 1, 3A:
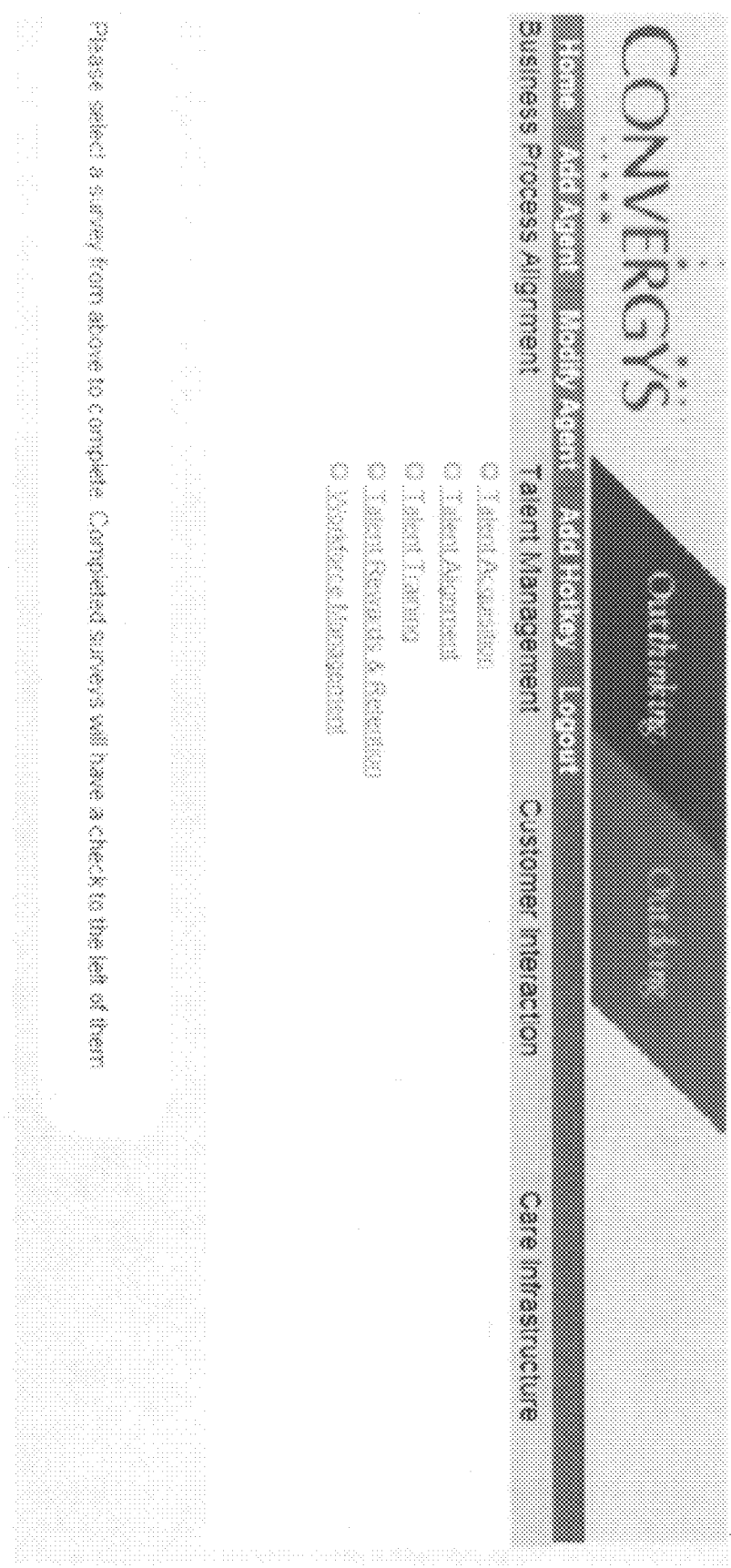

Continuing with the discussion of a computerized survey tool, once an SME has used a remote computer [203][204][205] to log into the server [201], the server [201] would provide the SME with a capability selection screen, and example of which is set forth in FIG. 3a. In FIG. 3a, a capability selection screen is presented in which the SME is given the option of choosing a particular capability that the individual wishes to answer questions about. It should be noted that, in some implementations, the capability selection screen might limit the choices presented to the SME. For instance, if the SME is a mid-level manager in the human resources department of a business, he or she might be presented with a capability selection screen as shown in FIG. 3a-1, which limits the questions available to the SME to those which are within his or her identified area of expertise. Such limitation might be determined on a case by case basis, or could be based on an organization which is broadly applicable to customer care across organizations. One such broadly applicable organization is one in which capabilities are grouped within domains, and in which the capabilities themselves are separated into distinct attributes is shown in tables 4-7, below.

TABLE 4

Exemplary Organization of a Business Process Alignment Domain

| DOMAIN | CAPABILITY | ATTRIBUTE |
|---|---|---|
| BUSINESS PROCESS ALIGNMENT | BUSINESS INTELLIGENCE | Modeling<br>Data Analytics and Management<br>Enterprise Agility<br>Value Driven Program Planning<br>Enterprise Performance Management |
| | CUSTOMER DRIVEN STRATEGY | Customer Valuation & Optimization<br>Decisioning Management<br>Market Mix Optimization<br>Service Delivery Optimization |
| | CUSTOMER DRIVEN PROCESSES | Process Definition & Modeling<br>Value Driven Process Metrics<br>Process Management<br>Leading Practice Management |
| | CUSTOMER DRIVEN PRODUCTS & SERVICES | Product Development Lifecycle<br>Pricing Optimization<br>Product Mix Optimization<br>Marketing Definition, Development & Deployment |
| | KNOWLEDGE MANAGEMENT | Self Learning Organization<br>Knowledge Repository<br>Leading M&P Definition & Deployment |

TABLE 5

Exemplary Organization of a Talent Management Domain

| DOMAIN | CAPABILITY | ATTRIBUTE |
|---|---|---|
| TALENT MANAGEMENT | TALENT ACQUISITION | Profile Development<br>Recruiting Channel Management<br>Candidate Pipeline Management<br>Interviewing and Selection Process |
| | TALENT ALIGNMENT | Customer Alignment<br>Customer Care Culture<br>Career Pathing<br>Organizational Design & Development |
| | TALENT TRAINING | Curriculum Development<br>Onboarding Process<br>Training Deployment<br>Training Metric Management |
| | TALENT REWARDS & RETENTION | Incentive Structure<br>Benefits Structure<br>Non-Monetary Recognition<br>Retention Management |
| | WORKFORCE MANAGEMENT | Performance Management<br>Management Dashboard<br>Forecasting, Scheduling, Intra-Day Management<br>Human Event Management |

TABLE 6

Exemplary Organization of a Customer Interaction Domain

| DOMAIN | CAPABILITY | ATTRIBUTE |
|---|---|---|
| CUSTOMER INTERACTION | CHANNEL MANAGEMENT | Partner Relationship Management<br>Integrated Customer Data Management<br>Integrated Workflow Management |
| | INTEGRATED SALES MANAGEMENT | Sales Force Alignment<br>Opportunity Management<br>Transaction Management<br>Post Sales Support |
| | BILLING DELIVERY | Billing Strategy & Approach<br>Rating<br>Cycle Management<br>Promotion Management<br>Revenue Assurance |
| | SERVICE DELIVERY | Routing<br>Contact Handling<br>Resolution Workflow Management |
| | AUTOMATED CHANNEL DELIVERY | Voice<br>Web & Chat<br>Email<br>Live Agent |
| | CUSTOMER EXPERIENCE INTELLIGENCE | Voice of the Customer Integration<br>Survey Sampling Methodology<br>Questionnaire Design<br>Voice of the Customer Reporting<br>Data Integration and Linkage Analysis<br>Voice of the Customer Process Alignment |
| | QUALITY MANAGEMENT | Quality Monitoring Process<br>Quality Feedback Process<br>Quality Monitoring Metrics |

TABLE 7

Exemplary Organization of a Care Infrastructure Domain

| DOMAIN | CAPABILITY | ATTRIBUTE |
|---|---|---|
| CARE INFRASTRUCTURE | TECHNOLOGY ROADMAPPING | Technology Roadmap<br>Alignment with Business Strategy<br>Human Factors Engineering<br>Business Continuity Planning |

TABLE 7-continued

Exemplary Organization of a Care Infrastructure Domain

| DOMAIN | CAPABILITY | ATTRIBUTE |
|---|---|---|
| | APPLICATION | Application Design |
| | | Integrated View of Customer |
| | | Analytic Decisioning |
| | TECHNOLOGY | Business Rules Management Systems |
| | ARCHITECTURE | Service Oriented Architecture |
| | | External Network (Customer Facing) |
| | | Network Convergence |
| | | Disaster Recovery Planning |
| | | Home Agent |
| | COMMUNI- | Communications Network |
| | CATIONS | Infrastructure |
| | INFRA- | Sourcing Optimization |
| | STRUCTURE | Vendor Selection |
| | | Network Performance Management |
| | | Capacity Management |
| | | Communications Expense Management |
| | SECURITY | Security Approach |
| | | Information and Technology |
| | | People & Facilities |
| | DATA | Data Governance |
| | MANAGEMENT | Data Quality Management |
| | | Data Enhancement |
| | | Data Privacy |
| | | Data Compliance Management |
| | | Integration Competency Centers |
| | PHYSICAL | Design |
| | ENVIRONMENT | Physical Surroundings |
| | | Site Selection |
| | | Facilities Management |
| | | Homeshoring |
| | SYSTEMS | Integration Methodology |
| | INTEGRATION | Requirements Management |
| | | Implementation Support |
| | | Program/Project Management |
| | | Quality Assurance Management |
| | | Maintenance and Operations Support |

Of course, it should be understood that the organization represented by tables 4-7 is intended to be illustrative only of a type of organization which could be used consistent with the teachings of this disclosure, and is not intended to be limiting, either on claims included in this application, or on claims included in other applications claiming the benefit of this application.

Figure 3B:
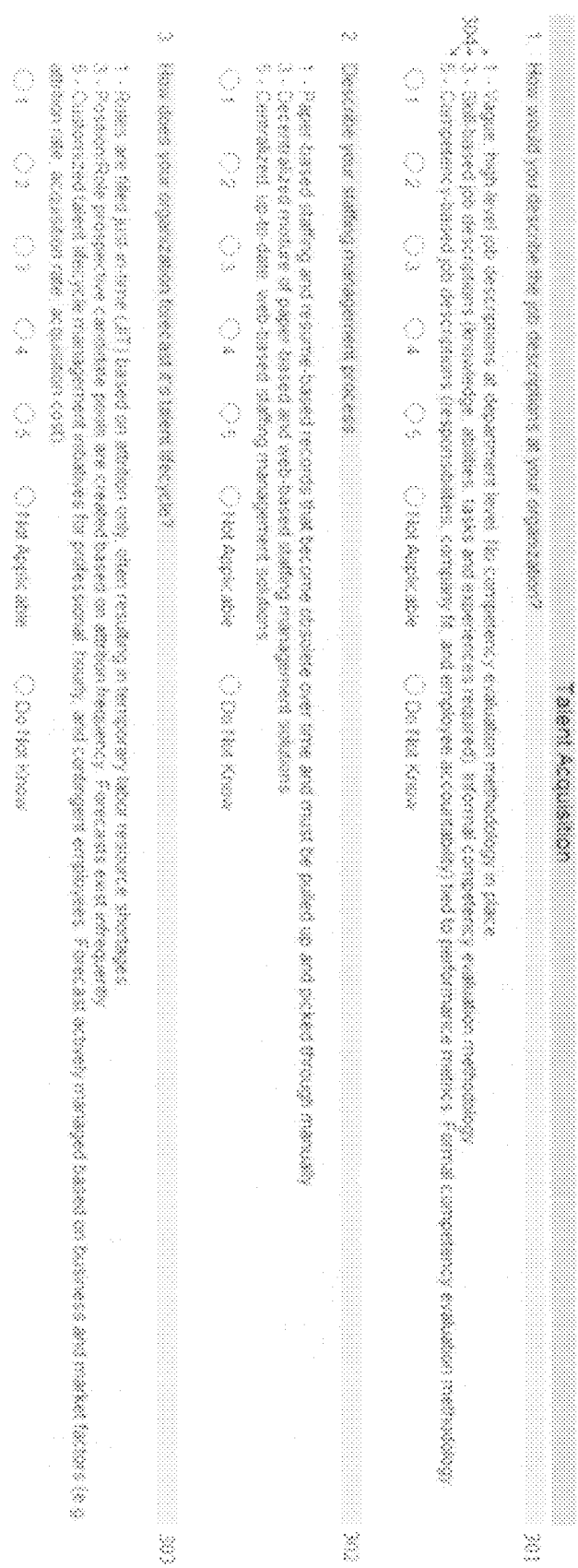
FIG. 3b depicts a data entry screen which could be used in a computerized survey tool.

Continuing with the discussion of the exemplary computer-based survey tool, once the individual taking the survey has selected a capability, the system presents a response interface as shown in FIG. 3b. As shown in FIG. 3b, the response interface presents a plurality of questions [301][302][303] to a user. The questions themselves could be stored on the server [201] in a manner which reflects the questions' semantic content. For example, using a domain/capability organization of the type shown in tables 4-7 and the capability selection screens of FIGS. 3a and 3a-1, the questions themselves might be stored in contiguous memory in a database on the server [201], with the memory itself organized into domains and capabilities, for example, in the manner of tables 8-11 set forth below:

TABLE 8

Exemplary organization of questions and exemplars associated with attributes and capabilities of a business process alignment domain

| | |
|---|---|
| Customer Valuation & Optimization | To what degree does your organization calculate Customer Lifetime Value?<br>1 - Customer lifetime value calculations are limited due to complexity of calculations or lack of reliable input data, or both.<br>3 - Customer lifetime value is done with initial rough calculations which include direct costs but indirect revenue is not considered.<br>5 - Customer lifetime value is a critical ongoing assessment. Calculations include initial revenue, initial cost (acquisition and product), future revenue (incremental purchase, service and support), future costs (incremental sales and product costs and ongoing service and support costs), loyalty (retention rate), and influence value.<br>To what degree does your company perform lifetime value calculations to customer segmentation?<br>1 - A single lifetime value calculation is done across all customers.<br>3 - Lifetime value calculations are performed on a typical customer within a segment to understand the relative value of the entire segment against other segments. Segmentation does not change based on lifetime value calculations.<br>5 - Lifetime value calculations are performed at the individual level and customers are grouped into segments based on relative value. Segmentation may change as lifetime value is reassessed. |

TABLE 8-continued

Exemplary organization of questions and exemplars associated with attributes and capabilities of a business process alignment domain

|  |  |
|---|---|
|  | How does your company apply customer lifetime value calculations and analysis?<br>1 - Minimal use of customer lifetime value analysis causes interactions to be focused on customers who are the biggest in terms of sales volume, demand the most service or are easiest to market products or services<br>3 - Customer lifetime value analysis is used to create differentiated treatment for customer segments as a component of the customer interaction strategy.<br>5 - Customer lifetime value analysis is used as insight to retain the most valuable customers, identify, target customers from competitors, better focus on CRM deployments, create marketing campaigns and fine tune the customer interaction strategy.<br>How does your company have a strategy for differentiated service for different levels of customers?<br>1 - Customer interaction strategy is defined by company culture of treating customers equally with no differentiation of treatment.<br>3 - Customer interaction strategy is to provide differentiated treatment based on entire customer segment value only.<br>5 - Customer interaction strategy is to provide differentiated treatment based on segmentation defined by individual lifetime value of the customer. |
| Desisioning Management | Which of the following best describes how your organization uses predictive analytics?<br>1 - Manual analysis is performed on historical data and limited by policies and procedures documentation.<br>3 - Predictive analytics are used to predict likely future results from historical data, business rules are applied manually to decision making processes.<br>5 - Dedicated business rules management technology and advanced predictive analytics serve as the common infrastructure across multiple processes and decision types (strategic and operational).<br>Which of the following best describes the general analysis methodology and tools used in your organization?<br>1 - Analyses are based on intuition and personal biases as limited data is available.<br>3 - Analyses are created manually with minimal consideration for resource constraints and limited ability to account for uncertainty.<br>5 - Analyses are modeled using visualization tools to understand the best strategy by adjusting variables and forecasting outcomes while balancing multiple business objectives and resource constraints while accounting for ranges of uncertainty.<br>Which of the following best describes how information is presented to the agent to enable decision making while interacting with a customer?<br>1- Information retrieval requires specific queries from multiple systems.<br>3 - Systems facilitate routine data searches and retrieval but are contained in multiple systems.<br>5 -Information is quickly presented in a single contextually relevant format.<br>Which of the following best describes how quickly an agent can make an informed decision about a customer's situation?<br>1 - Decisions timeframes are lengthy and are often made after the customer interaction transaction has occurred.<br>3 - Excessive effort is needed to research and reach a decision during the customer interaction transaction.<br>5 - Decisions are facilitated during the customer interaction transaction.<br>To what extent does your organization monitor and analyze the customer interaction decisioning processes?<br>1 - Customer interactions and relevant decisions are not monitored and analyzed.<br>3 - No formal feedback mechanism in place for enterprise-wide decision performance analysis. Feedback may be received through individual business units but is not used to refine strategy.<br>5 - Customer interactions and relevant decisions are monitored in real-time and results are reported in order to refine strategy, the decision model and assumptions. |
| Market Mix Optimization | Which of the following best describes how markets are defined and how messages are targeted to those markets?<br>1 - Single target market with undifferentiated messaging.<br>3 - Multiple target markets identified with some differentiation in messaging but only at a very high level. (e.g., industry, customer types, total revenues)<br>5 - Multiple distinct target markets defined in detail with specific criteria of why each are a viable, appropriate market/customer segment. Differentiated product messaging and value propositions for each.<br>Which of the following best describes your organization's ability to match products to their corresponding target markets?<br>1 - There is limited ability to match existing products, benefits and features and value levers to markets or segments.<br>3 - Specific matching of product set features, benefits, and value levers to provide differentiated value for some but not all segments.<br>5 - There is explicit, systematic matching of various product offerings, features, benefits and value levers to specifically drive value for individual target markets and segments.<br>To what degree is your organization able to tailor a pricing strategy for individual products and product bundles targeted for specific customer segments?<br>1 - Pricing strategy does not incorporate product or segment differentiation nor bundled product profitability considerations. |

TABLE 8-continued

Exemplary organization of questions and exemplars associated with attributes and capabilities of a business process alignment domain

| | |
|---|---|
| | 3 - Pricing strategy aligns with emerging differentiated treatment of customer segments. Holistic view into profitability of segments or product bundling is applied in some but not all segments. Profitability considerations across segments is emerging.<br>5 - Pricing strategy is fully tailored to product and bundling needs of specific target segments. Additionally, holistic profitability considerations applied both within and across segments and incorporated into strategic customer support decisions.<br>How would you describe the mechanism by which your organization gets feedback from the (customer) market?<br>1 - Feedback mechanisms are informal. There is limited opportunity to validate whether feedback applies to all similar customers. Very limited feedback to marketing or product development.<br>3 - Feedback mechanisms are formalized and functioning for some products or customer segments but not all. Incorporation of information into marketing or development changes are ad-hoc, and not always timely.<br>5 - Feedback mechanisms are formalized and functioning consistently for all customer segments and rolls into defined metrics which are utilized to enable real-time adjustments to marketing messaging as well as product development.<br>To what extent does your organization gather market intelligence?<br>1 - Market intelligence is not an emphasis item and performed on an ad-hoc bases.<br>3 - Market intelligence is a key emphasis item but only applied to certain product segments or within certain business units.<br>5 - Market intelligence is a competitive differentiator and holistically evaluated across product sets, segments and business units.<br>To what extent does your organization use and apply the gathered market intelligence?<br>1 - There is minimal competitive analysis or customer predictive behavior analysis based on findings.<br>3 - Formal competitive analysis is incorporated into customer and market predictive analysis, however it does not always successfully influence future strategy.<br>5 - Robust competitive analysis and customer predictive analysis capabilities (future needs of the marketplace) are regularly applied. Findings systematically incorporated into future strategy. |
| Service Delivery Optimization | What criteria does your company observe to develop a customer service strategy?<br>1 - Company defines customer service strategy based on product development and marketing segmentation.<br>3 - Customer service strategy is defined based on experience and refined based on reaction to needs of customers.<br>5 - Customer service strategy is defined based upon current and anticipated needs of customer segments and feature and functionality demands of those segments.<br>To what degree does your organization define its desired customer service experience?<br>1 - Little formalized guidance, expectations or policies on a desired customer experience results in varied customer treatment across service channels.<br>3 - Organization provides sufficient guidance and structure to design service channels which meet the customer service experience requirements.<br>5 - Service channels are designed to exceed the desired customer service experience. Additionally agents are motivated to evolve beyond normal empowerment.<br>How does your organization differentiate its service levels (for customers)?<br>1 - Customer value profiles are not defined and cost of service is not a factor in determining level of service. Service strategy is one size fits all with no service level differentiation.<br>3 - Market segmentation and relative cost to serve each market segment is used to create rudimentary service level differentiation.<br>5 - Customer value profiles and analysis of cost to serve (including comprehensive understanding of time to serve) drive service level differentiation by customers segment.<br>Which of the following best describes your organization's service channel infrastructure?<br>1 - Customers must adapt to available service channels. Minimal investments in alternate service delivery methods.<br>3 - Investments in alternate service channels is driven by perceived needs of the entire customer base. Customers are incented to utilize the most cost effective delivery channel.<br>5 - Investments in alternate service channels are made for high value customer base. Economies of scale are realized and alternate channels may be deployed to mid-value customers.<br>Which of the following best describes your organization's ability to understand the costs and return on investment in servicing your customer segments?<br>1 - Costs to service and Return On Investment (ROI) are not applicable.<br>3 - There is a thorough understanding of costs to serve but ROI is intangible due to mutual investment in interaction channels.<br>5 - The company has a thorough understanding of costs to serve and ROI of each interaction channel and how it drives future customer valuation and optimization models. |

TABLE 8-continued

Exemplary organization of questions and exemplars associated with attributes and capabilities of a business process alignment domain

| | |
|---|---|
| Data Modeling | With regards to your organization's Business Intelligence data modeling practices, who has responsibility for creating data usage standards and defining data usage terminology?<br>1 - Business requirements analysts track the architectural knowledge.<br>3 - Business analyst or systems engineer<br>5 - Data Steward and/or Data Arbiter<br>How consistent are the Business Intelligence data standards and terminology?<br>1 - Not consistent<br>3 - Fairly consistent<br>5 - Very consistent with agreed upon and utilized standards.<br>To what degree do people question the integrity of the data that feeds business intelligence modeling within your organization? (Do people believe the data?)<br>1 - Frequently, people place little faith in the quality of the underlying data.<br>3 - Occasionally, people question certain areas of data management and data integrity.<br>5 - Not at all, data integrity is managed as an asset by defining the value of the data in alignment with Key Performance Indicators (KPIs).<br>Is there a Business Intelligence data modeling methodology and who defines it?<br>1 - No common Business Intelligence modeling methodology exists.<br>3 - Business Intelligence modeling methodologies exist and are defined and maintained within separate business units.<br>5 - Standardized Business Intelligence modeling methodology exists and is maintained by a centralized group fed by systematic business unit input.<br>To what degree is Business Intelligence data modeling standardized and repeatable in your organization?<br>1 - Disparate Business Intelligence data models may be used in different places in the enterprise. There is no complete picture of where, when and how data migrates across systems.<br>3 - The most critical and frequently used processes are standardized for Business Intelligence modeling. Frequently used processes (like insertions, alterations, or deletions to a table or to the schema) are standardized.<br>5 - Business Intelligence modeling has reusable design patterns (e.g. naming conventions and data types) which become part of a catalog to reuse and reapply without having to recreate each time. Frequently used processes are standardized. A master model exists and is owned by a data modeler or data architect that maps all of the components within the enterprise.<br>Which of the following best describes your organization's Business Intelligence data modeling tools?<br>1 - No modeling tool exists, or modeling is done in a simple drawing tool.<br>3 - Lack of a common modeling tool, multiple modeling tools which are not integrated into a common metadata repository.<br>5 - A single modeling tool that results in a common metadata repository and acts as a modeling hub.<br>Please describe the capabilities or functionality of your Business Intelligence data modeling tools.<br>1 - Simple graphical representation of the data based on drawing tool's capabilities.<br>3 - Tool represents entity relationships but does not represent schema and dimensional modeling.<br>5 - Robust tool functionality contains schema and dimensional modeling and includes automatic linkage of foreign keys and automatic integrity checks.<br>Which of the following best describes your organization's process of business intelligence data modeling change control management?<br>1 - Changes are performed in an ad-hoc manner and in the absence of any formalized change control process.<br>3 - Changes are performed manually and with multiple people involved who work independently. This use of multiple resources to perform all steps in the change control process without security checkpoints violates best practice security and compliance rules.<br>5 - Changes are performed through a Graphical User Interface (GUI) to the change management tool. The tool allows representation of complex data assets in an easily understood and maintainable visual format. The tool also enables quick reference, QA and template creation to enable a repeatable process. It also enforces the change control process and compliance.<br>How is change control managed for Business Intelligence data modeling?<br>1 - No formal change control management process for Business Intelligence modeling.<br>3 - People (and paper) management of change control process.<br>5 - Formal change control process. The modeling tool contains functionality that helps manage change and version control. |
| Process Definition & Modeling | Which statement best describes the degree to which organizational processes are defined?<br>1 - Processes are tribal within silos and not defined within functional groups.<br>3 - Processes are defined within functional groups, but not across the organization.<br>5 - Processes define the end-to-end process across the organization, not just within functional groups.<br>Which statement best describes the tools used to document organizational processes?<br>1 - Processes are documented with simple drawing capabilities. Documentation methods vary widely throughout the organization and are updated as needed. |

TABLE 8-continued

Exemplary organization of questions and exemplars associated with attributes and capabilities of a business process alignment domain

| | |
|---|---|
| | 3 - Processes are documented with simple drawing capabilities and are updated in an ad-hoc manner. Documentation methods are consistent within business units.<br>5 - Processes are iteratively documented across the enterprise. Processes are captured and represented visually in advanced modeling tools to facilitate common model framework, translation and flexibility between model levels.<br>To what extent do documented processes delineate ownership roles and responsibilities within the processes?<br>1 - Processes do not provide clear ownership of activities as well as roles and responsibilities.<br>3 - Processes provide roles and responsibilities definitions at a high level only. Different owners for some processes within the same group. Some of the processes may have no ownership.<br>5 - Processes drive definition of roles, responsibilities and ownership to the RACI level (Responsible, Accountable, Consult, Inform).<br>How consistent is the terminology used in your process documentation?<br>1 - Different terms are used for the same activity. Use of "internal" terms is prevalent.<br>3 - Business units use different terms for the same activities or terms. Intermingle customer and internal terms.<br>5 - Standard terminology used throughout the company. Activities use customer terminology throughout all processes where customer terms exist.<br>Which of the following best describes how process models are created and where they are stored/managed?<br>1 - Existing process models are developed on un-scaleable platforms and exist on personal desktops. No central repository for process models.<br>3 - Disparate locations and owners for process models and simulation packages. Moving toward centralization of process repository.<br>5 - Integrated and shared repository for models.<br>Which of the following best describes how the organization keeps track of different model updates/versions and how the model is shared among the organization?<br>1 - No versioning or sharing of process models.<br>3 - Manual versioning and sharing of process models. (Example: File names for versioning and email to share models).<br>5 - Full automated versioning built in to the process modeling tool. Interoperability between process model and other business systems.<br>Which best describe your process modeling analysis and simulation capabilities?<br>1 - Analysis is focused on units. Simulation is focused on throughput capability only.<br>3- Analysis is focused on value added steps. Simulation is functionally focused.<br>5 - Analysis is focused on units and value added steps in relationship to variations in customer needs. Simulation provides ability to conduct change impact analysis across organization. |
| Value Driven Process Metrics | How would you describe the process metrics used to evaluate enterprise processes?<br>1 - Metrics are not tied to processes. Metrics are not aligned into the processes that generate them.<br>3 - Process metrics are defined within silos. Each BU has their own metrics and definitions with no consistency enterprise-wide.<br>5 - Process metrics are clearly, fully, and consistently defined across the, organization, quantifiable and actionable, and drive process improvement initiatives.<br>How is the value of overall process metrics defined when evaluating processes?<br>1 - Value is defined by the shareholder expectations.<br>3 - Value is defined by shareholder expectations, customer expectations are secondary.<br>5 - Value is defined by customer expectations and balanced by shareholder expectations.<br>Which of the following best describes how customer needs are identified?<br>1 - Customer needs and expectations are limited to product definition and design.<br>3 - Market research is used to identify customer needs and expectations for products and services.<br>5 - Customer interaction data is used to identify customer needs and expectations and value gaps.<br>How are non-value added process steps identified?<br>1- Customer and agent feedback as well as anecdotal information are used to identify and eliminate non-value added process steps within the contact center.<br>3 - Metric performance drives identification and elimination of non-value added primary process steps by individual business units.<br>5 - Metrics are, expanded to include secondary and tertiary process steps (i.e. steps that are recognized as non-value added but currently necessary) which are targeted for improvement.<br>What components influence process changes on an ongoing basis?<br>1 - Operational experience drives customer requirements and business needs for processes.<br>3 - Performance metrics are used to evaluate customer requirements and business needs for processes.<br>5 - Diagnostic and performance metrics are correlated to evaluate process performance against expectation as well as customer requirements and business needs for processes.<br>How are your processes measured to ensure they are performing against expectations? |

TABLE 8-continued

Exemplary organization of questions and exemplars associated with attributes and capabilities of a business process alignment domain

| | |
|---|---|
| Process Management | 1 - Anecdotal information is used to gauge effectiveness of process improvements.<br>3 - Performance after the change is reflected in current metrics.<br>5 - Metric definitions are validated against impact of changes and refined, if necessary. New metrics may replace existing metrics if expected impact is achieved.<br>How is customer interaction data collected for analysis of business processes?<br>1 - Data is collected regarding the customer service transaction via quality monitoring and operational metrics.<br>3 - Data is collected regarding specific customer service experiences after the transaction has occurred.<br>5 - Transaction data is collected and integrated with enterprise data and operational metrics to evaluate the broad customer experience.<br>How does your organization determine which contact center processes should be targeted for improvement?<br>1 - Operational experience, expertise and anecdotal information is used to make process changes.<br>3 - Agent and company performance metrics are used to evaluate contact center processes. Root cause analysis is not performed.<br>5 - Diagnostic metrics are used to point to ineffective contact center and upstream processes to determine root cause of process issues within the enterprise.<br>How are process changes communicated throughout the organization?<br>1 - Functional process owners are informally defined and have limited accountability for communicating process changes.<br>3 - Functional process owners have accountability and communicate with other owners to drive change within desired timeframes.<br>5 - A quick, closed loop feedback process is in place to drive process changes and communicate changes to the organization and ensure a short cause and effect cycle.<br>What are the components used to determine prioritization of potential process changes?<br>1 - Urgency and magnitude of inefficiency drive potential process changes with no formal prioritization process utilized.<br>3 - Understanding of costs associated with process issues drives prioritization of potential process changes.<br>5 - Complexity and strategic value drive prioritization of potential process changes.<br>What inputs are used for determining the contact center service needs and expectations of customers?<br>1 - Customer needs and expectations are considered but input is limited to product definition and design.<br>3 - Market research is used to identify customer needs and expectations for products and services across the entire lifecycle.<br>5 - Customer interaction data is used to identify and refine customer needs and expectations as well as value gaps.<br>How are process changes coordinated internally and externally to the contact center environment?<br>1 - Operational changes are dictated at a corporate level for implementation within the contact center by center management.<br>3 - Operational changes to processes are implemented within the contact center by center management.<br>5 - Changes to processes are implemented in a coordinated effort to ensure alignment of upstream and downstream impacts. |
| Leading Practice Management | Which statement best describes your organization's view of leading practices?<br>1 - Leading practices are recognized as potential tools but are rarely understood, evaluated or seen as applicable for their environment.<br>3 - Organization recognizes value of external leading practice identification as potential solutions for larger problems.<br>5 - Progressive organization demonstrating methodical rapid adoption of capabilities that will allow them to differentiate their offering and a willingness to invest in the same.<br>To what extent is a leading practice identification culture instilled in your organization?<br>1 - Consultants or external influences provide best practice methodology to the organization.<br>3 - Leadership roles are trained in application of leading practices.<br>5 - Leading practice culture is instilled at all levels within the organization. Application of leading practices is the responsibility of all individuals.<br>How are leading practices identified in your company?<br>1 - Leading practices are found by accident and rarely or infrequently applied. Benchmarking is not used.<br>3 - Leading practice is sought after and applied for complex solutions and to benchmark current performance.<br>5 - Leading practice identification and application is a standard process for all types of problems, the practice becomes the benchmark.<br>How are internal best practices developed and refined in your organization?<br>1 - Little or no feedback is sought from agent and operational management levels on customer interaction issues.<br>3 - Customer interaction issues are categorized to determine root causes. Agent and operations management routinely meet to define leading practice within the center.<br>5 - Operations team (agents and management) collaborates with upstream organizations to define and, confirm leading practices. Process changes are evaluated for impact and alignment throughout the organization. |

TABLE 8-continued

Exemplary organization of questions and exemplars associated with attributes and capabilities of a business process alignment domain

| | |
|---|---|
| | How are your company's leading practices evaluated?<br>1 - No evaluation of leading practices that may have been applied due to infrequency of application.<br>3 - Individual solutions are evaluated for effectiveness but are not compared to leading practice results.<br>5 - Critical evaluation and fine tuning are conducted to exceed the documented performance of the leading practice. |
| Product Development Lifecycle | What types of information are used to define product requirements?<br>1 - Market research and competitive analysis is used to define product requirements.<br>3 - Market segmentation and ad-hoc surveys are inputs for product development.<br>5 - Customer interaction data is an integral part of the input into product development. Marketing regularly uses call center data and agent/customer feedback into product design.<br>To what extent are future product requirements influenced by customer feedback?<br>1 - Customer feedback is captured after the transaction but there is little or no design to capture future product requirements.<br>3 - Future product requirements are driven by customer feedback which is captured after the transaction has occurred.<br>5 - Customer interaction processes are designed and refined to capture future product requirements during the transaction.<br>Which statement best describes your company's product testing efforts?<br>1 - Existing customer base is sporadically utilized to provide input on product features and functionality.<br>3 - External focus groups are utilized prior to product launches.<br>5 - Internal and external focus groups driven by customer segmentation are utilized to identify product feature and functionality requirements throughout a product lifecycle.<br>To what extent is customer interaction data used to make product decisions?<br>1 - Customer interaction data is not used in product decisioning.<br>3 - Customer interaction data is used to make decisions at the beginning of the product development cycle.<br>5 - Feedback and customer interaction data are used to make investment decisions at structured gate reviews during the product development cycle. |
| Pricing Optimization | What kind of cost analysis is performed when determining product and service pricing?<br>1 - Minimal understanding of costs involved and usually focused on development costs with little or no depth on operating costs. Limited access to or inconsistent cost data to make pricing trade-off decisions.<br>3 - Product capability trade-offs and pricing strategy driven by detailed understanding of development and operating costs through Traditional Cost Accounting.<br>5 - Cohesive pricing strategy refinement that uses Activity Based Costing to fully understand cost drivers of product capabilities and margin contribution components.<br>What role does supply and demand play in your pricing strategy?<br>1 - Supply and demand are small contributors to overall pricing strategy with primary focus on demand forecasting for product capabilities.<br>3 - Supply and demand forecasting have a rudimentary impact on pricing strategy primarily by contributing to initial product capability and discounting decisions.<br>5 - Supply and demand forecasting are integral contributors to price elasticity analyses and used to drive capability and pricing strategy decisions throughout the product lifecycle.<br>Which statement best describes the use of price elasticity analysis in your pricing strategy?<br>1 - Price elasticity is not a driving factor in pricing strategy.<br>3 - Price elasticity analysis has a small influence on the overall pricing strategy.<br>5 - Price elasticity analysis has a strong influence on the overall pricing strategy.<br>Which statement best describes the research sources used to define a pricing strategy?<br>1 - Ad-hoc market feedback and basic industry research is used to determine pricing strategy.<br>3 - Feedback gathered from focus groups, third party validation, and market studies contribute to a structured pricing strategy.<br>5 - Focus group, third party and market studies, combined with a systematic collection of internal/external customer interaction data and detailed competitor product pricing all contribute to the pricing strategy.<br>Which statement best describes the link between customer segmentation and pricing strategy?<br>1 - Pricing strategy is not linked to customer segmentation.<br>3 - Pricing strategy is driven by expectations of product performance within market segments, not individual customer segments.<br>5 - Pricing strategy is aligned and constantly re-evaluated against business strategy goals within individual customer segments. |
| Product Mix Optimization | Which statement best describes the relationship between product profitability and product mix?<br>1 - Basic understanding of individual product profitability but not optimal product mix.<br>3 - Basic understanding of individual product profitability and optimal product mix.<br>5 - Complete understanding of individual product profitability with formalized checks and balances to continually optimize product mix for maximum profitability.<br>How would you describe your overall agility of being able to adapt optimal product mixes to ever-changing market conditions? |

TABLE 8-continued

Exemplary organization of questions and exemplars associated with attributes and capabilities of a business process alignment domain

|  |  |
|---|---|
|  | 1 - Infrastructure, resource investments, and current product development lifecycles inhibit changing product mix.<br>3 - Infrastructure, resource investments, and product development lifecycles can be leveraged to optimally accommodate only slow changes in market conditions.<br>5 - Infrastructure, resource investments, and product development lifecycles are, built with flexibility in mind to efficiently accommodate rapidly changing market, conditions.<br>To what extent is market intelligence used in determining your product mix?<br>1 - Market intelligence is not used or only assessed on an infrequent basis.<br>3 - Market intelligence is used to provide demand insight into various product segments.<br>5 - Market intelligence is used to provide and forecast detailed present and future product demands, and is used to determine optimization of product mix.<br>How would you describe your organization's understanding of the competitive, physical, and regulatory environments surrounding your product mix?<br>1 - Competitive, physical, and regulatory environment constraints are minimally understood.<br>3 - Competitive, physical, and regulatory environment constraints are understood without a quantified impact analysis.<br>5 - Competitive, physical, and regulatory environment constraints are understood and have detailed impact analyses performed on all complexities. Mitigation plans are usually considered in product mix decisions. |
| Marketing Definition Development & Deployment | Which statement best describes the focus of your product messaging?<br>1 - Product messaging is focused on basic product features (ex: what it does and how it does it).<br>3 - Product messaging is focused on basic product features, benefits, and specifications. Value proposition to customer is usually slightly differentiated from competition.<br>5 - Product messaging is focused on the differentiated or superior value a customer receives relative to competing products or services.<br>How is customer interaction data incorporated into your marketing messaging?<br>1 - Customer interaction data is not used to determine marketing messaging.<br>3 - Customer interaction data is minimally or anecdotally used to determine the appropriate marketing messaging.<br>5 - Customer interaction data is analyzed and highly leveraged to determine appropriate marketing messaging.<br>Which statement best describes how information on new offerings is internally disseminated?<br>1 - Marketing provides new offering materials to Sales to aid in delivering message to market.<br>3 - Marketing prepares and trains sales organization to deliver consistent and accurate messages to markets focused on new offerings.<br>5 - All customer-facing internal teams participate in Marketing led training to deliver consistent and accurate awareness of new, evolving and discontinued products and services.<br>Which of the following best describes the systems that support the communication of customer feedback to internal groups?<br>1 - Manual (i.e. email) or minimal system provides customer feedback from customer-facing groups.<br>3 - Customer interface technology gathers and centralizes customer feedback from customer-facing groups.<br>5 - Customer interface technology gathers and centralizes customer feedback, and enables analysis in order to make customer-centric decisions.<br>Please describe the extent to which your culture is customer-centric and how marketing messaging gets updated to reflect this.<br>1 - Customer-centric culture is not prevalent across the organization. Messaging rarely gets updated as product changes occur.<br>3 - Customer focused culture provides standard processes among internal groups to enable Marketing to update messaging when larger needs are identified.<br>5 - Customer focus culture provides incentive to respond quickly, refine, retool and redeploy product enhancements and respective messaging. |
| Self Learning Organization | How are business problems identified in your organization?<br>1 - Reactive and undefined process for identifying business problems.<br>3 - Informal collaborative process for identifying business problems.<br>5 - Formalized collaborative process for proactively identifying business problems.<br>How are solutions to business problems proposed in your organization?<br>1 - Reactive and undefined process for proposing solutions.<br>3 - Informal collaborative process for proposing solutions typically emanating from upper management.<br>5 - Formalized collaborative process for proactively proposing solutions at all levels of the organization.<br>To what extent are lessons learned applied to your customer service channels?<br>1 - Lessons learned are not formally captured and usually not used to improve customer service channels.<br>3 - Lessons learned are usually captured and used to improve customer service channels. |

TABLE 8-continued

Exemplary organization of questions and exemplars associated with attributes and capabilities of a business process alignment domain

| | |
|---|---|
| | 5 - Lessons learned are used to improve customer service channels, business processes, training materials, and are implemented quickly through a formalized process.<br>How would you describe your organization's leadership objectives for learning initiatives?<br>1 - Command-and-control leadership objectives in which learning is in opposition with leadership style. Knowledge is passed down manually from superiors.<br>3 - Leadership objectives are not formally aligned with or focused on continuous learning opportunities for individuals or teams. Most applicable organizational knowledge is available but little directional guidance is provided.<br>5 - Leadership objectives encourage individual and team collaboration in ongoing learning initiatives. Knowledge is readily available, fully aligned with training initiatives, and is disseminated to all employees across the enterprise.<br>How is organizational knowledge typically shared in your organization?<br>1 - Knowledge is usually shared through common network drives, emails, or notifications.<br>3 - Knowledge is typically shared through separate non-integrated knowledge systems within individual business units.<br>5 - Knowledge is usually shared through an enterprise-wide knowledge management system and used to identify organization intelligence and best practices. |
| Knowledge Repository | Which of the following best describes your knowledge repository?<br>1 - Many basic knowledge repositories (i.e. LAN folders) exist within functional groups.<br>3 - Repository toolsets (i.e. MS Sharepoint) are used to catalog and maintain knowledge within separate business unit groups.<br>5 - Centralized knowledge repository provides enterprise-wide knowledge management.<br>How is content managed within your knowledge repository?<br>1 - Cataloguing and content aging is managed infrequently or not at all.<br>3 - Cataloguing & content aging is managed manually by content owners.<br>5 - Higher integrity cataloguing & content aging has integrated workflows for approval and review processes, and automated reduction of duplicated information.<br>Which statement best describes the content in your knowledge repository?<br>1 - Inconsistent authoring and definitions with no formal document review or update process.<br>3 - Intelligent problem resolution process modeling into existing knowledge content. Formal document review of new content and updates.<br>5 - Content creation, capture, and approval workflows for new issues, products, and areas of focus are formally defined and rapidly integrated into knowledge database.<br>How would you describe your knowledge repository's accessibility?<br>1 - No oversight or ownership of the effectiveness, usefulness, or business strategy alignment of knowledge content.<br>3 - Regular reviews and some self-policing of knowledge content and solution management.<br>5 - Systematic approach to ensure knowledge management content supports organizational strategy. Proactive search for exceptional operating performance that signals best practice activity systems.<br>How are content searches performed within your knowledge repository?<br>1 - Indexed searchable database or search engine.<br>3 - Indexed searchable database or search engine that includes qualification/solutions to problem sets and known issues.<br>5 - Indexed and context-specific database or search engine that includes qualification/solutions to problem sets and known issues.<br>Which best describes the knowledge repository's rating and sorting algorithm capability to diagnose potential solutions to issues or problems?<br>1 - Segmentation or diagnosis by specific content domains.<br>3 - Case-based reasoning and decision trees are used.<br>5 - Statistical correlation analysis of problem and solution used to refine case-based reasoning and decision trees. |
| Leading M&P Definition & Deployment | To what extent are your company's Methods & Procedures documentation centralized?<br>1 - Repositories are segmented and restricted to individual teams.i<br>3 - Some knowledge content is captured into centralized systems of record but not equally available to teams across enterprise.<br>5 - Information is captured and is quickly and universally available in centralized systems of record.<br>What methods of change control exist for Methods & Procedures?<br>1 - System support for methods and procedures (M&Ps) is primarily confined to folder structure on LAN with little or no change control.<br>3 - Manual methods for change control are utilized.<br>5 - Systems support M&P change control processes.<br>How are internal methods and procedures assessed and revised?<br>1 - Occasional assessment and revision of internal methods, and procedures when major business changes occur, not necessarily when critically needed.<br>3 - Assessment and revision of internal methods and procedures are performed when critically needed.<br>5 - Assessment and revision of internal methods and procedures are performed in a systematic, ongoing fashion. |

TABLE 8-continued

Exemplary organization of questions and exemplars associated with attributes and capabilities of a business process alignment domain What consideration if any, do best practices receive when changing internal methods and procedures?
1 - Best practices are usually not considered, researched, or analyzed.
3 - Best practices are considered with some research & analysis of existing leading practices.
5 - Pro-active outreach to research, analyze, and apply other best practice management techniques to improve current performance and benchmarks.
Who in your organization has responsibility for creating or changing methods, procedures, and knowledge content?
1 - Little or no consistency with respect to who creates or changes methods, procedures, and knowledge content.
3 - Middle and upper management usually have most authority to create or change methods, procedures, and knowledge content.
5 - Middle and upper management, individual contributors, and team leads participate in continually improving methods and procedures through knowledge content revision and creation.

TABLE 9

Exemplary organization of questions and exemplars associated with attributes and capabilities of a talent management domain

| | |
|---|---|
| Profile Development | How would you describe the job descriptions at your organization?<br>1 - Vague, high-level job descriptions at the department level.<br>3 - Skill-based job descriptions (knowledge, abilities, tasks and experiences required).<br>5 - Competency-based job descriptions (responsibilities, company fit, and employee accountability) tied to performance metrics.<br>Describe your organization's competency evaluation methodology for job descriptions (the process of grouping similar knowledge, skills, and abilities under headings, or "competencies")?<br>1 - No competency evaluation methodology is in place.<br>3 - Competency evaluation methodology is an informal process.<br>5 - Competency evaluation methodology is an formal process.<br>How would you describe your organization's job profiles?<br>1 - Job profiles are not competency-based and cultural fit profiles do not exist.<br>3 - Job profiles are competency-based and include cultural fit profiles. These profiles are loosely tied to existing staff performance and changing customer care requirements.<br>5 - Job profiles are competency-based and include cultural fit profiles. These profiles are consistently updated based on the performance of existing staff in conjunction with changing customer care requirements.<br>How often does your organization update it's job profiles?<br>1 - Rarely if ever.<br>3 - Infrequently.<br>5 - Frequently.<br>How does your organization utilize job profiles?<br>1 - Profile development seeks only to fill existing job roles within functional silos.<br>3 - Profile development is moderately aligned to the organization's strategic business goals, culture, and customer needs.<br>5 - Personal Profile Analyses (PPAs) are used frequently for selection, retention, cultural fit, and leadership effectiveness. Customer Segmentation needs are the primary drivers for profile development.<br>To what extent are job profiles aligned to enterprise objectives?<br>1 - De-centralized departmental job descriptions and profiles are created, developed, and maintained by individual business units. The Business unit operates independent of organizational goals and strategy.<br>3 - Departmental job descriptions and profiles are centrally created and developed, but maintained by individual business units. It is up to the business unit to check for organizational alignment.<br>5 - Job profiles are centralized thorough an inter-departmental needs assessment for cross-functional job descriptions. |
| Recruiting Channel Management | How would describe your organization's talent acquisition strategy or process?<br>1 - Human Resources monitors popular career websites, company website, and traditional media for applicable resumes/profiles based on internal business needs and objectives.<br>3 - Human Resources and human capital specialists within functional BUs design talent acquisition strategy that aligns to customer needs and business objectives.<br>5 - The business unit management team, with Human Resources as a partner, designs talent acquisition strategy and executes based on organizational design, business goals, and customer alignment. |

TABLE 9-continued

Exemplary organization of questions and exemplars associated with attributes and capabilities of a talent management domain

|  |  |
|---|---|
|  | How does your organization select optimal recruitment channels (e.g. company website, job search engines, career fairs, advertisements)?<br>1 - Recruitment channels are selected based solely on the lowest cost.<br>3 - Recruitment channels are formally defined and utilized based on cost and historical fill rate data.<br>5 - Current and potential recruitment channels are evaluated continuously based on quantitative and qualitative historical fill rate data.<br>What cost factors (channel selection, candidate type, effort, level of spend, outreach, insource or outsource, and technology) are considered during the recruiting channel management process?<br>1 - Cost factors are not considered or measured against Return on Investment(ROI), recruiting quality, or effectiveness.<br>3 - Some cost factors are informally considered and loosely measured against ROI, recruiting quality, and effectiveness.<br>5 - Each potential cost factor is carefully evaluated, measured, and refined against ROI, recruiting quality, and effectiveness. |
| Candidate Pipeline Management | How are your organization's job descriptions and profiles maintained?<br>1 - Job descriptions and profiles database exists but is not updated regularly.<br>3 - Job descriptions and profiles database is maintained for all company functions and is updated as new positions are created. Job postings are managed from the database and updated as positions open and close.<br>5 - Resumes/job applications are maintained within the job posting database with automatic matching in place to job descriptions and profiles.<br>Describe your staffing management process.<br>1 - Paper-based staffing and resume-based records exist that become obsolete over time and must be pulled up and picked through manually.<br>3 - Decentralized mixture of paper-based and web-based staffing management solutions.<br>5 - Centralized, up-to-date, web-based staffing management solutions.<br>How does your organization forecast its talent lifecycle?<br>1 - Roles are filled just-in-time (JIT) based on attrition only, often resulting in temporary labor resource shortages.<br>3 - Position/Role prospective candidate pools are created based on attrition frequency. Forecasts are used infrequently.<br>5 - The organization utilizes customized talent lifecycle management initiatives for professionals and hourly employees. Forecasts are actively managed based on business and market factors (e.g. attrition rate, acquisition rate, acquisition cost). |
| Interviewing and Selection Process | Describe the qualification and selection criteria your organization uses to screen applicants.<br>1 - Basic needs identification vs. existing resource assessment. Past experience is the only consideration for candidate selection.<br>3 - Semi-formal qualification process using skills-based candidate identification. Screening is primarily used to assess compatibility with coworkers, interpersonal skills, and fit with the organization's culture.<br>5 - Formal qualification process using skills-based candidate identification and competency-based candidate identification. Screening is primarily used to assess compatibility with coworkers, interpersonal skills, and fit with the organization's culture.<br>Describe your organization's interviewing methods.<br>1 - No clearly defined interviewing process is utilized.<br>3 - Behavior-based interview questions (questions that center around past experiences and how the interviewee acted in those situations - e.g. "Provide an example of a goal you set in your last position and describe how you went about achieving that goal").<br>5 - A combination of Behavior based and Line Oriented or "Situation-based" interview questions: The Line Oriented interview incorporates a simulated environment reflecting the work environment the candidate is interviewing for. For example, the interviewee may be asked to put on a headset and answer mock customer questions from the interviewer. This methodology is used to provide insight as to how the candidate may perform on the job.<br>How is the performance of a new hire measured?<br>1 - There is no existing methodology to evaluate new hire performance.<br>3 - The organization uses an informal methodology to evaluate new hire performance. For example, the new hire's manager provides anecdotal feedback concerning the performance of the new employee.<br>5 - The organization uses a clearly defined formal methodology to evaluate new hire performance. For example, there are metrics directly tied to the new hire's performance that are consistently analyzed by management and communicated to the new hire.<br>What methodology does your organization utilize to hold hiring managers and recruiters accountable for the talent acquisition process?<br>1 - Hiring managers and recruiters are not held accountable by any formal measurement standard for the talent acquisition process.<br>3 - Hiring manager's and recruiter's accountability is qualitatively measured.<br>5 - Hiring manager's and recruiter's accountability is qualitatively and quantitatively measured (i.e. there are metrics in place to measure accountability). |

TABLE 9-continued

Exemplary organization of questions and exemplars associated with attributes and capabilities of a talent management domain

| | |
|---|---|
| Customer Alignment | To what extent does your organization assign higher performing agents/centers to high value customers?<br>1 - No customer value categorization exists (e.g. your organization does not segment your customers by high, medium, or low value)<br>3 - Customer segmentation exists but differing agent performance does not align to them. (e.g. Your organization does not assign higher performing agents to high value customers)<br>5 - Higher performing agents are assigned to high value customers. |
| Customer Care Culture | To what extent is 'customer care' communicated internally as part of your organization's brand?<br>1 - There is, no internal communication about brand as it relates to customer care.<br>3 - Periodic group activities are conducted to promote brand messaging strategy and reinforce customer-centric culture branding.<br>5 - Executive management regularly affirms brand values and customer-centric messaging strategy. All levels of management reinforce brand during daily activities and agents are expected to fulfill brand image. |
| Career Pathing | Which of the following best describes how job positions are created or modified in your organization?<br>1 - Job position creation is typically static and processes to make changes are often inconsistent or inefficient.<br>3 - Job position creation and refinement processes are defined but infrequently assessed to ensure that positions match the current business needs.<br>5 - Job position creation and refinement processes are well defined and regularly assessed to ensure that positions match the current business needs.<br>How would you describe the level of career path mobility in your company?<br>1 - Functional department career bubble (little or no mobility).<br>3 - Cross-functional career pathing occurs when personal connections are present.<br>5 - Cross-functional career pathing is part of talent management and goals. Opportunities across the business are communicated regularly.<br>To what extent are career paths defined in your company?<br>1 - Career path opportunities are unclear and may often not exist.<br>3 - Career paths are defined but they are not clearly communicated throughout the organization.<br>5 - Career paths are clearly defined and communicated throughout the organization.<br>Which of the following best describes your company's ability to hire internally?<br>1 - The organization mainly practices outside hiring.<br>3 - The organization utilizes an informal process to identify potential internal candidates before looking externally.<br>5 - The organization utilizes a formal process to identify potential internal candidates before seeking external candidates. |
| Organizational Design & Development | To what extent are employee roles and responsibilities (R&Rs) defined?<br>1 - (R&Rs) are unclear and may often not exist.<br>3 - (R&Rs) are defined but they are not clearly communicated throughout the organization.<br>5 - (R&Rs) are clearly defined and communicated throughout the organization.<br>To what extent are communications processes defined in your organization?<br>1 - Communications processes amongst organizational levels is minimally defined.<br>3 - Communications processes amongst organizational levels is defined based on the type and urgency of messages.<br>5 - Communications processes amongst organizational levels is clearly defined and there are multiple communication options that provide easy and rapid cascading of information and feedback. |
| Curriculum Development | How would you describe your company's training content?<br>1 - The training content covers only a description of the position's tasks.<br>3 - The training content covers a description of the position's tasks, and usually incorporates knowledge, skills, and abilities necessary for the job (Ex. General Customer Service training for a call center agent).<br>5 - The training content covers a description of the position's tasks, and consistently incorporates knowledge, skills, and abilities necessary for the job (Ex. General Customer Service training for a call center agent).<br>To what extent does your training content include training performance expectations?<br>1 - Performance expectations do not exist in the training content.<br>3 - Performance expectations exist but are not clearly defined in the training content.<br>5 - Performance expectations are clearly defined in the training content. |
| Onboarding Process | How quickly are New Hires provided with IT systems access?<br>1 - New Hires are frequently not granted (computer) systems access on their first day. Often times, it may take up to a week or longer to grant the new employee full facilities and systems access.<br>3 - New Hires are frequently granted (computer) systems access on their first day. If the New Hire is not granted full access on their first day, they typically gain full access within a few days.<br>5 - New Hires are consistently granted (computer) systems access on their first day.<br>How quickly are New Hires provided with facilities and systems access?<br>1 - New Hires are frequently not granted facilities access on their first day. Often times, it may take up to a week or longer to grant the new employee full facilities access. |

TABLE 9-continued

Exemplary organization of questions and exemplars associated with attributes and capabilities of a talent management domain

| | |
|---|---|
| | 3 - New Hires are frequently granted facilities access on their first day. If the New Hire is not granted full access on their first day, they typically gain full access within a few days.<br>5 - New Hires are consistently granted facilities access on their first day.<br>To what extent does your organization differentiate it's onboarding processes between different positions?<br>1 - Onboarding processes do not have position-specific differentiations (all positions have the same onboarding process).<br>3 - Onboarding processes have some position-specific differentiations. (some positions have a specific onboarding process specific to that role).<br>5 - Orboarding processes primarily have position-specific differentiations. (Virtually all, if not all positions have a specific onboarding process specific to that role).<br>Describe new hire orientation during your organization's onboarding process.<br>1 - No formal orientation exists.<br>3 - An informal orientation exists and focuses on establishing critical knowledge, skills, and abilities.<br>5 - A formal, comprehensive orientation exists and focuses on establishing critical knowledge, skills, and abilities as well as promotion of organization culture.<br>To what extent does your organization utilize mentors during the onboarding process?<br>1 - Mentor program is minimal or not established.<br>3 - Mentor program is informal. (There is a process in place to obtain a mentor but it is not necessarily encouraged for new hires).<br>5 - Structured mentor program is available to employees and encouraged. |
| Training Deployment | Describe the training delivery channels used in your company.<br>1 - Predominately classroom with some computer-based training. On-the-job training is conducted but typically there is no formal structure around this stage of training.<br>3 - A balance of classroom and computer-based training is supplemented with formal, on-the-job training.<br>5 - Blended learning approaches (classroom, online/web based, one-on-one coaching, self-study, job shadowing, lab and virtual class) is supplemented with formal on-the-job training.<br>Describe the timing and frequency of new product/service training.<br>1 - Product/service training is typically deployed during the product/offering's launch.<br>3 - Product/service training is frequently, but not always deployed before the product/offering's launch such that the contact center is prepared to field issues pertaining to the new product/offering on the first day it is available to customers.<br>5 - Product/service training is consistently deployed before the product/offering's launch such that the contact center is prepared to field issues pertaining to the new product/offering on the first day it is available to customers.<br>Which of the following best describes your organization's training methodology?<br>1 - Role-specific, one-dimensional training only (ex. Sales).<br>3 - Skill and capability-specific training is multi-dimensional (ex. Sales, Service).<br>5 - Skill and capability-specific training is balanced and multi-dimensional (ex. Sales, Service, Technical Acumen, Writing). |
| Training Metric Management | What kind of post-training performance evaluations are conducted in your organization?<br>1 - Immediate post-training tests are given that focus on recall and rote memorization versus skill acquisition and application. Curriculum objectives are simply reinforced.<br>3 - Multiple post-training mediums (e.g. test, survey) are given to assess the effectiveness of skill acquisition and application.<br>5 - Multiple post-training mediums as well as on the job performance are analyzed in order to evaluate training effectiveness. This is typically done via business scorecard metrics. Metrics performance drives future training opportunities.<br>Describe how training effectiveness is evaluated.<br>1 - Training effectiveness is not formally measured against curriculum objectives and training deployment methods.<br>3 - Training effectiveness is occasionally evaluated against curriculum objectives and training deployment methods. These evaluations are used to continually improve the training program.<br>5 - Training effectiveness is continually evaluated against curriculum objectives and training deployment methods. These evaluations are used to continually improve the training program. |
| Incentive Structure | Which of the following best describes the consistency of your organization's base salary?<br>1 - Base salary is consistent across similar roles.<br>3 - Base salaries are consistent relative to tenure with transparent ranges based on organizational role.<br>5 - Competitive base pay is linked to value creation with transparent ranges based on organizational roles.<br>Which of the following best describes your organization's incentive program?<br>1 - Incentive programs exist but employees do not understand how their incentives are calculated.<br>3 - A structured incentive program exists but it does not include pay for performance evaluations.<br>5 - Incentive programs include a pay for performance evaluation method that yields the appropriate rewards. |

TABLE 9-continued

Exemplary organization of questions and exemplars associated with attributes and capabilities of a talent management domain

|   |   |
|---|---|
|   | What are incentive program payouts tied to?<br>1 - The company's incentive program payout is ill defined and inconsistent.<br>3 - Payouts include company-wide performance against established metrics. Individual compensation based components may exist.<br>5 - Payouts include company-wide performance against established metrics as well as individual compensation based components.<br>Which of the following best describes how your company assesses the effectiveness of your company's reward program?<br>1 - Reward programs have no formal feedback processes, reviews, or benchmarking metrics in place.<br>3 - Reward programs are infrequently reviewed and benchmarked against critical program metrics. These metrics may include program activity, program participation, budget tracking, hierarchical approval, manager involvement, and award redemption at the organizational level.<br>5 - Reward programs include scheduled formal reviews at the organization and team levels using established metrics to ensure appropriateness, fairness and accuracy.<br>To what degree do target recipients have input into the design of the company's reward programs?<br>1 - Target recipients for rewards have no input into program design.<br>3 - Target recipients for rewards have opportunities to provide feedback to designers of reward programs.<br>5 - Target recipients for rewards are involved in the development, rollout, refinement and evaluation of reward programs. |
| Benefits Structure | Does your organization have a benefits mission statement?<br>1 - There is no formal mission statement.<br>3 - Informal benefits intentions and goals are defined.<br>5 - Formal benefits mission statement is made available to all employees.<br>How flexible is your company's benefits plan with respect to individual needs?<br>1 - Not flexible to employee needs.<br>3 - Benefits plans include some flexibility regarding employee needs such as tuition reimbursement and flex spending.<br>5 - Flexible plans are tailored to audience identification and specific needs.<br>Which of the following best describes how your company communicates the benefits plan?<br>1 - Informal benefits information provided upon hire.<br>3 - Plans communicated and explained during new hire orientation and re-enrollment.<br>5 - Benefits plans are regularly communicated throughout the year.<br>How are your company's benefits packages structured?<br>1 - Single tier - one choice for medical, dental, and vision.<br>3 - Single tier structure with several option for dental and vision plans.<br>5 - Multi-tiered, multi-option packages aligned to organization role level and based on Return on Investment (ROI).<br>How much does your company contribute towards the costs for medical, dental, vision, and life insurance?<br>1 - Employee pays all.<br>3 - Employee and Company both pay a portion.<br>5 - The company pays all.<br>How many weeks of paid vacation does your company provide?<br>1 - 1-2 weeks of paid vacation.<br>3 - 2-3 weeks of paid vacation.<br>5 - 3 weeks+ of paid vacation.<br>What miscellaneous benefits does your company provide to employees?<br>1 - The company does not provide any miscellaneous benefits.<br>3 - There are some miscellaneous benefits. Example - free bus passes.<br>5 - The Company provides a host of perks. Examples - paid sabbaticals, child care facilities.<br>Which of the following best describes the access you have to benefits information?<br>1 - A database application houses employee benefits information.<br>3 - A web portal with a user-friendly interface and unrestricted access houses benefits information.<br>5 - A web portal with a user-friendly interface and unrestricted access houses benefits information. Employees also have the ability to review and update their benefits through this portal.<br>Describe the availability of support you have when inquiring about benefits information.<br>1 - You must send an email to the Human Resources department.<br>2 - You have a number to call but only during standard business hours.<br>3 - You have a number to call with 24 hour support. |
| Non-Monetary Recognition | Which of the following best describes your organization's recognition program features?<br>1 - There is no formal recognition program.<br>3 - Recognition program exists and is aligned to the company mission, and values (i.e. "a one size fits all" type program).<br>5 - Program includes multiple options including day-to-day, informal and formal recognition aspects.<br>Which of the following best describes the maintenance of your organization's recognition program?<br>1 - No ongoing maintenance or continuous improvement efforts are in place.<br>3 - Ongoing maintenance performed annually. |

TABLE 9-continued

Exemplary organization of questions and exemplars associated with attributes and capabilities of a talent management domain

| | |
|---|---|
| | 5 - Program objectives are defined with procedures in place for ongoing maintenance and continuous improvement.<br>To what degree is senior leadership involved in the management of the recognition program?<br>1 - Senior leadership does not sponsor a recognition program.<br>3 - Senior leadership sponsors efforts but are not directly involved in defining the program.<br>5 - Senior leadership is directly involved in the creation of the recognition program and provide ongoing support for alignment to business objectives.<br>How are employee preferences for non-monetary rewards considered?<br>1 - Employee preferences for reward type is not considered. The reward type is derived from the sponsoring teams goals and desires.<br>3 - Employees have the opportunity to have input on reward types with a focus on corporate culture (for example company party vs. a goody bag).<br>5 - Individuals and teams provide input on reward types through employee surveys and other mechanisms to a dedicated recognition team based on inputs.<br>How consistently and frequently do non-monetary rewards (i.e. movie tickets, goody bags) align to individual performance?<br>1 - Rewards are provided infrequently and inconsistently.<br>3 - Rewards are provided frequently but inconsistently.<br>5 - Rewards are provided frequently and consistently.<br>How are individuals made aware of the non-monetary recognition program?<br>1 - Awareness is dependant on employee initiative to provide awareness of recognition.<br>3 - Leadership has the responsibility for communicating the rollout of the program. Program objectives, processes, and events are reinforced through communications using a variety of media (e-mails, brochures, class sessions).<br>5 - Multiple levels of management are involved in the program rollout. Strategic communication plans include a variety of media and reinforces program objectives and processes, as well as communicating achievements and events.<br>How is participation in the company's recognition program measured?<br>1 - Program participation is not tracked or is inconsistently tracked across the company.<br>3 - Program participation is closely tracked and measured across the company.<br>5 - Program participation is aligned to employee satisfaction measurements and used to refine future efforts within the recognition program. |
| Retention Management | How does your company capture the reasons why people leave?<br>1 - The company has an exit interview process for people leaving the company that provides anecdotal feedback to HR.<br>3 - The company has an exit interview process for people leaving the company that feeds back anecdotal and high level quantitative information to the business unit's management team.<br>5 - The company utilizes multiple methods (e.g. anonymous survey, HR interview, attrition research, competitor analysis) for quantifying reasons for people leaving roles.<br>Where does your organization primarily focus its efforts to retain employees?<br>1 - No formal retention program exists, or there is little or no differentiation based on performance levels.<br>3 - Retention programs primarily focus on top performers based on evaluations.<br>5 - Retention programs primarily focus on individual levels of performance.<br>How would you describe your company's understanding attrition reasons (the reasons why people leave the company)?<br>1 - The organization has a limited understanding of the levers that affect attrition.<br>3 - Levers affecting attrition are validated with company experience and data which points to the most common reasons why people leave the company.<br>5 - The organization consistently enhances its understanding of why employees leave as a result of conducting periodic attrition analysis (this process is characterized by the company creating employee profiles by categorizing them by competencies, and skills. As individuals leave, the organization can systematically analyze whether certain employee types leave more often than others based on their competency/skill profiles).<br>How does your organization align retention programs and processes to the reasons why people leave?<br>1 - Your organization does not fully understand the levers that affect attrition and are not addressed by the retention process.<br>3 - Programs are defined for the retention processes but frequently do not correlate to expected outcomes.<br>5 - Programs are defined and implemented for the entire talent lifecycle. The programs directly impact attrition levers and maximize potential results.<br>To what extent are leadership performance metrics tied to the retention program?<br>1 - Organizational leadership performance metrics are not tied to employee retention. Leadership has no accountability for retention program success or failure.<br>3 - Organizational leadership performance metrics are tied to high-level attrition data only. Leadership is accountable for attrition rates, but not the success or failure of the retention program.<br>5 - Leadership performance metrics are directly tied to root causes of attrition as indicators of overall success of the retention program. Leadership takes an active role in the continuous improvement and refinement of the retention program. |

TABLE 9-continued

Exemplary organization of questions and exemplars associated with attributes and capabilities of a talent management domain

| | |
|---|---|
| Performance Management | Describe the extent that Key Performance Indicators (KPIs) are established throughout the organization?<br>1 - Key Performance Indicators (KPIs) are not formally established. Independent metrics are used to measure performance at various levels of the organization.<br>3 - Key Performance Indicators (KPIs) are established within some levels of the organization (usually the highest levels).<br>5 - Key Performance Indicators (KPIs) are established throughout all levels of the organization and measure metrics performance against strategy and goals.<br>Describe the degree that overall business performance goals and targets are aligned with individual goals and targets.<br>1 - Overall business performance goals and targets are set across various levels of the organization, but are not fully integrated with individual goals and targets.<br>3 - Overall business performance goals and targets are set at all levels of the organization and are mostly aligned with individual goals and targets.<br>5 - Overall business performance goals and targets are set at all levels of the organization, established using internal and external benchmarks, and are closely aligned with individual goals and targets.<br>Which of the following best describes your company's performance management systems or technology?<br>1 - No performance management system and/or technology. Manual methods are used to generate reports.<br>3 - Dashboard technology exists with some automation in report generation.<br>5 - Performance management system exists with automation of dashboards, scorecards, and reports that identify root causes, trends and issues.<br>How is feedback incorporated into your performance management processes?<br>1 - No formal Performance Management feedback processes other than year-end reviews and beginning of the year goal establishment processes.<br>3 - Performance. Management feedback processes include periodic performance reviews (i.e. quarterly, semi-annually).<br>5 - Performance management feedback processes are dynamically and iteratively integrated into all key processes. |
| Management Dashboard | How are Key Performance Indicators (KPIs) used in a dashboard?<br>1 - KPIs are not formally established and therefore not available in a dashboard.<br>3 - Some established KPIs are available in dashboards. Drill-down reporting is not available for root cause analysis.<br>5 - All established KPIs are available in dashboards. Drill-down reporting for root cause analysis is enabled.<br>How is your management dashboard managed and maintained?<br>1 - No standardized procedures for security access or maintenance of dashboard. All dashboards are able to be manipulated by all users.<br>3 - Individual teams save and archive dashboards for ongoing maintenance while publishing in read-only formats to enable security and data integrity.<br>5 - Centralized management, maintenance, and security with change management processes to modify the dashboard and review data integrity. |
| Forecasting and Scheduling | What tools are used for forecasting and scheduling?<br>1 - Forecasting and scheduling is done with basic tools (i.e. Excel).<br>3 - Forecasting and scheduling done within workforce management applications.<br>5 - Dynamic forecasting and intra-day re-forecasting done within statistical modeling packages (i.e. SAS; with system linkage to workforce management application).<br>Describe the forecasting models used by your organization to understand scheduling impacts.<br>1 - Forecasting models are not used to understand scheduling impacts.<br>3 - Forecasting models based on historical trends are used to understand scheduling impacts.<br>5 - Forecasting models based on historical trends and statistical methods are used to understand scheduling impacts.<br>Which of the following best describes your company's scheduling optimization processes?<br>1 - Scheduling optimization processes are not utilized, usually resulting in intentional over-staffing to combat shrinkage.<br>3 - Scheduling optimization processes are loosely aligned to call volume forecasts.<br>5 - Scheduling optimization processes are integrally aligned with call volume forecasts, and include web-based shift requests (bidding), and time-off requests that are processed within a Workforce Management application.<br>Describe how shrinkage is managed within your call centers.<br>1 - Shrinkage is not managed or understood, and viewed as an inevitable cost of doing business.<br>3 - Shrinkage is managed, but not in control (high shrinkage).<br>5 - Shrinkage is tightly managed and viewed as little more than stealing.<br>Which best describes how adherence, availability, and occupancy metrics are managed within your call centers.<br>1 - Intra-day adherence, availability, and occupancy metrics are not established,<br>3 - Intra-day adherence, availability, and occupancy metrics are established but usually not formally used to determine scheduling and forecasting.<br>5 - Intra-day adherence, availability, and occupancy metrics are tracked with automated attendance notification systems, and are used to help optimize scheduling and forecasting. |

TABLE 9-continued

Exemplary organization of questions and exemplars associated with attributes and capabilities of a talent management domain

| | |
|---|---|
| Human Event Management | How would you describe your company's event mitigation plans?<br>1 - Mitigation plans focus on anecdotal and recent history with simplistic strategies for prevention.<br>3 - Mitigation plans create categories and potential frequencies. Most critical workforce processes drive prevention plans.<br>5 - Detailed risk analysis includes benchmarking and drives prevention plans to mitigate workforce issues. Budget is created and consumed for high risk scenario prevention activities. Frequent reevaluation of plans occurs due to customer market and social conditions.<br>Which of the following best describes your organization's event response and recovery training program?<br>1 - Preparation plans are rare, random efforts, with poorly defined responses to emergencies or critical, events. Formal training, exercises, and logistics analyses are rare or non-existent practices viewed as temporary inconveniences.<br>3 - Preparation plans are intermittent efforts intended to ready an appropriate response to an emergency or a critical event. Formal training, exercises, and logistics analyses are semi-occasional practices viewed as standard policy fire-drills (e.g., voluntary emergency evacuations).<br>5 - Preparation plans are ongoing, ranked, and prioritized efforts intended to ready an effective, rapid response to an emergency or critical event. Formal training, exercises, and logistics analyses are routine practices, rehearsed frequently, and viewed as a core competency in delivering value to customers, the community, workforce, and shareholders. |

TABLE 10

Exemplary organization of questions and exemplars associated with attributes and capabilities of a customer interaction domain

| | |
|---|---|
| Partner Relationship Management | What factors does your organization take in to account when partnering with other companies?<br>1 - Partnerships are driven purely by cost considerations.<br>3 - Partnerships are driven by cost structure and general alignment of business goals across organizations.<br>5 - Partnerships are driven by a shared business strategy and a strong understanding of each other's core competencies.<br>What is the incentive structure your organization shares with your partners?<br>1 - Incentive structures are mutually exclusive and result in behaviors that may negatively impact the customer experience.<br>3 - Incentive structures are mutually exclusive but aligned toward customer needs.<br>5 - The contracts your organization negotiates with your partners focuses on a shared incentive structure to meet customer needs.<br>How are partner processes defined?<br>1 - Process flows are separate and distinct for each company with understanding of handoffs at critical points.<br>3 - Process flows are integrated between companies with detailed understanding of handoff criteria for each.<br>5 - Process streams are compatible between companies and aligned to customer needs. Process streams are continuously evaluated for the value they add and designed to reinforce efficient handoffs.<br>Which statement best describes the accountability and understanding of customer ownership with your organization's partners?<br>1 - Accountability for performance, and an understanding of customer ownership is ill-defined.<br>3 - Your organization has established an internal scorecard designed to monitor your partners ability to meet the performance metrics as outlined in the partnership contract. Each party recognizes shared customer ownership.<br>5 - Organization and partner have a shared scorecard that is established based on the ability to meet customer needs, and highlights opportunities to continuously add value to the customer and partner relationship. |
| Integrated Customer Data Management | Which statement best describes your partner performance evaluation process?<br>1 - Views of partnership performance are generally one-sided and disputable due to lack of visibility.<br>3 - Shared performance metrics are agreed upon but customer data inconsistencies result in limited reliability.<br>5 - Shared performance metrics are developed around consistent and reliable data between organization and partners, ensuring partner relationship management accountability. |
| Integrated Workflow Management | To what extent does your organization share customer records with your partners?<br>1 - Partners have limited or no cross-systems access, frequently building a unique customer record in their own systems.<br>3 - Partners are required to simultaneously access multiple, un-integrated systems and often re-key all relevant information. |

TABLE 10-continued

Exemplary organization of questions and exemplars associated with attributes and capabilities of a customer interaction domain

|  |  |
|---|---|
|  | 5 - Compatible and complimentary workflow tools are integrated between organization and partners that provide a unified view of the customer, with sufficient information and collaborative workflows to address customer needs.<br>To what extent are shared processes supported by systems with your partners?<br>1 - Shared processes between organization and partners are characterized by multiple handoffs and overcoming multiple obstacles in order to meet the customer fulfillment requirements of each organization.<br>3 - Shared processes have explicit entrance and exit criteria handoff points while system support may be limited.<br>5 - Shared processes are supported by integrated systems for seamless handoff efficiency.<br>Which statement best describes your visibility into partner workflow status and issues (i.e. a call center agent creating a ticket to dispatch field support for a customer)?<br>1 - Workflow status and issues are primarily communicated manually (e.g. email, phone) between organization and partners.<br>3 - Workflow status and issues are communicated via standardized reports, based on a discrete view from each organization.<br>5 - Workflow status and issues are provided real-time based on information originating in both organization and partner systems.<br>Which of the following statements best describes the level of communication your organization has with it's partners?<br>1 - Management focuses on maximizing process efficiencies with little or no interaction with partners.<br>3 - Periodic reviews between organization and partnership management are scheduled to review shared process performance metrics.<br>5 - Daily interactions amongst organization and partner managers are held to set goals, minimize process variation, and collectively address workflow improvement opportunities. |
| Sales Force Alignment | To what extent are your product and service strategies aligned with sales goals?<br>1 - Product and service strategies are not aligned with sales goals.<br>3 - Product and service strategies developed by marketing management drive the development of sales goals, of which only sales leadership has accountability for<br>5 - Product and service strategies are developed by marketing and sales management and drive the development of sales goals, which all parties are accountable for.<br>Which statement best describes your sales organization structure?<br>1 - Product/service offerings define sales teams and overall organization(s). Product quotas are used to support strategy.<br>3 - Market segmentation needs drive alignment of sales organization. Quotas focus on product suites.<br>5 - Sales organization is defined by customer segmentation. Sales force alignment to customer lifetime value facilitates achievement of business strategy and revenue generation.<br>How would you describe the relationship between your company's sales and marketing organizations?<br>1 - Sales and Marketing are not aligned and are driven by disparate goals and objectives.<br>3 - Sales and Marketing groups are informally aligned and have partnerships based on perceived benefits of individual organizations.<br>5 - Sales and Marketing leadership are equal owners of revenue goals and are accountable for meeting them.<br>Which statement best describes your sales talent management program?<br>1 - Sales talent management programs exist but many times compete with other programs or have vague goals.<br>3 - Sales talent management programs exist in many areas to align sales force to functional areas of expertise and meet functional goals.<br>5 - Cohesive sales talent management programs incorporate training, incentives, mentoring, monitoring and overall employee empowerment to enable achievement of quantitative results. |
| Opportunity Management | To what extent does customer data drive your company's sales insight?<br>1 - Marketing research drives product definition and narrow view of sales opportunities in market.<br>3 - Rudimentary tools are used to garner insight into customer purchasing practices within market segments (i.e. forecast, actual sales units over time, surveys) and define potential customer opportunities.<br>5 - Thorough analysis of customer interaction data drives understanding of customer purchasing criteria and buying habits. Insight is used for ongoing refinement of sales and product lifecycles, and to provide near real-time feedback to sales force.<br>How are marketing campaigns created in your organization?<br>1 - ad-hoc marketing processes are developed around product offering and passed on to sales leadership to meet market demand.<br>3 - Marketing works with sales to understand market needs. A formalized process drives program definition and messaging materials.<br>5 - Marketing and sales co-author all campaigns. A formal standardized process culminates in discrete criteria for messaging, positioning based on needs, availability, and customer incentives (e.g. pricing, bundling).<br>How are forecasting and sales pipelines used in your opportunity management strategy? |

TABLE 10-continued

Exemplary organization of questions and exemplars associated with attributes and capabilities of a customer interaction domain

|  |  |
|---|---|
|  | 1 - Forecasts are created prior to product launch and based on business strategy for meeting revenue.<br>3 - Forecasts are created prior to product launch by market segmentation and infrequently updated. Informal understanding of sales pipeline exists.<br>5 - Sales pipeline and forecasts are created using customer segmentation and updated frequently based on sales success and customer satisfaction data, and used to define realistic sales quotas.<br>How would you describe your sales lead generation practices?<br>1 - ad-hoc lead generation methodology is quota-driven solely within Sales organization.<br>3 - Marketing and Sales share a collaborative standard process for identification and quantification of leads.<br>5 - Business-logic desktop sales technologies generate new/additive leads, identify products, and create value propositions that are continuously refined by Marketing and Sales leadership.<br>How are your sales prospects qualified?<br>1 - Prospects are rarely formally qualified. Primary sales goal is to sell as many units as possible.<br>3 - Prospects are qualified based on product pre-requisites. Stronger sales representatives perform some amount of matching to product needs.<br>5 - Prospects are qualified based on evaluation of product pre-requisites, buying history, and customer needs. Automated credit authorization is integrated into the qualification toolset for applicable sales. |
| Transaction Management | Which statement best describes your marketing messaging?<br>1 - Marketing message timing is inconsistent, generally provided at launch of campaign, and frequently relies on sales force interpretation.<br>3 - Marketing messaging is detailed, accurate, and consistently provided at launch of campaign.<br>5 - Marketing messaging is supported by technology that provides accurate information in a cohesive fashion prior and during the point of sale.<br>Which of the following best describes product positioning and expectation setting during a sale?<br>1 - Basic product positioning materials are created based on product requirements. Majority focus on sales quotas inhibits sales expectation setting.<br>3 - Marketing segmentation drives product positioning materials during sale. Limited amount of sales expectation setting performed by stronger sales staff and management.<br>5 - Customer segmentation and purchase feedback drives product positioning materials to enable offer generations that are aligned with customer needs. Expectations are consistently set that align with ability to fulfill customer needs.<br>How would you describe understanding of cross sell/up sell opportunities during a customer transaction?<br>1 - Knowledge or understanding of company's or individual business unit product mix is limited.<br>3 - Basic understanding of product mix and associated capabilities provides ad-hoc capability to sell other products and services.<br>5 - Holistic understanding of products and services is able to be integrated with each customer's needs to maximize opportunities for complimentary products and/or services.<br>Which statement best describes your scripting tools for sales transactions?<br>1 - No scripting tools or one size fits all scripting tools are provided focused on base product capabilities.<br>3 - Marketing segmentation-driven scripting tools that are provided at product launch with variations designed to meet each market's needs.<br>5 - Situational scripting tools aligned to customer segment are standard and continually refined based on success throughout product lifecycle.<br>How would you describe your organization's sales workforce alignment?<br>1 - Little or sporadic attempts to drive workforce capabilities with quotas as primary vehicle.<br>3 - Quotas and incentive plans are standard practice and generally support similar objectives.<br>5 - Quotas, Incentives, staffing needs, and evaluations are specifically inter-related and support a defined customer value optimization strategy. |
| Post Sales Support | Which of the following best describes your organization's sales wrap-up process?<br>1 - Product or service purchased is reviewed through a simple scripted sales recap with customer.<br>3 - Product or service purchased is reviewed with customer highlighting some benefits and/or anecdotal, potential issues.<br>5 - Data driven, targeted highlight of benefits and issues is performed prior to sale close. Emphasis on achieving customer delight via thorough recap of product or service offering purchased and future self-help resources integrated with reemphasis of customer needs.<br>Which statement best describes your sales fulfillment entrance criteria?<br>1 - Job aids and informal siloed knowledge serve as reminders for fulfillment criteria<br>3 - Job aids and some system guardrails ensure critical information is completed prior to order submission. |

TABLE 10-continued

Exemplary organization of questions and exemplars associated with
attributes and capabilities of a customer interaction domain

|  |  |
|---|---|
|  | 5 - Order capture tools are designed and implemented based on downstream fulfillment needs.<br>How are downstream fulfillment workflows initiated?<br>1 - More than one system is needed to transition order to fulfillment with little or insufficient integration.<br>3 - Integration of systems present for most common order types.<br>5 - Closure of sales initiates full integration into downstream fulfillment processes for all order types.<br>How do you measure the effectiveness of your post sales processes?<br>1 - General customer satisfaction metrics are used as a primary indicator of how much the organization's products and/or services exceeded customer needs (customer delight)<br>3 - Some internal data is used for increased understanding of customer delight but infrequently tied to performance targets.<br>5 - Customer satisfaction, churn rates, post sale inquires and fulfillment reject rates are evaluated against pre-established targets. Root cause analysis is integrated into Marketing and Sales processes. |
| Billing Strategy & Approach | Which statement best describes how your company's billing system(s) are integrated?<br>1 - Multiple independent systems centered around products and/or segmentation strategy.<br>3 - Multiple systems with varying levels of integration which are dependent on manual process steps to support data flow.<br>5 - Systems deployed enterprise-wide and allow convergence of billing data across multiple lines of business with flexibility for end to end integration to meet business conditions internally or externally.<br>Which of the following best describes your billing system functionality?<br>1 - Systems frequently require manual intervention to generate accurate bills. Higher level functionality is rarely pursued due to manual support costs.<br>3 - Systems can accurately generate bills but may be inflexible to growth or business changes. Higher level functionality is focused on pricing capabilities (e.g. promotions, discounts).<br>5 - Robust, scalable and flexible billing platform with ability to handle multiple sources of complex data simultaneously and higher level billing functions (e.g. promotions, renewals, disconnects, regulatory and tax).<br>To what extent are contract and pricing management systems integrated with your billing system?<br>1 - Siloed contract management, pricing management, billing, metering, and revenue function. Management of data with multiple systems.<br>3 - Contract management, pricing management, billing, metering and revenue functions are, partially integrated.<br>5 - Contract and pricing data flows directly into core financial processes which are integrated with billing. |
| Rating Products and/or Services | Which statement best describes your billing rating engine functionality?<br>1 - The rating engine is static rating engine with limited flexibility for rule changes. Disparate rating and promotion rules established without target customer consideration.<br>3 - The rating engine has partial flexibility for limited identification of events. The focus is on maintenance of static services (e.g. postpaid billing, prepaid billing, mediation, network).<br>5 - The rating engine is a highly configurable, real-time rating engine that can charge for any type of event, based on any customer or service attribute.<br>How would you describe your service bundling options as they relate to bill delivery?<br>1 - There are no service bundling options, and limited cross product discounting functions.<br>3 - There are limited service bundling options as well as restricted discounting functions which are business-centric as opposed to customer centric.<br>5 - There are rating and promotion rules to match pricing and promotion needs to specific target customers.<br>Which of the following best describes the capabilities of your rating engine?<br>1 - Separate bills for separate products/services are generated by separate rating system(s) for unique services.<br>3 - Multiple products/services can be rated by a single rating engine.<br>5 - Multi-service bundling and cross-product discounting functions available as part of the rating process.<br>How would you describe your change management capabilities for rate changes?<br>1 - Rate changes and promotional pricing is problematic across multiple channels and systems or requires extensive coding and testing.<br>3 - Repetitive, manual coding and testing is required to manage rate changes and pricing for new products and services.<br>5 - There is the ability to set and test rate changes and transfer to production without costly development cycles. |
| Billing Cycle Management | How does your organization define billing cycles?<br>1 - Billing cycles are defined by the business with no customization for customer preference/need.<br>3 - Some bill cycle flexibility is available to address customer preferences and/or business needs.<br>5 - Billing cycles are available to address customer needs or flexibility based on company billing efficiencies (e.g. geography, customer segmentation, cycle leveling). |

TABLE 10-continued

Exemplary organization of questions and exemplars associated with
attributes and capabilities of a customer interaction domain

|  |  |
| --- | --- |
|  | To what degree is your organization able to process multiple invoice types in a single billing cycle?<br>1 - Only a single invoice type can be handled in a single cycle.<br>3 - Detailed and/or summary invoices are handled within a single bill cycle.<br>5 - Detailed and/or summary invoices are handled within a single bill cycle, along with the ability to handle retail and/or wholesale statements.<br>Which of the following best describes your billing system's ability to back-out and re-bill?<br>1 - Cycle back-out and re-bill requires manual processes.<br>3 - Cycle back-out and re-bill are automated.<br>5 - Partial cycle back-out and re-bill are automated.<br>How does your billing system accommodate billing cycle changes?<br>1 - Unable to change bill cycles. New accounts must be established in order to complete bill cycle changes.<br>3 - Manual changes are required to move customers from one cycle to another. If liability is transferred from one account to another, the cycle must be manually changed first.<br>5 - Changes to account hierarchy structures and transfer of liability will automatically change the bill cycles of the accounts without causing billing problems.<br>Which of the following best describes your billing system's ability to prorate charges?<br>1 - No pro-ration of price plans or discounts. Bill cycle must start on account inception date or accounts will not be activated until the next cycle begins.<br>3 - Pro-ration of price plans based on cycle definition, but no proration of discounts.<br>5 - Pro-ration of price plans and discounts based on cycle definition and management.<br>Which of the following statements best describes your billing cycle processing?<br>1 - Ability to run one bill cycle at a time with no overlap. System is in place to manage bill cycle production but has no ability to view status of each process step or to start/stop individual processes.<br>3 - Ability to run only one bill cycle at a time. Robust systems are in place to manage bill cycle production and ability to start/stop billing steps.<br>5 - Ability to run multiple billing cycles at one time. Robust systems are in place to manage bill cycle production and start/stop cycle steps.<br>Which of the following statements best describes your billing cycle verification process?<br>1 - Cycle verification process is highly manual, leading to significant cycle release delays.<br>3 - Bill cycle verification process combines automated checks and manual approval, adding to the total cycle time.<br>5 - Automated processes are in place to validate bill content and to create reports for review of exceptions and valid bill content. |
| Promotion Management | Which statement best describes how your organization's billing system(s) support targeted promotions efforts?<br>1 - The systems support promotions that are not targeted to a particular customer segment or based on patterns of service.<br>3 - The systems support promotions targeted to pre-defined groups of customers based off of high level channel strategy and general customer demographics.<br>5 - The systems support targeted and personalized promotions and campaigns, pricing based on particular patterns of service to particular customers.<br>Which of the following best describes your organization's pricing strategy in regard to promotion management?<br>1 - There are only single price points at the customer and product level with fragmented ability for adjustments.<br>3 - The organization has pricing matrices which incorporate a limited set of product features and customer demographics.<br>5 - There are multi-tier, rules-based pricing matrices to manage base prices and adjustment at the customer and product level.<br>To what extent are you able to measure the effectiveness of pricing and promotional strategies?<br>1 - There is limited capability to accurately measure the effectiveness of pricing strategies.<br>3 - There is the ability to measure effectiveness of pricing strategies within channels and promotions.<br>5 - There is the ability to measure effectiveness of pricing strategies across multiple channels and promotions.<br>To what degree is your organization able to optimize your promotional efforts?<br>1 - There is a "one-size-fits-all" approach with little analysis or differentiation between promotional strategies.<br>3 - There is a limited ability to generate targeted promotional investments driven by analysis and anecdotal data.<br>5 - There is an analytical, evidence-based approach to optimize promotional investments and generate more effective and economical promotional strategies.<br>To what extent does your firm utilize third party Partners in conjunction with your promotional efforts?<br>1 - No use of third party partners or affiliation programs.<br>3 - Limited use of third party partners or affiliation programs.<br>5 - Incorporation of third party and partner advertising and promotions. |

TABLE 10-continued

Exemplary organization of questions and exemplars associated with attributes and capabilities of a customer interaction domain

| | |
|---|---|
| Revenue Assurance | Which of the following best describes your revenue assurance methodology?<br>1 - One-time fix solution.<br>3 - Series of point solutions driven by professional services audits of departments.<br>5 - Iterative, enterprise-wide undertaking with transaction evaluation through the entire revenue lifecycle.<br>Which of the following best describes your organization's revenue assurance department?<br>1 - There is no formal revenue assurance department.<br>3 - There is a revenue assurance department or function however it is not well defined nor aligned.<br>5 - There is a specific revenue assurance department or function with a well defined and repeatable methodology.<br>Which of the following best describes your organization's revenue assurance system capabilities?<br>1 - There is an exception-based billing reconciliation with a manual administrative process.<br>3 - There is an automated trend reporting and alignment of revenue streams to general ledger during the billing process, but not during the rating process. There is a lack of root cause analysis on problems that are identified.<br>5 - There is an automated revenue leakage detection to drive root cause analysis. There is also the ability to create trending during real time, rating in order to detect and fix problems prior to billing.<br>Which statement best describes ownership of the revenue assurance function in your organization?<br>1 - Billing group control and responsibility.<br>3 - Department head control and responsibility.<br>5 - Executive control and responsibility.<br>To what extent is the revenue assurance function of your organization involved in process development?<br>1 - Revenue assurance function is not considered in the current process.<br>3 - Business processes are reactively adapted to fix revenue leaks.<br>5 - Revenue assurance function is a key input to process development and cost management, particularly in product/service development process. |
| Routing | Which statement best describes your company's customer routing solutions within communication channels?<br>1 - Homegrown solutions supporting basic communication channels that have unique routing needs.<br>3 - Discreet, proprietary solutions allow partial integration across channels. Varying levels of multi-channel support exist and include moderate to high IT support.<br>5 - Single communications platform that supports voice, automated voice, chat, agent-assisted chat, email, web, guided speech IVR, speech recognition enabling multi-channel routing with minimal IT support.<br>Which of the following best describes how customer data is presented to agents?<br>1 - Historical customer data is presented to agents without integrated customer view across channels.<br>3 - Historical customer data is presented to agents with standardized scripting and treatment options across multiple interaction channels.<br>5 - Contextually-driven customer data is presented to agents through integrated interaction channels that enables personalized scripting, positioning, and overall messaging.<br>Which statement best describes the business logic and rules used to route customers to appropriate queues?<br>1 - Business logic & rules for routing customers to the optimal queue is basic and frequently results in transfers to other queues.<br>3 - Business logic & rules for routing customers to the optimal queue is sufficiently developed and often unique per channel. They are usually duplicated across channels and sites with high dependence on IT coding, revisions and updates.<br>5 - Business logic & rules for routing customers to ideal queues are based on customer segmentation, need, value, and complexity. Interaction channels are usually integrated and have quality control processes for additional business rules.<br>What types of metrics are used to determine how a customer is routed?<br>1 - Volume-based metrics (e.g. calls per hour, queue size, abandonment) are used to determine how a customer is routed.<br>3 - Agent performance metrics (e.g. contacts per agent, handle time, utilization, first call resolution) are used to determine how a customer is routed.<br>5 - Agent performance metrics and customer interaction metrics (e.g. escalation rate, transfer rate, cross-sell/up-sell) are correlated to determine how a customer is routed.<br>Describe your call routing strategy.<br>1 - Call routing strategy is based on core products or services.<br>3 - Call routing strategy is based on market segmentation of core products or services .<br>5 - Call routing strategy is based on market and customer segmentation of core products or services. |

TABLE 10-continued

Exemplary organization of questions and exemplars associated with
attributes and capabilities of a customer interaction domain

| | |
|---|---|
| Contact Handling | Which statement best describes your company's contact handling strategy?<br>1 - Contact handling strategy is based on current technology and agent skill sets.<br>3 - Goals and targets for handling interactions define the handling strategy, technology, and skill set requirements.<br>5 - Correlated customer interaction data, segmentation data, and operational costs drive the goals and targets for handling interactions that define the handling strategy.<br>What are the primary goals of your company's contact handling strategy?<br>1 - The primary goal is minimizing interaction time.<br>3 - The primary goal is meeting acceptable service and customer satisfaction levels while staying within handle time targets.<br>5 - The Primary goal is maximizing customer service and satisfaction levels.<br>What types of contact scenarios are used to create contact handling processes?<br>1 - Contact handling processes are created from a small set of customer contact scenarios that represent the most common contact reasons.<br>3 - Contact handling processes are created from customer contact scenarios that represent the most common contact reasons across all interaction channels.<br>5 - Contact handling processes are created from customer contact scenarios that represent channel-specific interactions, and regularly refined against current customer interaction data.<br>How would you describe the basic technology that supports contact handling?<br>1 - ACD (Automated Call Distribution) technology allows customers to navigate to correct agent. Pre-agent information and transactional capabilities are not available to the customer.<br>3 - IVR and web services technology allows customers to navigate to correct agent. Basic information and transactional capabilities are available to the customer.<br>5 - Robust IVR and web services technologies include integrated customer views so customers can get to the correct agent. High level of support for self-service customer transactions (e.g. submit a ticket, dispute bill, pay bill).<br>What types of information or transactional capabilities are available to the customer before reaching an agent?<br>1 - Basic information and transactional capabilities are not available to the customer.<br>3 - Basic information and transactional capabilities are available to the customer.<br>5 - High level of support for self-service customer transactions (e.g. submit a ticket, dispute bill, pay bill).<br>To what degree are agent contact handling tasks automated?<br>1 - Some automation of agent tasks that present basic customer information after initial information is entered manually (e.g. auto-fill or customer search capabilities).<br>3 - Some automation of agent tasks such as pre-populated customer and account info from IVR.<br>5 - Most agent workflows are automated (e.g. pre-populated account, complete fulfillment, post call wrap-up).<br>Which statement best describes how contact handling metrics are used to schedule agents?<br>1 - Basic contact handling metrics (e.g. volume, average handle time, abandonment are manually used to schedule agents.<br>3 - Intra-day contact handling metrics and performance targets are integrated into workforce management (WFM) tools to optimize agent schedules.<br>5 - Intra-day contact handling metrics and performance targets are integrated into workforce management (WFM) tools to optimize agent schedules, and model optimal contact handling strategies.<br>What types of self-service technology exists for customers, for the purposes of reducing call volume?<br>1 - Customer-facing web portals with limited self-service capabilities.<br>3 - Customer-facing web portals are primary vehicle with varying levels of functionality based on market needs for product and/or service. Evaluation of effectiveness is ad-hoc or infrequent. Agents input underutilized in design and implementation.<br>5 - Organization has a well defined self-service strategy that includes multiple platforms with a primary goal to decrease call volume. Customer segmentation and analysis of contacts is frequently evaluated to drive increased functionality. Agent input is utilized in design and implementation. |
| Resolution Workflow Management | Which statement best describes your contact resolution strategy?<br>1 - Contact resolution is a limited part of overall strategy with greater focus on call handling time.<br>3 - Contact resolution is a part of the contact center strategy, including agent training in technology solutions (i.e. Customer Relationship Management (CRM)).<br>5 - First Call Resolution (FCR) is an integral part of contact handling strategy, including routing, and agent training in technology solutions and performance coaching. Advanced CRM technologies are designed and implemented to support follow-up, escalations, and thresholds.<br>Which of the following best describes the customer interaction applications that support your call resolution workflows?<br>1 - Multiple applications are used to support call resolution workflows, with little or no ability to provide a comprehensive view of the customer.<br>3 - Integrated applications are used to support call resolution workflows, and provide a comprehensive customer view within individual interaction channels. Limited customer information is integrated into workflows. |

TABLE 10-continued

Exemplary organization of questions and exemplars associated with attributes and capabilities of a customer interaction domain

| | |
|---|---|
| | 5 - Single platform applications are used to support call resolution workflows, and provide a comprehensive customer view with access to real-time and historical information across interaction channels. Customer information is integrated into workflows.<br>To what extent do knowledge management systems support call resolution workflows?<br>1 - No formal knowledge management system exists, and access to a knowledge database is limited or restricted. Call resolution mostly relies on agent knowledge and manual documentation,<br>3 - No formal knowledge management system exists, but a knowledge database with static and dynamic features, usually having advanced problem/solution search capabilities, can be accessed. Call resolution mostly relies on agent knowledge and manual documentation.<br>5 - A formal knowledge management system is used to support call resolution workflows. Call resolution is supported by system functions that include advice-based responses within process steps, augmenting agent knowledge and manual documentation.<br>To what extent are call resolution workflows supported by systems?<br>1 - Call resolution workflows are not supported by systems or may be scripted for call resolution.<br>3 - Call resolution workflows are supported by systems with formal, static workflow scripting rules that are modeled on pre-determined common customer scenarios.<br>5 - Call resolution workflows are supported by systems with automated dynamic scripts based on customer, product, agent, and skill level. Step-by-step rules-driven workflows utilize automated customer and interaction data.<br>Which statement best describes where call resolution workflow metrics are derived?<br>1 - Contact resolution metrics are primarily derived from customer satisfaction scores.<br>3 - Contact resolution metrics are derived from customer satisfaction scores and other internal metrics (e.g. contact reason callbacks, handle time, time between callbacks).<br>5 - Contact resolution metrics are derived from customer satisfaction scores, other internal metrics (e.g. contact reason callbacks, handle time, time between callbacks), and supplemented with external survey data to assess the contact resolution strategy and optimal targets. |
| Voice | Which of the following best describes your organization's network platform technology in regards to connecting a customer to call center agents?<br>1 - Main focus is on routing of calls using DTMF, rather than speech or natural language, without attempting to complete transactions or resolve issues within the automated system.<br>3 - Some use of advanced speech recognition providing automation for transactional and informational resolutions. Speech vocabulary is not developed to handle more advanced transactions. The interface is consistent.<br>5 - Advanced speech recognition is integrated into all levels for consistent and effective resolution rate for transactional and informational issues. Full set of vocabularies to enable effective self-service completion across all areas including Natural Language Recognition.<br>Please describe the navigation functionality of your ACD or IVR technology.<br>1 - Single level ACD or IVR with limited path selection and functionality. Little or no capability for containment.<br>3 - Multi-level IVR delivered through tactically engineered hierarchy. Contact containment strategies are employed based on technology capabilities.<br>5 - Multi-level IVR delivered through strategically engineered hierarchy with continual call flow analysis feeding containment strategies. Agent input into design and customer interface.<br>To what extent are you able to capture and analyze ACD/IVR metrics?<br>1 - Limited ability to captured information on ACD/IVR transactional completion rates or customer navigation paths.<br>3 - Detailed metrics on ACD/IVR completion rates drive periodic review and redesign of menu and path hierarchy.<br>5 - Extensive metrics and path analysis on ACD/IVR containment and transfer rates refines understanding of customer needs. Continual evolvement of navigation path blends from analysis of customer needs, containment strategy and usability.<br>Please describe the level of functionality contained within your voice routing technology.<br>1 - Account functionality basic with limited transactional services (e.g. history, balance inquiry and payment service).<br>3 - Account functionality consists of a comprehensive view of customer information with transactional capabilities (e.g. history, payment services, account update, feature additions and billing information).<br>5 - Fully integrated, fully functioning account management services, service ticketing and billing dispute resolution is available to consumers, mirroring live agent capability. |
| Web & Chat | How does your company's website present customer service or troubleshooting information to customers?<br>1 - Frequently Asked Questions (FAQs) are available to customers utilizing links on the website. There is limited to no search functionality incorporated into the website.<br>3 - Customers can access a knowledge base through an FAQ. Customers are also able to search the website contents via a key word search feature.<br>5 - Fully integrated knowledge base supporting consumer inquiries with real-time resolutions through the use of a natural language search. |

TABLE 10-continued

Exemplary organization of questions and exemplars associated with
attributes and capabilities of a customer interaction domain

| | |
|---|---|
| | Which of the following best describes your website's sales and sales support functionality?<br>1 - Sales and sales support functionality is limited to product and service, profiles with little or no support of order taking or escalation to live agent for sales order questions and completion.<br>3 - Detailed product and service offerings are arranged in intuitive groupings based upon market segmentation.<br>5 - Website functionality includes a real-time shopping cart, cross-sell/up-sell before and during checkout and order tracking capabilities are updated automatically.<br>Which of the following best describes your service ticketing processes?<br>1 - Service issues are not qualified. Ticket creation requires customer to input product details and customer information. Live agent follow-up contact is required to gain additional detail.<br>3 - Service issues are qualified via basic templates. Ticket creation contains some validation of customer and product information prior to submission. Live agent follow-up contact is frequently required.<br>5 - Interactive troubleshooting and service issue qualification integrated into workflow. Customer and product information are gathered as natural steps when unable to resolve. Complete, validated ticket results with infrequent need for agent follow-up.<br>If available, how is online chat functionality utilized on your company's website?<br>1 - Chat channel is offered indiscriminately throughout the website. Little or no scripting support to gather information and resolve customer inquiry.<br>3 - Chat channel is available on website 'Contact Us' pages. Used as contact mitigation rather than revenue driving channel. Agents utilize auto-scripting and use Frequently Used Sayings to resolve customer issue.<br>5 - Automated scripts provided for simple to resolve contacts using existing website functionality. Chat is strategically offered when customer issue complexity is high or is deemed high value (revenue, drop-out, up-sell). |
| Email | To what degree is your agent e-mail system integrated with network technologies in your organization?<br>1 - Email is on a homegrown platform with limited integration across network technologies.<br>3 - Incoming e-mail is integrated with network technologies to enable basic attachment functionality to customer accounts.<br>5 - Incoming and outgoing e-mail are facilitated and captured within the CRM platform becoming an integrated part of account history.<br>To what extent are you able to qualify customer issues through your e-mail channel prior to receipt by an agent?<br>1 - Little or no information gathering performed prior to email submission. Customers are simply given an email address.<br>3 - Email integrated into website and uses standard template to quality issues for routing purposes.<br>5 - Integrated website email with parsing intelligence to evaluate customer and issue qualification to provide real-time resolution when available.<br>Please describe the auto-response functionality of your e-mail system.<br>1 - Basic auto-response acknowledges receipt of email.<br>3 - Basic contextual auto-response capabilities based on defined templates.<br>5 - Advanced auto-response with hyperlinks to knowledge base and two-way customer update capability that provides for a single customer record of all interactions.<br>With regard to your e-mail system, which of the following best describes your organization's issue resolution process?<br>1 - Individual contact responses are written free-hand, by the agent, for each individual response.<br>3 - Issue resolution is completed by the agent via auto-populated templates to ensure consistent messaging.<br>5 - Subsequent contact is facilitated via auto-populated content generated from issue categorization and/or resolution. Inclusion of context sensitive information includes knowledge base links and customized cross-sell/up-sell based on customer needs. |
| Live Agent | Please describe your network platform across all live agent contact channels.<br>1 - Multiple network technologies are utilized for each interaction channel (Chat, Email, Phone) which require separate queue management.<br>3 - Single network technology per interaction channel is integrated via separate solutions to provide a holistic queue structure.<br>5 - IP Telephony/Network-centric technology unifying contact channel queue and allowing prioritization by incoming channel. Single point management with proactive monitoring.<br>Which of the following best describes your organization's contact transition technology?<br>1 - No use of Computer Telephony Integration (CTI) technologies. Customer information is not transferred to the agent desktop<br>3 - Limited use of CTI or IVR technologies enables basic customer information to be transferred to the agent desktop.<br>5 - A holistic customer view is created from CTI/IVR information capture and is combined with account information, contact history, and prioritized contextual workflow choices to meet customer need.<br>Which of the following best describes your firm's application management practices for live agents? |

TABLE 10-continued

Exemplary organization of questions and exemplars associated with attributes and capabilities of a customer interaction domain

|   |   |
|---|---|
| | 1 - Multiple applications on a desk top without a standardized application format.<br>3 - Agent applications are organized in an optimal manner while trying to reduce the number of clicks required for navigation. Data entry and navigation within the applications is a manual process.<br>5 - Automated call assistant, utilizing speech recognition, provides agent application navigation, customer data capture and workflow completion. |
| Voice of the Customer Integration | At what organizational levels does your company measure transactional customer satisfaction?<br>1 - Transactional customer satisfaction is not measured at any organization level.<br>3 - Transactional customer satisfaction is measured at the enterprise level but excludes measurement at the team and agent level.<br>5 - Transactional customer satisfaction is measured at the enterprise, team, and agent level.<br>Who in your organization has accountability for customer satisfaction (CSAT) targets?<br>1 - No assigned accountability for CSAT target achievement.<br>3 - Contact center management has accountability for CSAT target achievement.<br>5 - Contact center team managers and agents have primary accountability for target achievement. |
| Survey Sampling Methodology | Which statement best describes the use of a statistically significant sample size when collecting and measuring customer satisfaction information?<br>1 - Statistically valid sample size is not used.<br>3 - Statistically valid sample size is collected for the entire center (95% confidence level with +/-5% error range).<br>5 - Statistically valid sample size is collected for the entire center, as well as at the team or agent level (usually represents a minimum of 5 per agent per time period and 7 per team manager per time period).<br>To what degree are customer groups and segments represented in customer satisfaction sampling for statistical purposes?<br>1 - Not all customer groups and segments are adequately represented in sampling.<br>3 - All customer groups are adequately represented in sampling, but there is insufficient data for analyzing every customer segment.<br>5 - All customer groups are adequately represented in sampling, with a sufficient sample size for analyzing all customer segments.<br>To what degree are call types and individual interaction channels represented in customer satisfaction sampling for statistical purposes?<br>1 - Sampling scheme is not representative of a mix of call types or interaction channels (Live Agent, IVR, email, and Web contacts).<br>3 - Sampling scheme is representative of a mix of call types and interaction channels.<br>5 - Sampling scheme is representative of each call type and, interaction channel (Live Agent, IVR, email, and Web). Increased quotas (desired # of samples) are sometimes used to get more insight into known trouble spots. |
| Questionnaire Design | What mix, if any, of qualitative and/or quantitative methods are used to collect survey response data?<br>1 - Qualitative survey information is gathered (i.e. free-form text comments).<br>3 - Quantitative survey information is gathered (i.e. ratings on a scale of 1 to 10).<br>5 - Quantitative and qualitative survey information is gathered. Transactional quality and other service aspects (i.e. hold time, resolution) are usually included.<br>Which of the following best describes the focus of the content within customer satisfaction surveys?<br>1 - Survey content is solely focused on the most recent contact experience.<br>3 - Survey content is focused on the most recent and historical contact experiences.<br>5 - Survey content is focused on items that can be operationalized, the most recent and historical contact experiences. |
| Voice of the Customer Reporting | Which best describes how customer satisfaction information is reported?<br>1 - Customer satisfaction information is only reported at the end of a predefined data collection period (i.e. quarterly batch feed).<br>3 - Customer satisfaction information can be reported on a frequent predefined basis (i.e. batch feed) as well as when needed, but does not display real-time survey response data.<br>5 - Customer satisfaction information is reported through a customizable reporting mechanism and can display real-time survey response data, which is integrated into dashboards.<br>How would you describe your organization's dissatisfied customer alert processes?<br>1 - No alert processes exist to flag dissatisfied customers.<br>3 - Dissatisfied customer alerts are provided to the contact center within 24-48 hours of the response, with no formal process for tracking alert follow-ups, escalations, callbacks.<br>5 - Dissatisfied customer alerts are provided to the contact center within 24-48 hours of the response with a formalized process for tracking alert follow-ups, escalations, and callbacks.<br>To what extent is there access to raw customer satisfaction data?<br>1 - No ability to access raw customer satisfaction data (individual survey responses).<br>3 - Raw customer satisfaction data (individual survey responses) is received periodically.<br>5 - Raw customer satisfaction data (individual survey responses) is accessible through a real-time dashboard for the most current information and querying purposes. |

TABLE 10-continued

Exemplary organization of questions and exemplars associated with
attributes and capabilities of a customer interaction domain

| | |
|---|---|
| Data Integration and Linkage Analysis | Which of the following best describes how customer satisfaction data is generally analyzed?<br>1 - Limited trending and/or comparative analysis is conducted on customer satisfaction data.<br>3 - Statistical correlation and/or key driver analysis is conducted on customer satisfaction data to identify important customer behaviors.<br>5 - Statistical correlation analysis is conducted to link customer satisfaction data to other interaction information such as AHT, service levels, quality audits and employee satisfaction.<br>To what extent does your firm link customer satisfaction data to other metrics?<br>1 - Customer satisfaction data is not linked to other metrics.<br>3 - Customer satisfaction data is usually linked to agent-based metrics (i.e. tenure or training time).<br>5 - Contact center satisfaction data is usually linked the impacts of customer loyalty such as churn or customer lifetime value metrics.<br>To what degree are the root causes of customer satisfaction fluctuations understood?<br>1 - No analysis is performed to understand the root causes of customer satisfaction fluctuations.<br>3 - The root causes of customer satisfaction fluctuations are analyzed through correlation to interaction processes and metrics.<br>5 - The root causes of customer satisfaction fluctuations are analyzed through correlation to interaction processes and metrics, as well as other customer and business processes throughout the organization. |
| Voice of the Customer Process Alignment | How is customer satisfaction data used to improve customer interaction processes?<br>1 - Customer satisfaction data is either occasionally or not used to improve customer interaction processes.<br>3 - Customer satisfaction data is primarily used to improve customer interaction processes, but is usually not part of a formalized process improvement methodology.<br>5 - Customer satisfaction data is used to improve customer interaction processes, and is an integral part of a formalized process improvement methodology (i.e. Six Sigma). |
| Quality Monitoring Process | How is call monitoring conducted within your organization?<br>1 - All monitoring is conducted remotely.<br>3 - Most monitoring is conducted remotely with little use of side-by-side monitoring.<br>5 - Advanced speech recognition is used to monitor the majority of calls, with live, side-by-side monitoring for calls that meet specific criteria.<br>How does your firm determine the number of times an agent is monitored for quality over a given period of time?<br>1 - Set number of monitoring sessions over a specific time period (ex: 4 times per agent per month).<br>3 - Number of monitoring sessions is determined by previous agent performance (ex: agent-focused monitoring).<br>5 - Number of monitoring sessions is determined by previous agent performance (i.e. agent-focused monitoring) and by most frequent customer issues (issue-focused monitoring).<br>Who performs the Quality Monitoring?<br>1 - Monitoring is usually only performed by a quality evaluator.<br>3 - Monitoring is conducted by quality evaluators as well as immediate supervisors.<br>5 - Monitoring is conducted by quality evaluators, immediate supervisors, and subject matter experts.<br>How would you describe the quality monitoring process your firm uses?<br>1 - Random generation of calls to monitor and then monitoring a variable number of calls.<br>3 - Random generation of calls to monitor, and then monitoring a statistically valid number of calls.<br>5 - Monitoring a statistically valid number of, calls, as well as exception-based monitoring only on under-performing agents identified through previous advanced speech recognition monitoring.<br>What type of call quality monitoring tools if any, does your organization employ?<br>1 - Lack of systematic call quality monitoring tools.<br>3 - Automated system that records calls for post-call monitoring purposes, feedback to agents, and access to raw data.<br>5 - Automated system call recordings are tied with dashboard reports that enable employees to view evaluations and dispute scores.<br>To what extent does your firm perform calibration sessions and ensure consistency across the quality monitoring process?<br>1 - Regular calibration sessions occur among quality monitors to ensure scoring consistency.<br>3 - Calibration sessions occur between and across sites to ensure scoring consistency. Variance targets are established, monitored, reported and actively managed.<br>5 - A calibration program is established with owners among management and agents. Agents assess their own performance and calibrate against a quality evaluator's scoring to continuously refine quality standards. |

TABLE 10-continued

Exemplary organization of questions and exemplars associated with attributes and capabilities of a customer interaction domain

| | |
|---|---|
| Quality Feedback Process | How are quality targets used to drive continuous improvement?<br>1 - Quality score targets are not used to drive continuous improvement.<br>3 - Quality score targets are tied to key performance drivers with no formal continuous improvement modification process.<br>5 - Quality score targets are set through analysis of key performance drivers and have a formal continuous improvement modification process.<br>Which of the following best describes how quality targets are reported?<br>1 - Quality target achievement is not reported via agent scorecards or formal reports.<br>3 - Quality target achievement is reported via agent scorecards and is included in performance management processes.<br>5 - Quality target achievement, call recordings, and other agent performance metrics are integrated into, a dashboard.<br>Who is accountable for customer experience quality target achievements?<br>1 - Site management has accountability for target achievement.<br>3 - Site management and team leads have accountability for target achievement.<br>5 - Site management, team leads, and agents have accountability for target achievement.<br>Who is responsible for providing quality score feedback to agents?<br>1 - Quality monitoring personnel (non-managerial) are responsible for providing quality score feedback to agents.<br>3 - Team managers are responsible for providing quality score feedback to agents. Critical issues have a feedback loop of less than 24 hours.<br>5 - Team managers are responsible for providing quality score feedback to agents with some automated quality score coaching in place. Critical issues have an immediate feedback loop.<br>How consistent is feedback and coaching around quality scores?<br>1 - Little or no consistency in the feedback or coaching around quality scores.<br>3 - Informal feedback and coaching exists around quality scores.<br>5 - Quality feedback & coaching around quality scores is consistent.<br>What level of analysis is performed on call quality?<br>1 - Agent and program level trends analysis is performed.<br>3 - Agent and program level trends analysis is combined with quality metric trends reports.<br>5 - Agent and program level trends analysis, quality metric trends reports, and agent scorecard performance trends are performed and correlated to quality feedback.<br>To what extent does your firm integrate quality monitoring into training processes?<br>1 - Monitoring call quality is not used to refine training content.<br>3 - Monitoring call quality is used to refine training content.<br>5 - Monitoring call quality is used to refine training content and recorded calls are used by the training team in the process of, training new hires. |
| Quality Monitoring Metrics | What elements are incorporated into your organization's quality monitoring forms?<br>1 - Quality monitoring forms have metrics that are solely based on standardized processes.<br>3 - Quality monitoring forms include metrics that are based on,standardized processes as well as several customer-focused (soft skills) elements.<br>5 - Quality monitoring forms include metrics that are based on standardized processes that drive operational efficiency, along with appropriate customer-focused elements that drive customer satisfaction.<br>How does your organization identify and develop quality monitoring metrics?<br>1 - No statistical or methodical means to identify the right quality metrics.<br>3 - Metrics have been intuitively developed to understand key drivers.<br>5 - Metrics are derived from statistical models that have been developed to understand key drivers.<br>How is analysis used, if any, to determine the validity of quality metrics?<br>1 - The validity of quality metrics is not analyzed or assessed.<br>3 - The validity of quality metrics is infrequently analyzed or assessed.<br>5 - The validity of quality metrics is frequently analyzed and assessed.<br>How are weights assigned to quality monitoring metrics?<br>1 - No quality metric weighting system is in place<br>3 - Equal weights are assigned to metrics.<br>5 - Correlations to KPIs and the overall objectives of the program drives the assignment of weights to metrics.<br>How are quality monitoring metrics used?<br>1 - Quality is measured and used only for coaching agents.<br>3 - Quality is measured and used for coaching agents, and used as a key performance indicator (KPI).<br>5 - Quality is measured, used for coaching agents, and used as an enabler to understand and develop other key performance indicators (KPIs).<br>How is data from quality metrics used to understand other metrics and KPIs across the call center?<br>1 - Quality metrics data is not used to understand other metrics across the call center.<br>3 - Quality metrics data is used as an attempt to improve customer service but is not formally linked to important KPIs such as customer satisfaction and operational efficiencies.<br>5 - Quality metrics data is used to diagnose the drivers of other KPIs based on a correlation of the quality content to those KPIs. |

TABLE 11

Exemplary organization of questions and exemplars associated with attributes and capabilities of a care infrastructure domain

| | |
|---|---|
| Technology Strategy | Which of the following best describes the extent that your current and future technology operating environment is defined?<br>1 - The current operating environment is not documented and future environment may be discussed in general terms.<br>3 - The current and future operating environments are expressed in terms of Information Technology (IT) performance characteristics (e.g. availability, response time, defect rate) with timelines to achieve.<br>5 - Current and future operating environments are defined by IT in collaboration with all business units. Operating environments are defined within a roadmap which documents capabilities, expectations, and detailed steps with Timeline milestones. Any refinements to roadmap involves enterprise-wide effort with alignment across organizations and business objectives.<br>How are technology investments prioritized on your organization?<br>1 - There is little evidence of systematic technology investment prioritization.<br>3 - Prioritization is based on speed and ability of meeting business objectives.<br>5 - The business needs fully drive prioritization on dimensions of precision, cost, speed, agility, consistency, and competitive advantage.<br>To what degree is your architecture defined?<br>1 - There are generalized architecture descriptions for functional applications. Could be characterized as an environment with many "rogue" architecture components.<br>3 - Enterprise-wide architecture requirements of hardware and software capabilities and needs are detailed and include areas of security and performance monitoring.<br>5 - Architecture is defined in terms of integration maturity with organizations across the enterprise covering security, data management, service layers, and internal/external SLA performance monitoring.<br>Thinking about the software applications that enable customer care operations, which of the following best describes your company's application strategy?<br>1 - Applications often are narrowly developed to address specific business needs. Application strategy is often more tactical and greatly is influenced by new applications acquired through mergers and/or desire to move to a singular core application.<br>3 - Highly customized applications exist to meet the needs of business processes. Application strategy is based on meeting process demands and integration across enterprise.<br>5 - COTS (Commercial Off The Shelf) focused technology strategy is centered on vendor partnerships, scalability and integration capabilities in alignment to overall business strategy.<br>To what extent does your organization include costs in your technology strategy and roadmapping?<br>1 - Costs of Information Technology (IT) infrastructure are not included within the technology roadmap, and/or only the retirement of large applications are included as they relate to new buying decisions.<br>3 - IT infrastructure costs are detailed and include maintenance requirements. New buying decisions are linked primarily to costs.<br>5 - IT infrastructure costs are detailed and aligned to buying decisions, which meet strategic business objectives. Ongoing maintenance, application consolidation and retirement are integral to the cost analysis. |
| Alignment with Business Strategy | Which of the following best describes the extent to which the roles and priorities of Information Technology (IT) are defined?<br>1 - There is minimal definition, development, and understanding of IT roles and responsibilities at leadership level or worker level.<br>3 - Leadership has formalized an IT role and has collaborated on priorities in light of business objectives, however little understanding is communicated throughout the organization. IT leadership may understand their tie to business strategy, but everyone in the organization may not.<br>5 - Executives have formal agreement about the short and long term roles and priorities of IT including potential outsourcing solutions. Expectations are communicated throughout the organization. Everyone in IT understands their role in the strategy.<br>To what extent does your Information Technology (IT) division partner with other business units?<br>1 - IT department's agenda and objectives are defined and dictated by the business units.<br>3 - IT leadership and the business leadership have effective formal and informal working relationships that seek to meet business goals. Alignment is evaluated and refined in regular cycles.<br>5 - IT has strong partnership with business functions following parallel paths towards the same objectives. Alignment is continually reevaluated as business directions change and/or operational pace accelerates.<br>What criteria are utilized to make IT spending decisions?<br>1 - IT spending decisions are made primarily on the basis of cost or functionality with little or no business input.<br>3 - IT spending decisions are made on a balanced evaluation of requirements and cost with business representation only on largest and/or most complex projects. |

TABLE 11-continued

Exemplary organization of questions and exemplars associated with attributes and capabilities of a care infrastructure domain

| | |
|---|---|
| | 5 - IT spending decisions are made using a synergistic model where business drives IT evaluation of functional requirements while IT balances with architectural and scalability requirements. Shared decision making based on value contribution, ROI and strategy alignment.<br>How flexible is your application strategy to business process changes?<br>1 - Application strategy is inflexible to business process changes. The processes are frequently modified to meet application constraints rather than incur additional development costs.<br>3 - Application strategy has limited flexibility to meet business process changes with mid to heavy dependence on development and customization via cyclic, integrated software releases.<br>5 - Application strategy drives inherent flexibility at architecture and configuration level allowing dot code releases to support iterative process changes.<br>Who is accountable for IT production metrics?<br>1 - IT management is held accountable for functional level IT production metrics (e.g. availability, system defect rates).<br>3 - IT management has a functional scorecard comprised of development (e.g. requirements map to business functionality, test defects) and production metrics that align with business strategy.<br>5 - Business and IT have shared scorecards propagated down to individual contributor level that is driven by evaluation of performance against business initiatives overall. |
| Human Factors Engineering | Where is the primary focus of your company's human factors engineering efforts?<br>1 - Focus on functionality.<br>3 - Focus on usability.<br>5 - Focus on human performance metrics (fatigue, cognitive load and perceptual limits).<br>How would you describe your company's philosophy towards human factors engineering?<br>1 - There is an expectation that people will adapt to technology.<br>3 - The company places emphasis on tailoring the design of technology to human ease of use.<br>5 - The company places emphasis on tailoring the design of technology to human needs, limitations, mental models, and cognitive and perceptual styles.<br>What knowledge sources does your company rely on for human factors engineering?<br>1 - Reliance on intuition and common sense reasoning, lack of understanding of human behavior.<br>3 - Reliance on logic and educated guesses, use of theoretical techniques to understand human behavior.<br>5 - Reliance on research from peer-reviewed scientific studies and use of empirical techniques to study and understand human behavior to determine user requirements.<br>What type of testing methods are used in human factors engineering in your company?<br>1 - No formal testing methodology.<br>3 - Lab-based interaction testing, artificial environment testing.<br>5 - Rigorous scientific and analytical methods in lab testing, task analysis, field studies and direct observation. |
| Business Continuity Planning | To what degree is business continuity planning (how an organization will recover from a disaster) viewed as important to your company?<br>1 - Business Continuity is not viewed as a corporate competence.<br>3 - Critical functions form business continuity pockets of excellence.<br>5 - Business Continuity processes integrated in the corporate culture, as part of a business as usual routine.<br>To what degree is your company's leadership involved in business continuity planning and support?<br>1 - There is a decentralized focus relying on individual efforts, with little or no senior management support.<br>3 - There is Leadership commitment with basic set standards, and centralized support for the rest of the organization.<br>5 - Leadership is directly involved, including the commitment to enforceable policy and participation in training. Business Units are involved in periodic crisis exercises and evaluated on rehearsals. Continuous improvement initiatives are in place to improve the continuity plan.<br>To what extent does your organization define and update analysis of potential emergencies and critical events?<br>1 - Potential emergencies, disasters, and critical events are poorly defined and rarely researched or updated. Inventory of risks, mission-critical human resources, and assessments of exposure are updated after events occur.<br>3 - Potential emergencies, disasters, and critical events are somewhat defined and occasionally researched and updated. Inventory of risks, mission-critical human resources, and assessments of exposure are updated occasionally when risk is imminent. |

TABLE 11-continued

Exemplary organization of questions and exemplars associated with attributes and capabilities of a care infrastructure domain

| | |
|---|---|
| | 5 - Rigorous and thorough definitions of potential emergencies, disasters, and critical events researched and updated. Thorough inventory of risks, mission-critical human resources, and assessments of exposure, are updated on an ongoing, formal basis. |
| | Which of the following best describes the depth/detail of your organization's business continuity plans? |
| | 1 - Mitigation plans are random efforts to lessen the mostly internal short-term risks that emergencies, disasters, and critical events may have on workforce and business operations. (e.g., 1 centrally located Contact Center). Agents are highly-specialized and not cross-trained. |
| | 3 - Mitigation plans are intermittent efforts to lessen the mostly internal/external mid-term risks that emergencies, disasters, and critical events may have on workforce and business operations. (e.g., 2 or more geographically independent Contact Centers. Loosely defined cross-training methodology) |
| | 5 - Mitigation plans are ongoing, ranked, and prioritized efforts to reduce or prevent internal/external long & short-term risks that emergencies, disasters, and critical events may have on workforce and business operations. (e.g., multiple redundant contact centers). Cross-training curriculum is standard and aligned with mitigation plan |
| | Which of the following best describes the degree to which business partners/vendors are incorporated into your company's business continuity plans? |
| | 1 - Human and supply chain issues generally not included in plans. |
| | 3 - Human impact issues and/or supply chain consequences limited to most critical processes and small number of vendors. |
| | 5 - Coordination of business continuity issues and requirements with, employees, customers'and vendors ensuring that critical supply chain partners have their own adequate business continuity plans in place. |
| Application Design | Which statement best describes the organization's vision and approach to application design? |
| | 1 - The vision is simply the ability to answer and be responsive to the customer at the most basic levels. Applications and data are not integrated to identify the customer prior to contact delivery to agent. |
| | 3 - The vision is to produce repeatable (and positive) customer experiences, leveraging some data and application integration on agent desktop. At a minimum, the customer is identified prior to contact delivery to the agent through use of Compute Telephony Integration (CTI). |
| | 5 - The vision is to provide proactive and collaborative customer support through the applications. Context is extracted and leveraged/integrated across multiple interaction channels to enable personalized, situation specific experience. |
| | Which of the following best describes the extent to which your company's applications automatically filter or link to additional supporting customer data like purchase history or customer tier level? |
| | 1 - Agents have to make manual association of customer to products and services based on customer profile and agent skill set. |
| | 3 - The system performs a rudimentary systematic association of customer to products and services data which is performed by online scripting of established policies. |
| | 5 - The system has the ability to dynamically anticipate and provide customer service data in real time across channels with focus on personalized decision support through advanced knowledge management and predictive analytics. |
| | Which of the following best describes self-service (ex: web support) capabilities available to your customers? |
| | 1 - Self-Care functionality addresses Frequently Asked Questions (FAQs) at a generic level but does not support online transactions. |
| | 3 - Self-Care systems support resolution of the most common issues (ex: account updates and billing) , but do not integrate information to source applications |
| | 5 - Fully integrated Self-Care applications which support consumer inquiries with real-time resolutions and integrates data across applications. |
| | Which of the following best describes how "user friendly" or "usable" your company's applications are? |
| | 1 - Applications are not intuitive or efficient. Multiple applications require a multitude of desktop views and navigation steps. Extensive training is required to enable agents to use applications. |
| | 3 - Use of a single application has some intuitive components but multiple screens and navigation steps are required. Less training time is required. |
| | 5 - Single fully integrated application on agent desktop that provides intuitive navigation and minimizes the number of navigation steps. Agents can ramp quickly and take advantage of a mild learning curve. |
| | How flexible is your application architecture to adapt to business process changes? |
| | 1 - Application(s) are inflexible to business process changes. Processes frequently modified to meet application constraints rather an incur additional development costs. |
| | 3 - Application(s) have some flexibility to adapt to business processes but are dependant on customized development via regular software releases. |
| | 5 - Application(s) are built with an inherently flexible at architecture and configuration levels allowing dot code releases to support iterative process changes. New workflows can be quickly incorporated into the application. |

TABLE 11-continued

Exemplary organization of questions and exemplars associated with attributes and capabilities of a care infrastructure domain

| | |
|---|---|
| | To what degree are your company applications designed to produce usable data that can be stored in, a data warehouse and reported against?<br>1 - Applications are designed to produce rudimentary data on trending, forecasting and fulfillment reporting is available from source systems (not data warehoused) Users of the data are typically at functional levels.<br>3 - Applications are designed to provide moderate data warehouse capabilities enable quantitative, historical analysis correlated across functional applications. Users of the data are usually at management levels and above.<br>5 - Applications are designed to feed an Integrated data warehouse allows enterprise-wide view of customer to enable real-time analysis at all user desktops. Users of the data are at all levels of the organization. |
| Integrated View of Customer | To what extent does your organization use historical transaction data to provide an integrated view of the customer?<br>1 - Agents have no visibility to historical customer transactions during customer interaction.<br>3 - Agents have limited visibility to historical customer transactions during customer interaction. The agent often interacts with the customer based on their discretion.<br>5 - Agents have full visibility to historical customer transaction data plus real time data and the tool typically drives the interaction with the customer based on meeting certain profiles.<br>Which of the following best describes your organization's data storage and data usability situation?<br>1 - Customer data is stored in different data stores with functional (e.g. sales, service, billing) ability to view, report and perform analysis across platforms. Specialized data users needed to perform manual analyses.<br>3 - Customer data (that comes from different sources) is stored in data warehouse that provides the capability to answer specific business problems and create a historical customer views for specialized users via front end tools and queries.<br>5 - Customer data (that comes from different sources) is stored in a full data warehousing solution that allows all customer-facing users the ability to view and manipulate customer, product and contact channel data real-time, at point of need.<br>Which of the following best describes your company's Customer Relationship Management (CRM) capabilities?<br>1 - Rudimentary CRM system which is primarily focused on service and sales support.<br>3 - Mature CRM system which enables integration of critical customer interaction channels (e.g. voice, email, internet, on-site).<br>5 - Mature CRM system which enables seamless integration of all interaction channels via robust CRM solution for unified view of sales, marketing service, and billing interactions with customer.<br>How well does your company's application infrastructure support an integrated view of the customer?<br>1 - Multiple applications for each functional area are needed to understand customer interaction and, history. Little or no ability to provide a holistic customer view.<br>3 - Integrated applications create cohesive view of customer within each functional area. Multiple applications needed for holistic customer view.<br>5 - Applications provide a singular customer view across functional areas through highly integrated, enterprise wide application and data transparency strategy.<br>Which of the following best describes the information available to agents though applications while servicing customers?<br>1 - Agent have access to account history and, product catalog to enable unstructured individually (agent) biased positioning and messaging.<br>3 - Agent have access to standardized scripting and customer treatment options based on historical data functional area and a few elements of the customer profile.<br>5 - Agent have access to highly integrated and contextually driven data from across all interaction channels enabling personalized scripting, positioning and overall messaging. |
| Analytic Decisioning | Which of the following best describes your organization's knowledge repository?<br>1 - No knowledge repository or knowledge base is present other than physical documents and paper manuals.<br>3 - Knowledge repository contains standardized documents available, indexed and cataloged in centralized data store but requires varying navigation to access.<br>5 - Knowledge repository is easily accessible (typically via flexible "context" inquiries) and information is proactively presented to poeple at the point of need Describe the degree to which your company's application technology automatically presents information to help agents make decisions?<br>1 - Little or no technology assisted discussion or decision assistance is deployed. Decisioning is primarily dependant on the agent's skill set and training.<br>3 - Some applications have technology assisted decisioning through qualification criteria for products and services that agents uses to make decisions.<br>5 - Applications have fully Integrated technology assisted decisioning assistance which automates routine and low-value decisions while proposing decision choices for more complex decisions |

TABLE 11-continued

Exemplary organization of questions and exemplars associated with attributes and capabilities of a care infrastructure domain

| | |
|---|---|
| | To what extent are your business processes embedded within application workflows?<br>1 - Minimal or no business process workflows are imbedded within application. Applications focus on data capture.<br>3 - Critical business processes are embedded within application workflows. Applications focus on process entrance/exit criteria and data validation.<br>5 - All applicable business process are embedded in application workflows. Applications focus on customer transaction record quality.<br>Which of the following best describes the feedback on the performance of your decisioning analysis tools?<br>1 - There is minimal or infrequent feedback on the performance of the decisioning tools.<br>3 - There is frequent feedback on historical analysis tools employed to assess and improve agent skill sets focused on speed, precision and cost.<br>5 - There is frequent real-time analysis tool feedback on precision, speed, agility, cost and consistency dimensions |
| Business Rules Management Systems | Which statement best describes the repository for your company's business rules?<br>1 - Business rules and metrics are maintained in requirements documents and are defined at the business user level.<br>3 - A common Meta Data repository is used by IT for requirements tracking but has yet to be widely accepted as a common repository for the enterprise. Typically IT only has access and Business rules cannot be changed on the fly.<br>5 - A common Business Rules Management System (BRMS) repository whereby users can check or change rules directly without IT involvement. Is widely accepted as a common repository for the enterprise.<br>Which statement best describes the interface used to access business rules?<br>1 - Business logic is hard-wired into applications and/or the "interface" is through requirements documents and implementation of those requirements.<br>3 - Business rules are defined in ETL or Metadata tools which support or the integration and processing of backend data. Updates of rules for reference available to the developers and not the business users.<br>5 - IT applications are represented through a natural language interface to design or edit decision table(s) and or tree(s).<br>Where is business logic maintained?<br>1 - Business logic is implemented redundantly into multiple applications.<br>3 - Business logic is maintained in stored procedures and checked into versioning software.<br>5 - Business logic is externalized and is housed within the Service Oriented Architecture (SOA) for access by multiple applications for reusability.<br>To what extent do your business rules support modeling?<br>1 - No integration of business rules to data modeling.<br>3 - Business rules are checked into a common repository but no direct mapping to the data and/or process model exists.<br>5 - Supports business process modeling and mapping of flows and controls tied to the data model. |
| Service Oriented Architecture | To what extent are your organization's core IT services defined?<br>1 - Core IT services are not be defined. Services are provided as requested.<br>3 - Core IT services are defined throughout disparate silos and provides tactical support. Core services are not integrated into a single Service Oriented Architecture (SOA).<br>5 - Core IT services are clearly defined, aligned with business objectives and integrated into a single SOA. Services are iterative and tied to ROI analysis. Supporting technology for core services is in direct alignment to business strategy.<br>How would you describe your architecture's level of data integration?<br>1 - Architecture supports only specific data needs for individualized use via access to disparate systems.<br>3 - Architecture supports partial data integration. Integration opportunities are driven by unique business unit needs. Architecture lends itself to batch data inquiries.<br>5 - Architecture supports discrete functions which are contained in interoperable, standards-based applications that provides data federation in REAL TIME. Data is encapsulated for reuse, and is extensible and flexible to maintain.<br>Which statement best describes the type of review the business rules and metrics (that impact the architecture) undergo on a routine basis?<br>1 - Business rules and metrics are maintained on an "as needed" in requirements documents and are defined at the business user level. Many definitions exist across the enterprise and result in inconsistent data reporting results.<br>3 - Business rules and metrics are maintained in a tool that is owned by IT but review and updating is typically infrequent.<br>5 - Business rules and metrics are reviewed in a regular, frequent schedule and are governed by a governance board insuring accuracy across the organization, eliminating duplication, inconsistent reporting and management of data capture.<br>Which statement best describes the flexibility of your architecture's reporting abilities?<br>1 - Reporting is difficult to adapt to a changing environment as report changes always require formal change requests and extensive re-design to the back end system(s). |

TABLE 11-continued

Exemplary organization of questions and exemplars associated with attributes and capabilities of a care infrastructure domain

| | |
|---|---|
| | 3 - Reporting is facilitated because transformation and data integration is done at the application and/or report level and is built within the reports which can be reused rather than a back end architecture. Static, dynamic and ad-hoc reporting is supported.<br>5 - Reporting is flexible application placed on top of the back end architecture and includes collaborative filtering, real time decision analytics, and trend identification through static, dynamic, and ad-hoc reporting. |
| External Network (Customer Facing) | What programs or processes, if any, does your organization use to define external network requirements?<br>1 - Ad hoc process for evaluating external network requirements based on user requests.<br>3 - Program defines itself based on frequency of customer implementations. Need defines the program.<br>5 - Defined program for iteratively evaluating external network requirements and ability to deliver on those needs.<br>Thinking about customer facing network functionality, what degree of internal collaboration does your organization employ to collect and address user requirements?<br>1 - Individual business units market and deploy their own functionality to meet user requirements.<br>3 - Collaboration between business units occurs but is driven by poor user response to multiple functionality that is reactive in nature.<br>5 - Collaborative effort to define user requirements prior to marketing and deployment of functionality to deliver holistic solutions to customers.<br>How does your organization evaluate whether the existing technology architecture is meeting external (customer facing) network requirements?<br>1 - Existing technology architectural is not evaluated in its ability to meet external (customer facing) network requirements, and often does not meet 100% of needs.<br>3 - Existing technology architecture is evaluated against external (customer facing) network requirements but only in areas with high revenue impacts and high value customers.<br>5 - Existing technology architecture is continually evaluated against all external (customer facing) requirements.<br>How comprehensive are the external network solutions that are created for customers?<br>1 - Solutions contain core services/functionality that can only handle a subset of specific customer requests.<br>3 - Solutions contain segmented services/functionality based on most commonly requested normal business processes.<br>5 - Solutions contain a full suite of services/functionality with inclusion of security, compatibility and interoperability considerations.<br>Please describe your organization's primary architecture utilized for electronic interaction with customers?<br>1 - File Transfer Protocol is the primary architecture utilized to interact with customers.<br>3 - Web structure with portals provides additional functionality with expansion capabilities along a defined architectural and technological roadmap.<br>5 - Established Application Program Interface (API) with a detailed specification that can be shared with customers and standardized architecture that allows connection through the API. |
| Network Convergence | Which best describes describe your organization's network data and communication platforrn(s)?<br>1 - Multiple platforms for data and voice with limited management and monitoring capabilities.<br>3 - Separate platforms for data and voice, PUBLIC SWITCHED TELEPHONE NETWORK (PSTN) and packet switching with multiple point management systems.<br>5 - Integrated IP network platform with tunneling protocol which supports voice, data, video and fax converged over a single platform and single network with a single management and monitoring interface.<br>Which of the following best describes your call routing capabilities?<br>1 - Calls can be routed to multiple queues, with separate queues for each skill set. Contacts can not be swapped from one queue to another to alleviate backups, processes drive routing decisions.<br>3 - Calls can be routed to multiple queues, with separate contact queues for each site. Agent skill set and/or human resource capital do not support routing from one queue to another. There is location dependence. Routing within a location is based on agent skill set.<br>5 - Contact center virtualization and intelligent routing enable center(s) to function as a single, unified entity with location independence where a single queue is utilized to prioritize and route calls based on agent skills and availability across multiple locations while retaining secure access to corporate information.<br>What level of effort is required for moves/adds/changes/deletes (MACs) to your organization's data and communication network's infrastructure?<br>1 - MACs require administrative intervention to accomplish physical relocation of telephony instruments and extensive, system modifications due to physical constraints. |

TABLE 11-continued

Exemplary organization of questions and exemplars associated with attributes and capabilities of a care infrastructure domain

|  |  |
| --- | --- |
|  | 3 - MACs require administrative intervention at a vendor specific or location specific level, but are not performed as an integrated whole. There is usually a telephony hybrid solution with a perceived migration path to IP.<br>5 - MACs are done in real time with no administrative intervention. MAC costs are greatly reduced and swing and churn space are minimized or eliminated. Typically a fully IP environment.<br>To what degree are your call center channels integrated?<br>1 - Single channel call center with little perceived business need to expand into multiple channels.<br>3 - Contact center with disparate voice and data platforms limits multichannel integration. Technology makes it cost-prohibitive to integrate.<br>5 - Multichannel integration over a common platform allows economies of scale toward telephony capacity and agent staffing.<br>Which of the following best describes your telephony equipment infrastructure, and the resources required to support it?<br>1 - The organization maintains a premise based systems at each location with shared telecom expertise resources.<br>3 - The organization maintains a premise based systems at each location with a telecom expert at each site.<br>5 - The organization has consolidated of telephony equipment with a limited number of experts able to manage the equipment centrally. |
| Disaster Recovery Planning | What is the primary driver that determines your organization's disaster recovery prioritization schedule?<br>1 - Data processing functions drive prioritization without consideration of the business or technology impacts.<br>3 - IT operations drives prioritization, addresses key technology impacts.<br>5 - Business, technology and customer need drives prioritization of mission critical business operations and processes.<br>How extensive are your firm's disaster recovery policies and procedures?<br>1 - There are minimal policies and procedures for recovery and restoration plans.<br>3 - There are comprehensive policies and procedures for technology recovery and restoration plans.<br>5 - There are action oriented recovery and restoration plans synchronizing operations and technology that are validated through periodic rehearsal of disaster scenarios.<br>Which of the following best describes your organization's data management backup process?<br>1 - Regularly scheduled backups to tape.<br>3 - Regularly scheduled backups to tape and archived off site.<br>5 - Real time back-ups across centers over the network.<br>Which of the following best describes your data processing environment?<br>1 - The data processing environment is isolated and secure.<br>3 - There are alternative data or call centers with Uninterruptible Power Supply (UPS), generators, cooling, security and fire suppression systems.<br>5 - The data processing environment distributed over two or more centers for disaster recovery planning and high availability.<br>Which of the following best describes your organization's technology resiliency measures?<br>1 - Fully redundant disk system.<br>3 - Failover server architecture.<br>5 - Fully redundant data server architecture.<br>Who prioritizes, manages, and maintains your organization's information technology architecture inventory?<br>1 - Inventory of IT infrastructure is managed by business units. Maintenance is mostly reactive and performed on as needed basis.<br>3 - Centralized IT hardware inventory managed within IT including identification of mission critical applications. Maintenance is performed according to vendor defined maintenance schedules.<br>5 - Hardware and Software Inventory is centrally managed by IT, prioritized regularly by the business units with failover systems implemented for critical applications. Defined maintenance schedules, testing and exercises, and performance monitoring normal part of business. |
| Home Agent | To what extent are remote agents included in your disaster recovery planning?<br>1 - Systems requirements and configuration are defined at a generic level with no redundancy or high availability plan in-place. Agents are offline in the event of failure.<br>3 - Informal system requirements and configuration (hardware, applications and desktop displays) definition process causes disparity between in-house and remote agents. There is only partial redundancy which may require temporary transfer of workload until home agent connectivity has recovered from failure.<br>5 - There are thorough and formal system requirements and configuration (hardware, applications and desktop displays) definition process which drives consistency between in house and remote agents. There are REAL TIME statistics and other relevant information and also full redundancy to support high availability in the event of failure. |

TABLE 11-continued

Exemplary organization of questions and exemplars associated with attributes and capabilities of a care infrastructure domain

|  |  |
|---|---|
|  | Which of the following best describes your company's call routing system for remote agents?<br>1 - Premise based technology that supports remote connections for use with skills based routing determined by IVR selections and agent skills.<br>3 - Intelligent call management technology to ensure efficient call traffic management and agent utilization. Data directed routing is accomplished by using of REAL TIME analytics to drive routing decisions.<br>5 - Advanced conditional routing through a workflow engine to support the creation of sophisticated routing algorithms that can factor business intelligence, call center metrics and customer data dependencies are factors in determining optimal routing decisions.<br>Please describe how your organization performs quality control and performance monitoring on remote agents.<br>1 - Remote monitoring for quality management is primarily focused on checking for background noise.<br>3 - Full management features for remote monitoring, REAL TIME statistics and reporting on agent status and performance.<br>5 - Full management features for remote REAL TIME and recorded audio and video monitoring, REAL TIME statistics and reporting on agent status and performance.<br>Please describe the security measures your organization utilizes for remote agents?<br>1 - Existing corporate security policies and procedures are applied to remote workforce technologies.<br>3 - Corporate security policies and procedures are adapted to the special circumstances surrounding remote access and security of information and provides a secure connection back to the host.<br>5 - Comprehensive security measures are developed for the special circumstances surrounding remote agents (password documentation, destruction of confidential information, etc).<br>What level of technology resources facilitate communication and decision making for remote agents?<br>1 - Access to knowledge base and email capability between remote and in-house agents.<br>3 - Access to knowledge base and additional capabilities such as secure instant messaging, employee chat forums and e-bulletin board capability for remote agents and in-house agents to share knowledge and expertise.<br>5 - Access to knowledge base and use of presence technology that identifies current location and denotes access methods for other remote agents, in-house agents, and non-contact center subject matter experts. |
| Communications Network Infrastructure | When thinking about your facility's communications network infrastructure (specifically the network access points, into the building and the carriers providing the network service) which statement best describes your susceptibility to a single point of failure?<br>1 - Single network route in place to the building provided by a single carrier. OR, a Single network route in place to the building even if the network service is provided by multiple carriers. Physical breaks in the access point results in total network failure.<br>3 - Multiple routes into the building but still provided by a single carrier. Outages only occur at carrier level.<br>5 - Multiple routes into the building, and multiple carriers provide service. Full redundancy preventing any single points of failure.<br>How would you describe your network's failover capability?<br>1 - Failover is performed manually.<br>3 - Automated local Telco failover, with manual failover at the carrier level.<br>5 - Automated fail-over with back-up and recovery capabilities. Seamless transition through outages with full redundancy (routes and access points).<br>Which statement best describes your network availability up time?<br>1 - Network availability is below three nines (less than 99.9% up time).<br>3 - Network is available 99.9% of the time or greater.<br>5 - Network availability is equal to or greater than four nines (over 99.99% up time).<br>How would you describe your network's bandwidth/circuit capacity?<br>1 - Minimal bandwidth/circuit availability. Available bandwidth may be isolated rather than centralized.<br>3 - Large blocks of bandwidth/circuit available, but may be isolated and not available for centralized use.<br>5 - Large blocks of centralized bandwidth/circuit available.<br>Which statement best describes your network response time?<br>1 - Coast to Coast Network response time of 200 milliseconds or greater with lower level of reliability based on analog network (GS/LS/E&M/DID).<br>3 - Coast to Coast Network response of 100-200 milliseconds with reliable service (T1 using GS/LS/E&M/DID).<br>5 - Coast to Coast Network response time less than 100 milliseconds using state-of-the-art technologies (BRI ISDN, PRI ISDN, SS7, VOIP). |
| Sourcing Optimization | How would you describe the process your firm uses to procure communications gear (telephony and network)?<br>1 - Labor-intensive and fragmented buying processes.<br>3 - Manual, standardized communications sourcing procedures. |

TABLE 11-continued

Exemplary organization of questions and exemplars associated with attributes and capabilities of a care infrastructure domain

| | |
|---|---|
| | 5 - Standardized communications sourcing procedures with dedicated category experts and use of sourcing automation tools and analytics.<br>Please describe the level of expertise in the carrier relations resources in your organization?<br>1 - Lack of understanding of the services and rates available to meet communications needs.<br>3 - Understanding of services and rates but lack of insight into market conditions and carrier strategies in order to maximize purchasing power.<br>5 - Full understanding of services, rates and market conditions which is used to exploit fluctuations in market conditions and carrier strategies.<br>How frequently does your organization renegotiate its communications (data and telephony) contracts?<br>1 - Communication services are infrequently renegotiated upon expiration of contracts due to a lack of understanding of all services currently being used or needed.<br>3 - Communications contracts are renegotiated only at expiration. There may be contract tracking systems, but the organization is not able to effectively apply solid or proactive management of the contracts.<br>5 - Communications contracts are renegotiated both at and between expiration dates due to thorough understanding of current service usage (with beginning and expiration dates), future service needs, tracking of SLAs, and multiple carrier options.<br>How well does technology support your organization's telecom service procurement process?<br>1 - Manual procurement and sourcing tools and informal processes based on partial understanding of communications needs.<br>3 - Use of automated procurement and sourcing tools and formal processes based on full understanding of internal needs.<br>5 - Leveraging of online sourcing and procurement tools such as reverse auctions, online RFx-based negotiations and to create competitive bidding markets and streamline sourcing processes based on complete understanding of communications needs.<br>How well does the procurement team understand the company's communications needs?<br>1 - Partial understanding of communications needs.<br>3 - Full understanding of internal communication needs and partial understanding of external communication needs.<br>5 - Complete understanding of internal and external communications needs.<br>Which of the following best describes your organization's procurement metrics?<br>1 - Metrics are not utilized to evaluate procurement and sourcing effectiveness.<br>3 - Infrequent evaluation of or use of inconsistent metrics to evaluate procurement and sourcing effectiveness.<br>5 - Methodology for frequent evaluation of procurement and sourcing effectiveness through consistent metrics. |
| Vendor Selection | What level of documented vendor requirements or "needs analysis" is performed prior to vendor selection?<br>1 - A needs analysis is not conducted prior to Request For Proposal (RFP) development.<br>3 - A needs analysis is conducted on a departmental or specific project basis without consideration of enterprise business objectives.<br>5 - A detailed needs analysis is conducted prior to RFP development which prioritizes requirements based on a deep understanding of enterprise business objectives.<br>Which statement best describes the detail included on your vendor Request for Proposal (RFP)?<br>1 - RFP does not adequately document user requirements, and lacks alignment to business objectives. The RFP creates more ambiguity and rework than solutions.<br>3 - RFP documents user requirements but lacks enterprise business objectives.<br>5 - RFP outlines selection criteria and process and contains user requirements and enterprise business objectives.<br>How are vendor questions regarding RFPs (Requests For Proposal) handled?<br>1 - Adequate resources have not been identified to address vendor questions.<br>3 - Vendor questions are parsed to multiple individuals for response and dissemination.<br>5 - A single point of contact is established for vendor questions and responses to questions are developed and disseminated quickly.<br>How are vendor's responses assessed?<br>1 - Personal biases are involved in vendor assessment. The focus is on getting the latest features and functionality at the lowest cost.<br>3 - Quantitative information is used to assess vendors. The focus is on balancing pricing and features and functionality that are deemed critical.<br>5 - A rigorous vendor rating system is used to objectively assess quantitative (pricing and features and functionality) and qualitative (extensibility and scalability of platform, availability of support, implementation support) information.<br>How much consideration is given to a vendor's Service Level Agreements (SLAs), terms and conditions during the selection process? |

TABLE 11-continued

Exemplary organization of questions and exemplars associated with attributes and capabilities of a care infrastructure domain

| | |
|---|---|
| | 1 - Vendor SLAs and contractual terms and conditions are not considered during selection process. |
| | 3 - Vendor SLAs and contractual terms and conditions are considered and meet most of the company requirements. (It is possible the company's requirements may be out of synch with the market) |
| | 5 - Vendor SLAs and contractual terms and conditions are considered and are fully meet the company requirements and align with organizational goals and needs. |
| Network Performance Management | Which statement best describes the use of network performance metrics in your organization? |
| | 1 - Organization has limited performance metrics focused on outage conditions. |
| | 3 - Organization has defined network performance metrics with loosely defined severity definitions for all monitored events. |
| | 5 - Organization has fully documented, and clearly defined network performance metrics with distinct impairment and outage severities. |
| | How are network performance service levels monitored and tracked to ensure adherence? |
| | 1 - SLA's (Service Level Agreement) performance is not tracked internally. Dependant on vendors to report SLA performance. |
| | 3 - Internal OLA's (Operating Level Agreements) are defined and tracked but are not developed or refined based on dependant vendor SLA's. |
| | 5 - OLA's are generated from vendor SLA's. Additional measures are also developed for accurate surveillance and troubleshooting to differentiate internal and external performance issues. |
| | Which of the following best describes network maintenance change control practices? |
| | 1 - Maintenance is performed after hours and on weekends as work is identified. Increased diligence and communication is expected but not enforced for larger activities/upgrades. |
| | 3 - Organization has rudimentary network change control process where changes and upgrades are performed during established maintenance windows. |
| | 5 - Organization has well documented and robust network change control process that defines criteria for approval, approval chain, and establishes strictly enforced maintenance windows. |
| | What is the sophistication level of your network performance monitoring software? |
| | 1 - Organization utilizes rudimentary software for network performance monitoring and focuses primarily on the physical and application network layers. Software primarily provides up/down status. |
| | 3 - Organization recognizes varying layers of the network (e.g. OSI network model) and employs holistic software for monitoring each of the layers. Thresholds are created and deployed to monitor severity levels. RFO (Requests For Outage) are performed ah-hoc at customer request. |
| | 5 - Organization utilizes performance monitoring software that contains tool sets for setting thresholds based on severity and frequency and is integrated into ticketing and auto-repair toolsets. Standard RFO criteria are established and event documentation is produced whenever exceeded. |
| | Which of the following best describes the level of network monitoring within your organization? |
| | 1 - Normal business hours and on-call after hours support personnel are utilized to detect and/or repair issues. |
| | 3 - Decentralized groups monitor network based on function and layer (e.g. infrastructure, telecomm, IT) with varying hours of support based on user demographics. |
| | 5 - A 7 x 24 centralized NOC (network operations center) is in place for surveillance and monitoring to proactively detect, correlate and repair the network as events occur with formal escalation processes defined for all internal and external infrastructure, systems and applications. |
| Capacity Management | Which of the following best describes your organization's communications infrastructure strategy? |
| | 1 - No communications infrastructure strategy exists due to labor intensive manual data monitoring, collation and report production which hinders capacity planning. |
| | 3 - Communication strategy is place but limited by decentralized tracking and reporting at the device level. |
| | 5 - A comprehensive communications strategy which outlines current and future communications needs. Strategy development and refinement is supported by centralized and automated tracking and reporting of network-wide usage statistics. |
| | To what degree does your company utilize statistical models to determine network or telephony capacity requirements? |
| | 1 - Statistical models are not used to determine capacity requirements. |
| | 3 - Use of a single statistical model to determine capacity requirements. |
| | 5 - Use of multivariable statistical models to determine capacity requirements (e.g. considers projected growth, historical trending, seasonality, contingency overflow needs). |
| | Which of the following best describes your organization's telephony or network capacity planning? |
| | 1 - Capacity planning is not done. It is considered time-consuming, costly and difficult. |

TABLE 11-continued

Exemplary organization of questions and exemplars associated with attributes and capabilities of a care infrastructure domain

| | |
|---|---|
| | 3 - Capacity planning is done on only the most mission critical telephony hardware and communications links, and/or data network hardware components, applications and connectivity links.<br>5 - Capacity planning is an iterative and integral process where available capacity, and performance SLAs are monitored and managed for all business critical communication components.<br>To what extent is your organization able to collect and analyze telephony or network capacity data?<br>1 - Capacity related information is difficult to collect and analyze. If data is collected, it is a manual process.<br>3 - Capacity related information is available but incomplete. Data is often decentralized or only available at the device level. Integrated reporting can be manual with some automated methods. It is used reactively to solve problems, or for future planning purposes.<br>5 - Proper and complete capacity related information is centrally available and used on a consistent, automated basis for baseline establishment and trending. Allows confident what-if analysis to determine effect of, possible changes. |
| Communications Expense Management | Which statement best describes the format of the communications bill that your organization receives?<br>1 - Multiple bills received in paper formats.<br>3 - Centralized bill received in paper or electronic format, inability to upload electronic media completely if in electronic format.<br>5 - Electronic billing media to enable reporting and analysis, system to upload electronic media, relational database with invoice and contract reconciliation, allocation templates.<br>To what extent are your company's communications expenses audited?<br>1 - The majority of bills are not audited and simply paid in full.<br>3 - Only largest spend subset of communications invoices are audited, generally a lack of visibility to wireless expenditures (wireless expenditures are reimbursed through employee expense reports).<br>5 - Proactive management of all or close to all communications expenditures through regular and repeatable auditing of all communications bills with all components of bill evaluated.<br>Which statement best describes your company's contract management methods for communications expenses?<br>1 - Communications contracts are not compared with benchmarks for the best pricing.<br>3 - Limited visibility into contracts for bill validation, contracts are stored in paper format or in disparate systems/databases.<br>5 - Centralized contract repository with automated capability to link contracts to billing to reduce leakage and enable negotiating for price reduction opportunities.<br>How would you describe your company's communications bill payment and reconciliation methods?<br>1 - Excessive bill processing times cause late payment penalties.<br>3 - Bill is paid in full and reconciled manually after the fact.<br>5 - Use of invoice reconciliation and analytics automation and support to achieve faster invoice auditing and processing cycles. Automation identifies discrepancies in bill and percentage of differences to target reconciliation efforts.<br>Who in your company is responsible for managing communications expenses?<br>1 - Information Technology (IT) department has primary responsibility to manage communications expenses.<br>3 - Communications responsibility is decentralized with departmental control over budgets.<br>5 - Centralized control in one corporate function that has a mandate to uphold policies and institute systems for control. |
| Security Approach | How would you describe your company's approach to IT infrastructure security?<br>1 - Network services management focused approach. Often the emphasis is primarily to provide infrastructure protection.<br>3 - Technical issue focused approach. Often the emphasis is standardization of security practices across the organization.<br>5 - Business capability focused approach. The emphasis for security is to balance cost and risk.<br>How is the security of your IT infrastructure viewed by your company?<br>1 - Security viewed as a burden to the enterprise, out of scope, not in budget, afterthought.<br>3 - Security viewed as an expense with a protective stance and focus on monitoring.<br>5 - Security viewed as a strategic investment with an enabling stance and focused on holistic threat assessment.<br>How would you describe the scope of your company's infrastructure security?<br>1 - It is application-centric without specific regard to threats.<br>3 - It is practice-centric to defend against external threats as identified.<br>5 - It is Process-centric in support of mission critical customer driven business processes and proactive defense against threats.<br>Which statement best describes your organization's approach to implementing its infrastructure security? |

TABLE 11-continued

Exemplary organization of questions and exemplars associated with attributes and capabilities of a care infrastructure domain

| | |
|---|---|
| | 1 - The approach is primarily reactive to the environment and driven by experience.<br>3 - The approach emphasizes survivability and managing to threats and perceived vulnerability.<br>5 - The approach emphasizes enterprise level resiliency, managing to threats and potential impact to the business.<br>How would you describe the methodology of ensuring the security of your IT infrastructure?<br>1 - Reactive and improvised to most situations.<br>3 - Tactical but irregular approach (defensive approach) to threat situations.<br>5 - Strategic (offensive approach) to situations while being, adaptive, deliberate and systematic. |
| Information and Technology | Which statement best describes your information and technology security infrastructure?<br>1 - Firewalls at network entry points.<br>3 - Firewalls at network entry points and some application levels.<br>5 - Use of multiple layers of firewalls, intrusion detection, client PC virus software, server-based virus checking and root level password protection for all network elements.<br>What kind of data protection measures are in place?<br>1 - Limited email encryption or monitoring capabilities.<br>3 - E-mail encryption and "authorized use" policies implemented and monitored.<br>5 - Technology monitored "data protection rules" prevent users from unauthorized saving, printing or transmitting customer information.<br>How would you describe your customer information storage practices?<br>1 - Storage of customer information storage is based simply on data storage capacity.<br>3 - Data retention policy around customer data is documented however, there is a limited ability to monitor day to day activities.<br>5 - Customer information storage is systematically kept to a minimum. Data retention policy is focused on requirements for business, legal, and/or regulatory purposes.<br>To what extent are security requirements considered during the software development or acquisition process?<br>1 - Security requirements are not evaluated during the software development or acquisition process.<br>3 - Security requirements are frequently part of the software development or acquisition process.<br>5 - Standard security requirements are tested and implemented throughout selection, procurement, development, testing, deployment and production life cycles.<br>Which statement best describes your information and technology security policy?<br>1 - Security policy is established and communicated to organization leadership.<br>3 - A security policy is established, maintained, and disseminated that addresses requirements and accountability for all employees.<br>5 - Security and intellectual property policy includes contractors and vendors, ongoing monitoring and evaluation practices as well as frequent risk assessment based on business objectives and environment.<br>How often does your organization evaluate the security of its infrastructure?<br>1 - Security is evaluated reactively as threats are identified.<br>3 - Security is evaluated proactively but manually based on potential risk analyses.<br>5 - Automated security technologies constantly probe for threats and weaknesses. |
| People & Facilities | How is physical entry into your facility managed?<br>1 - Security officers and personnel photo identification cards.<br>3 - Electronic access control - Magnetic strip access or identification cards.<br>5 - Layered identification cards with hidden text and nano printing (overt, covert and forensic visual security); smart cards containing microprocessors; biometric controlled access.<br>What kind of screening methods are used for your job applicants?<br>1 - Reference checks and drug screening.<br>3 - Background checks including credit, criminal history, and education.<br>5 - Personnel Reliability Programs (PRP) with the ability to assess employees loyalty, trustworthiness, mental stability, and affinity towards violence and exploitation.<br>What preventative measures are taken to ensure safety and avoid risk?<br>1 - Sporadic emphasis on safety training and risk assessments with site level accountability, that includes security assessment in site selection process, but lacks offshore emergency planning structure (if offshore is applicable).<br>3 - Safety training and risk assessments with regional or business unit accountability that includes annual self-security assessments and minimal offshore emergency planning capability (if offshore is applicable).<br>5 - Enterprise mandated safety, risk, and response training executed at site level that includes annual self-security assessments plus periodic third party security assessments and formally defined offshore emergency planning capability updated and/or refined at least annually (if offshore is applicable).<br>What kind of prevention tools are used to prohibit unauthorized access to your facility? |

TABLE 11-continued

Exemplary organization of questions and exemplars associated with attributes and capabilities of a care infrastructure domain

| | |
|---|---|
| | 1 - Security personnel, physical barriers and key card access.<br>3 - Integrated access control with closed-circuit television cameras; work space compartmentalization; electronic/magnetic door locks; minimal perimeter security.<br>5 - Biometrics applications to closed circuit television capabilities; fully integrated perimeter security to include employee parking lots.<br>What kind of methods are used for fraud detection and prevention?<br>1 - Reactive response to fraudulent activities and no fraud tracking system.<br>3 - Some ability to prevent fraudulent activities (ex: agents trained to identify possible fraudulent activities and use login based access to business systems).<br>5 - Defined methods of predicting and preventing fraudulent activities using trend analysis, agent activity monitoring applications, and biometric access to business systems. |
| Data Governance | Describe your organization's data ownership and accountability practices.<br>1 - Data is scattered throughout the organization with no ownership or accountability for data quality.<br>3 - The IT organization maintains sole ownership with data steward accountability for data quality.<br>5 - Joint ownership of data between IT and business teams with process owner accountability for data quality.<br>What kind of processes are in place to manage changes to your organization's data?<br>1 - Data is accessible "on demand" by a number of non-standardized tools without consideration of permissions based access. There are no formal data standards for what is published in a warehouse. Requests are satisfied with no long term process to integrate sources into a common structure for use across the business.<br>3 - There are department specific processes to add new data sources and integrate into the data warehouse. Changes made are not made available to the rest of the business.<br>5 - Formal process in place to add new sources and integrate information into the data warehouse. Once changes are made, modifications are available to all users and are communicated to ensure awareness across user communities.<br>Which statement best describes the level of standardization for data naming conventions and data calculations?<br>1 - Non-standardized naming conventions and multiple, data definitions and/or calculations throughout the organization.<br>3 - Naming conventions standardized but there are multiple data definitions and/or calculations throughout the organization.<br>5 - Naming conventions and calculations/definitions standardized by business best practice with data arbitration.<br>How defined and accessible is your organization's meta data?<br>1 - Data definitions are partially defined with no centralized management.<br>3 - Meta Data is defined but is housed in siloed data dictionaries.<br>5 - Meta Data is well defined and accessible across the enterprise.<br>Which statement best describes your organization's data platform?<br>1 - Data is spread across multiple databases and multiple platforms with no standardization or integration in place.<br>3 - Use of a single platform with multiple departmental databases based on individual needs.<br>5 - Use of a single, standardized and integrated database platform to support business intelligence needs.<br>What kind of data access tools are in place?<br>1 - Data access to sources is not standardized or monitored. Investment in multiple access platforms may occur.<br>3 - Standard access tool is in place but utilization is not tracked or required.<br>5 - Use of a centrally managed corporate access tool for all business intelligence needs.<br>What kind of data access tool training is in place?<br>1 - Centralized training does not exist.<br>3 - Training often has to address central access tool as well as other tools which leads to non-standard training or other inefficiencies.<br>5 - Centralized training of tools is in place to ensure common understanding of tool sets and data elements.<br>Which statement best describes your organization's level of data source integration?<br>1 - Data sources are created with ad hoc data which may satisfy single needs but provides no structure or knowledge across the business.<br>3 - Data sources are defined and accessible by business unit for unique needs, however enterprise view of data is not available.<br>5 - Integrated and accessible data sources provide information across the enterprise. |
| Data Quality Management | How would you describe the defect prevention methods and standards in place for data quality management?<br>1 - Use of data defect detection is at the application level, with varying use of standards.<br>3 - Use of unified standards to detect data defects. Individual business domains are responsible for compliance with standards. |

TABLE 11-continued

Exemplary organization of questions and exemplars associated with attributes and capabilities of a care infrastructure domain

| | |
|---|---|
| | 5 - Unified standards are adopted at the enterprise-wide level to prevent data defects.<br>Which statement best describes the data de-duplication standards in your organization?<br>1 - Data de-duplication standards are not used.<br>3 - Data de-duplication is done in real time as data is stored on disk with risk of unique data being deleted.<br>5 - De-duplication done as background task after data stored in system. Every byte is compared, ensuring 100% data fidelity.<br>How are data defects detected?<br>1 - Detection of data errors is based on reports of problems with no automated monitoring in place.<br>3 - Automated, rules-based error detection is in place, coupled with manually reported data errors.<br>5 - Automated error detection is in place with proactive source data filters to identify and fix problems.<br>How are data defects cleansed?<br>1 - Cleansing is based on reactive research to identify and fix problems.<br>3 - Data cleansing process is reactive based on errors that are found.<br>5 - Data cleansing process is proactive.<br>Which best describes the data quality metrics utilized?<br>1 - Data quality metrics are non existent or non-standardized. There is no process in place to ensure accountability of data quality.<br>3 - Data quality measured through granular metrics but processes are not defined to promote accountability.<br>5 - Data quality process is in place based on the ability to manage data, not just based on errors captured. Processes are in place to hold individuals accountable for data quality.<br>How are data quality issues addressed?<br>1 - Quality issues not addressed due to lack of quality metrics and feedback.<br>3 - Quality issues addressed in warehouse and analytic reporting platforms.<br>5 - Quality issues are addressed at the source for target analytic data. |
| Data Enhancement | What types of data does your organization utilize?<br>1 - Internal data is captured in core business systems. Internal demographic data may be derived.<br>3 - Internal data is captured in a basic data warehouse and may be combined with purchased demographic/firmographic data.<br>5 - Internal data is managed and coupled with purchased demographic/firmographic as well as attitudinal, behavioral, and Customer Satisfaction (CSAT) data in a robust data warehouse.<br>Which of the following best describes your organization's use of integrated data for decisioning?<br>1 - Data is used for back office analysis and decision making, with no integration with front office or customer service for decision making.<br>3 - Data is mostly used for back-office analysis and decisioning, with some access for customer service to review transactional data during contacts.<br>5 - Information is fully integrated with front office decisioning. Data analytics are used to calculate and push decisions to the customer service team to drive customer treatment and offers.<br>How would you describe your organization's ability to validate its data?<br>1 - Limited or no ability to test the validity of data and how it is used for decision making. Assume data does what it should.<br>3 - Steps are in place to periodically validate data for accuracy, with no formal process to cleanse data problems.<br>5 - Robust ability to validate the utility of data through alignment with data governance practices.<br>Which statement best describes the relevancy of your company's data?<br>1 - Data not refreshed and quickly loses relevance to ensure adequate decision making.<br>3 - Data used for analytic guidance but is not refreshed in timely manner to ensure relevant real time decisioning.<br>5 - Analytic engine is self-learning to harvest data and ensure decisions are based on current information. Purchased data is regularly refreshed to ensure business relevance. |
| Data Privacy | How is the effectiveness of your data investment measured?<br>1 - Data investment is not measured to ensure investments are driving results.<br>3 - Some measurement of program success when integrated data is used, with no direct links to tie success to data versus other factors.<br>5 - Use of integrated data is measured and tracked to ensure proper return on investment from purchased data and analytic investments.<br>What encryption methods are used to ensure the privacy of your customer's data?<br>1 - Minimal standards for data encryption.<br>3 - Encryption of data in flight with decryption at rest through SSL and VPNs.<br>5 - 3DES or AES encryption of the data warehouse, encryption/decryption takes place as data is moved into and out of the database. |

TABLE 11-continued

Exemplary organization of questions and exemplars associated with attributes and capabilities of a care infrastructure domain

|  |  |
| --- | --- |
|  | How is your organization's data privacy program communicated?<br>1 - Privacy program poorly defined and communicated.<br>3 - Employee awareness of privacy program requirements and appropriate use of information.<br>5 - Employee and third party awareness of privacy program requirements and appropriate use of information.<br>Which best describes the extent to which database auditing is employed to ensure customer data privacy?<br>1 - Limited database auditing capabilities.<br>3 - Database auditing through basic trending analysis of overall identification and authentication, authorization, usage and performance.<br>5 - Database auditing through trending of granular metrics for number of individual identifications and authentications, authorizations, usage and performance.<br>How is your organization notified of potential threats to data privacy?<br>1 - Experience and react, threat is not visible until it occurs.<br>3 - Manual threat identification through trending.<br>5 - Automated real-time notification of threat events with configurable alert thresholds, real-time alerts and session auditing. |
| Data Compliance Management | Which of the following best describes your organization's data compliance (accountability, integrity, custodianship, risk management and standardization) management strategy?<br>1 - Compliance initiatives are considered a hindrance to efficient business practice.<br>3 - Compliance initiatives are established reactively and are not part of the strategic business plan.<br>5 - Compliance initiatives are considered in support of the basic strategy.<br>Who in your organization is accountable for data compliance (accountability, integrity, custodianship, risk management and standardization) management?<br>1 - Individual accountability with no management oversight.<br>3 - Group accountability without management control.<br>5 - Management accountability through review to make sure appropriate standards are met.<br>What level of custodial obligation do your corporate leaders have for data compliance management?<br>1 - Corporate leaders have a custodial obligation to protect the financial value of the organization.<br>3 - Corporate leaders have a custodial obligation to protect the company reputation and financial value of the organization.<br>5 - Corporate leaders have a custodial obligation to protect the company reputation, financial value of the organization and customer data.<br>How are risk assessments and controls used for data compliance management?<br>1 - No risks assessments are conducted. Controls for customer data have not been defined, or are outdated.<br>3 - Risk assessments are conducted to capture the tangible costs but strength of controls for customer data are not evaluated.<br>5 - True risk assessments are conducted to capture opportunity costs of tangible and potential intangible losses and evaluate the strength of controls for customer data.<br>What role does standardization play in your data compliance management efforts?<br>1 - Non-standardized data structures and architecture<br>3 - Standardization as a means of meeting operational objectives for streamlining.<br>5 - Architectural standardization as a means of meeting compliance and risk challenges. |
| Integration Competency Centers | How would you describe your organization's methodology for data integration?<br>1 - Integration processes are managed on a project by project basis. Best practices and standards are not leveraged across all projects.<br>3 - Integration strategy defined in technical requirements established by system silo SMEs, data stewards and/or systems engineers during data warehouse implementation. Complies with industry accepted Data warehouse best practices.<br>5 - Federated Enterprise integration strategy defining uniform approaches and techniques for re-use to stream-line data integration by the direction of the governance center which defines and set's the integration policies, processes and standards and architecture.<br>What kind of governance or policies exist for data integration?<br>1 - Business users are reliant on developer and/or programmer to govern and handle underlying integration techniques on an ad-hoc basis. These are accepted by the business user at the end of the implementation. Governance policy is loose and is defined by what produces the delivered results.<br>3 - Integration maps objects, and/or stored procedures are defined, and governed by ETL and/or integration developer teams to conform to standards for code maintenance and reuse.<br>5 - Executive level sponsorship, of governance center having multiple skills both business policy and data management. Roles are defined and subject matter experts set the governance and policies to set the direction for data integration including processes, standards, and architecture before implementation and/or development. |

TABLE 11-continued

Exemplary organization of questions and exemplars associated with attributes and capabilities of a care infrastructure domain

| | |
|---|---|
| | Which statement best describes your architecture? |
| | 1 - Architecture and tools are not standardized nor fluid across projects. Integration processes are not unified and may not be reusable. Integration is point to point and sometimes ad-hoc. |
| | 3 - Architecture enforces technical consistency in software and hardware. Integration activities are characteristic of a common platform, although, a central technology environment is not, supported. A MetaData repository may exist for managing data and integration artifacts. However, allows for developer creativity often leading to inconsistent integration techniques and results. |
| | 5 - Leverages federated architecture for a consistent, standardized approach to integrating and leveraging data assets. Tools are standardized and are shared across the enterprise. Provides common and supported technical environments and integration hubs adopting UDS (Universal Data Services) approaches to delivery and reusability. |
| | Which statement best describes the data integration interface tool used by your organization? |
| | 1 - A web page may exist as a data dictionary detailing transformation rules but are limited and/or non-existent for integration rules applied across disparate systems. |
| | 3 - The interface is the ETL tool and/or MetaData Management tool. Accessibility is usually limited to developers and/or data analysts. |
| | 5 - A robust interface allows searchable integration artifacts. Policies can be updated and changed via 'natural language' and accessed by users, developers and policy owners. This typically accomplished via an Enterprise Application Integration (EAI) Tool or a Service Oriented Architecture (SOA) toolset. |
| Design | How would you describe your organization's floor space design? |
| | 1 - Hierarchical orientation based on job level. |
| | 3 - The emphasis is to minimize the necessary square foot per person by using. smaller workstations for agents, while retaining hierarchical orientation for remaining positions. |
| | 5 - the emphasis is to provide the "right sized" and more usable workspace. It incorporates things like flat screen technology and adjustable keyboard mechanisms, efficient furniture configurations with built in ergonomics, that create an atmosphere conducive to work. |
| | Current answers has floor space design and components/ergonomics. |
| | When thinking about the design of how electrical power is delivered to workstations, which statement best describes your company's use of modular power? |
| | 1 - No use of modularity. |
| | 3 - Some modular electrical components. |
| | 5 - Modular solutions for electrical systems. |
| | When thinking about the design of how communications connectivity is delivered to workstations, which statement best describes your company's use of modular data/communications wiring systems? |
| | 1 - No use of modularity. |
| | 3 - Some modularity for data systems; communication remains direct wire. |
| | 5 - Modular solutions for data and communications wiring systems. Wiring is typically concealed in furniture or the floor or ceiling. |
| | When thinking about your company's ability to utilize agent workspaces, which of the following best describes your organization's seating flexibility? |
| | 1 - Dedicated seats per agent or work group. |
| | 3 - Dedicated seats per work group and flexible location for agents/advisors. |
| | 5 - Use of technology to maximize utilization of capacity, especially as program changes necessitate seating changes. |
| | Which statement best describes the type of amenities available at your facility? |
| | 1 - Minimal provisions for break rooms (no food service). |
| | 3 - Break Room with vending machines, external smoking area provided. |
| | 5 - On-site food service capabilities; smoking area; employee lounge/break-out space. |
| | What kind of training facilities are available at your company? |
| | 1 - Limited or no training capabilities on-site. |
| | 3 - Training rooms with minimal technology tools. |
| | 5 - Training rooms designed with capabilities for multi-media training delivery and hands-on training experience. |
| Physical Surroundings | How would you describe the walls in your facility? |
| | 1 - White or beige, empty walls. |
| | 3 - Painted walls and motivational artwork with inspirational messages. |
| | 5 - Cool hues for a calming and productive work environment to stimulate creativity and alertness. |
| | Which statement best describe the lighting in your facility? |
| | 1 - No consideration or priority for lighting. |
| | 3 - Direct fluorescent lighting. |
| | 5 - Combination of direct and indirect lighting. |
| | What kind of consideration is given to the acoustics in your facility? |
| | 1 - No consideration or priority for acoustics. |
| | 3 - Some efforts made for sound dampening. Examples can include high cube walls, acoustic ceiling and carpeting. |
| | 5 - Noise cancellation systems to dampen ambient noise levels; Sound-masking to introduce voice spectrum sound waves and minimize acoustic distraction. |

TABLE 11-continued

Exemplary organization of questions and exemplars associated with attributes and capabilities of a care infrastructure domain

| | |
|---|---|
| | What kind of consideration is given to ergonomics for workstations in your organization's contact centers?<br>1 - Little consideration to ergonomics.<br>3 - Ergonomics as a program, retrofitting to existing environment. (e.g. There is an organization to call if you have a back problem).<br>5 - Ergonomics as a process that is deployed throughout the organization that drives the environment design. |
| Site Selection | When opportunities arise to select one customer care site over another, what are the primary drivers for your organization's site selection decisions?<br>1 - Site selection decisions are reactive to increased workload and driven primarily by labor rate.<br>3 - Selection decisions are near term focused and driven by primarily by labor rate and speed to market.<br>5 - Selection decisions are considered a strategic investment in the organization's future success and part of the overall business strategy driven by long term risk vs. reward planning.<br>To what extent does your company have access to profile information that provides additional "apples to apples" information used to evaluate one site's attractiveness versus another?<br>1 - Basic site profiles are created or bought whenever sites are needed including literacy rates, average salaries, costs of facilities and vendor services.<br>3 - Site profiles are centrally managed in a database that allows for easy comparison. Detailed information expanded to include key workforce demographics, competitive employers, access/transportation infrastructure.<br>5 - Centrally managed site profile that includes up to date assessments of geopolitical, disaster and environmental risk, potential labor law issues and local government incentives.<br>Which of the following best describes your organization's criteria for detailed site analysis?<br>1 - Assessments are generally one dimensional and focus on buy-in costs and Net Present Value (NPV).<br>3 - Detailed analysis performed that includes potential costs in light of market segmentation needs, complexity of work and matching of cultural values.<br>5 - Proficiency with analysis tools that demonstrate total cost of ownership and return on investment and allow evaluation of dimensions such as customer segmentation needs, business culture and values and local work ethic.<br>Who does your organization partner with to perform site evaluations?<br>1 - Site selection evaluations performed with property owners.<br>3 - Site selection evaluations performed with property owners and local governments.<br>5 - Site selection evaluations retain local legal counsel and is performed with property owners and local/regional governments. |
| Facilities Management | Which statement best describes the approach to managing existing facilities?<br>1 - Task oriented lease negotiation. Limited due diligence.<br>3 - Engage business unit representatives to provide input on value added workplace solutions.<br>5 - Developing overall workplace solutions that integrate real estate, technology and Human Resources.<br>How would you describe your company's facility maintenance?<br>1 - Routine maintenance programs; decentralized maintenance functions.<br>3 - Combination of preventive and routine maintenance; centralized facility maintenance.<br>5 - Combination of predictive, preventive and routine maintenance to maximize lifecycle of building systems; combination of centralized and local facility maintenance to increase consistency and maintain responsiveness.<br>How does your organization manage its maintenance activities?<br>1 - Manual management of maintenance activities.<br>3 - Computer-based tracking of maintenance work orders; minimal automation and cost reporting.<br>5 - Computerized maintenance management software (CMMS) support to record all work order data, including status and cost to complete.<br>Which statement best describes your company's energy management (cost) considerations?<br>1 - No energy management considerations.<br>3 - Energy management systems limited to HVAC systems.<br>5 - Integrated building management system to control HVAC, lighting and other systems for maximum energy efficiency. |
| Homeshoring | Which best describes your company's hiring practices for home-based agents?<br>1 - Skills-based assessments that do not identify the characteristics required for a successful home-based agent.<br>3 - Skills and competency-based assessments to understand how agent will perform in a home-based environment.<br>5 - Skills and competency-based assessments combined with personality and communication style profiling to understand how agent will perform in a home-based environment. |

TABLE 11-continued

Exemplary organization of questions and exemplars associated with attributes and capabilities of a care infrastructure domain

|  |  |
|---|---|
|  | How often is training conducted for your home-based agents?<br>1 - Initial training with limited follow up.<br>3 - Initial training with continuation e-learning based on new product launches or service offerings.<br>5 - Initial training with continuation e-learning to fine-tune skills, reinforce processes, communicate policy changes and train staff on new product or service offerings.<br>How are policies and procedures applied to your home-based workforce?<br>1 - Human resources and legal policies are applied to remote workforce without modification.<br>3 - Human resources and legal polices are reviewed at the onset of the program and modified for application to remote workforce.<br>5 - Human resources and legal polices are routinely reviewed and updated and distributed as contractual obligations to the remote workforce.<br>How are performance scorecards utilized for your home-based workforce?<br>1 - Individual agent performance metrics are not provided, operational metrics are used for entire agent base, limited feedback capabilities due to lack of individual metric comparisons.<br>3 - Performance-management scorecard that compares remote workforce performance against in house staff performance, limited feedback capabilities due to lack of individual metric comparisons.<br>5 - Performance-management scorecards that closely identify organizational goals to provide comparison of home-based agent performance to remote and in house workforces as well as industry averages to drive consistent performance feedback, frequent coaching and timely information.<br>What kind of governance structure (leadership and management) is in place for your home-based workforce?<br>1 - Governance structure is not clearly defined.<br>3 - Siloed governance structure applicable to home-based agents only.<br>5 - Standardized and centralized governance across all agent types. |
| Integration Methodology | Which of the following best describes your organization's approach to system integration?<br>1 - Continued development of stand alone systems with batch data links and multiple interfaces, waiting on new technology approach.<br>3 - Replacement and package deployment efforts to partially replace existing functions, but not to the point that legacy systems can be streamlined or eliminated.<br>5 - Comprehensive architecture transition strategy to prioritize and drive migration, integration, acquisition and replacement efforts of highly coupled, legacy applications.<br>Which statement best describes your organization's knowledge of current IT inventory and the impacts to that inventory from systems integration efforts?<br>1 - Lack of inventory and categorization of systems leads to potentially conflicting redevelopment efforts.<br>3 - Inventory and categorization of most common systems has been developed to determine reusability. Secondary applications have not been inventoried and may be susceptible to conflicting development efforts.<br>5 - Inventory and categorization of all systems is referenced to determine reusability and impacts. Often includes pre-planning plan to accommodate high priority maintenance requirements.<br>How would you describe your organization's current operations regarding systems integration and development efforts?<br>1 - Continued maintenance of legacy, systems is supported to keep the business running "as-is."<br>3 - Use of interim solutions such as middleware, GUI front ends and many patchwork interfaces to legacy environments, which management views as adequate for the time being.<br>5 - There is a transitional approach to phased shutdowns of legacy systems, data structure migration and implementation of radically different technical environments.<br>Which of the following best describes the criteria used in the decision making process for systems development and integration.<br>1 - Decisions are frequently based on customer/market demand and/or qualitative perception of business need.<br>3 - Decisions are based on stand alone business case and/or cost/benefit analysis with no overall consideration for other business objectives.<br>5 - Decisions are based on overall business strategy and requirements and systems needed to meet business objectives. |
| Requirements Management | Which of the following best describes your organization's methodology for gathering systems integration requirements?<br>1 - There is no formal, documented requirements gathering methodology or if there is a methodology, it is not enforced or followed. Stakeholders not included in the requirements process or are involved too late.<br>3 - There is a solid requirements gathering methodology to elicit requirements, manage changes and trace-ability, and validate the requirements. Methodology is adhered to in most cases. Stakeholders are included in the requirements gathering process. |

TABLE 11-continued

Exemplary organization of questions and exemplars associated with attributes and capabilities of a care infrastructure domain

| | |
|---|---|
| | 5 - There is a formal requirements gathering methodology in place and enforced. Stakeholders are included in the requirements gathering, validation, and change management process. |
| | How does your organization track changes to (Systems Integration) requirements documents? |
| | 1 - There is inconsistent requirements storage, maintenance and versioning. There is no ability to analyze changes in requirements over time, lack of requirements standards, and no use of best practices. |
| | 3 - Change control process is in place and integrated with requirement versioning. |
| | 5 - Centralized requirement storage and versioning systems in place. There is also the ability to track changes to versions and manage change control process. |
| | Which of the following best describes the skill sets and the people who develop and manage (Systems Integration) requirements documentation and processes? |
| | 1 - Resources have basic training on requirements gathering/methodology. Resources have no formal team managing the requirements documentation or process. |
| | 3 - There is a specialized requirements team in place but there is no formal training process in place to ensure that a standard methodology and best practices are used. |
| | 5 - There is a specialized team in place to capture business requirements. This team is trained on methodology, standards, and best practices. |
| | Which statement best describes the testing process before a new (Systems Integration) development project is launched into production? |
| | 1 - Test cases are generated for testing but not necessarily linked to requirements. |
| | 3 - Test cases are generated that specifically test compliance with requirements documents, however inconsistent tracking between requirements and test case results occur. |
| | 5 - Test cases are generated that specifically test compliance with requirements documents and also ensure system functionality meets business needs. Metrics are in place to quantify defects and change process is in place to fix defects quickly. |
| Implementation Support | Which statement best describes the checks and balances in place prior to starting the implementation process? |
| | 1 - Control and audits are reviewed on an exception basis and are not designed into the implementation process. |
| | 3 - Major controls in place but are not consistent across all business functions (e.g. looking at financial controls, but not capacity). |
| | 5 - Controls and audits are designed into the turnover process, including review of systems, capacity, and financial controls. Each group reviews the appropriate audit and controls. |
| | Which of the following best describes the communication level during the implementation phase of a Systems Integration? |
| | 1 - Communications to stakeholders is not timely, accurate and consistent. |
| | 3 - Communication to stakeholders is usually timely, accurate and consistent. |
| | 5 - Communication to stakeholders is always timely accurate and consistent. |
| | Which of the following best describes the levels of documentation used during the implementation phase of a Systems Integration? |
| | 1 - Documentation is not complete for user and/or and there is no catalog for updates to documentation or process. |
| | 3 - Documentation is created but not cataloged to enable stakeholder access and there is no process to maintain documentation as changes occur. |
| | 5 - Documentation is created and is cataloged and viewable to all stakeholders. Processes exist to update documentation as changes occur. |
| | If a Systems Integration project involves converting from one system to another, which of the following best describes how your organization handles the system conversion? |
| | 1 - Manual conversion process is in place, but there is no process used to manage exceptions. There is a lack of conversion audit reports and controls. Data integrity issues are often identified in the production environment following conversion. |
| | 3 - Conversion process is tested thoroughly and reports are produced to identify exceptions. All testing exceptions are addressed, but no process exists to fix conversion exceptions found during the production run. |
| | 5 - Conversion process is thoroughly tested and data is validated. Any exceptions are addressed during the testing process. Production conversion uses automated exceptions process to catalog and manage bad data. |
| | Which of the following best describes the level of prework and preparation made to your organization's technical and network components prior to Systems Integration? |
| | 1 - System and network components are ready for implementation just in time with little system testing occurring within the production environments. |
| | 3 - Full testing of all systems and network components happen in production-like environment but there is no full integration testing to ensure all components work together. |
| | 5 - Full testing has been performed on an integrated systems with full stress test using systems and volumes that mirror production. |
| | Which of the following best describes production support's (systems help desk) level of involvement during systems implementations? |
| | 1 - Production support is not engaged in the implementation process throughout |

TABLE 11-continued

Exemplary organization of questions and exemplars associated with attributes and capabilities of a care infrastructure domain

|  |  |
|---|---|
| | the lifecycle, leading to lack of standards and missed steps during the implementation process. No single group is designated to run the implementation.<br>3 - Production support is engaged in the implementation process, but standards may not be followed to ensure ongoing support. The implementation team is disjointed with lack of oversight over all areas.<br>5 - Production support team has undergone training and is fully ready to manage the system using applicable standards. An Implementation manager is in place to coordinate the implementation and ongoing communications in order to address any problems to prevent delays. |
| Program/Project Management | Which of the following best describes program/project management within systems integration development departments?<br>1 - There is little program management and coordination. Individuals or independent teams may be tasked to project manage but have inconsistent project management skill sets.<br>3 - Informal program management functions occurs for more complex projects and/or releases. Standard project management tool sets are used to track and manage projects.<br>5 - Formalized program management groups coordinates activities for multi-phase projects and all integrated releases. PMI (Project Management Institute) or other standard certification qualifications for project managers including robust process, toolset and standardized training.<br>Which of the following best describes the level of (program management) planning that goes into systems integration and development?<br>1 - There are individual, high-level project plans created as a guide but contain minimal milestones.<br>3 - There are standardized project plan templates which include standard milestones and work breakdown schedules.<br>5 - There are standard project plans with milestones and schedules which integrate to master program plan that highlights dependant projects to ensure maximum coordination.<br>How are program management related changes handled during systems integration or development?<br>1 - No formal change control process for program management.<br>3 - Changes to the scope, schedule and/or budget are approved by project manager.<br>5 - Changes to scope, schedule and/or budget are identified, documented, and estimated for impact before approval by program management and or change control board.<br>To what extent are projects tracked during systems integration and development?<br>1 - Inconsistent or irregular status reporting outside of project plan.<br>3 - Status reporting through milestone and/or percentage completion.<br>5 - Proper execution and control of the project baseline ensured through cost and schedule tracking through earned value analysis, communications tracking, issue and action item tracking, regular status reporting, and phase containment.<br>To what extent are "lessons learned" captured as a part of systems integration and development?<br>1 - No lessons learned review.<br>3 - Project managers identify lessons learned and incorporate them into their own future projects.<br>5 - Formalized review lessons learned from individual projects and across overall program(s) are integrated into development standards, future project management. |
| Quality Assurance Management | Which of the following best describes your organization's software Quality Assurance team?<br>1 - QA team reports under lower-level manager of other IT disciplines and does not have authority or autonomy to enforce practices.<br>3 - Established quality assurance organization, but does not have full authority and autonomy to enforce practices.<br>5 - Established quality assurance organization with authority and autonomy to enforce Quality Assurance.<br>Which of the following best describes the current state of your company's testing methodology?<br>1 - Testing methodology is not clearly defined, documented or communicated, insufficient time is allocated to testing. Quality checks are conducted upon release.<br>3 - Testing methodology allows some time for review, and test coverage is based on entrance/exit criteria, which may not be complete. Test time may be reduced as schedule slips and quality checks are infrequent or at the end of the schedule.<br>5 - Testing methodology defines a test strategy using technical requirements to support quality checks throughout the development lifecycle for timely risk assessment. Sufficient test time is scheduled.<br>Which best describes the level of completeness for Quality Assurance (testing) requirements?<br>1 - Requirements are incorrect, vague, incomplete, not fully documented and not fully testable.<br>3 - Complete and testable requirements are developed and documented, but are not frozen at a defined point in time.<br>5 - Clear, complete, accurate, attainable, testable and measurable requirements are developed documented approved and frozen by all team members. |

TABLE 11-continued

Exemplary organization of questions and exemplars associated with attributes and capabilities of a care infrastructure domain

| | |
|---|---|
| | Which of the following best describes the management of test cases?<br>1 - Test cases may be developed and documented, but there is no ability to link test cases back to individual requirements. Tracking typically does not exist.<br>3 - Test cases are documented and tracked manually, facilitating an unstructured approach to creating, tracking and managing test cases, requirements and results.<br>5 - An integrated test case management tool is used for facilitating a structured approach to creating, tracking and managing test cases, requirements, and results.<br>To what extent does your company's Quality Assurance testing environment simulate the production environment?<br>1 - Environment does not simulate production and testing and planning is mostly manual.<br>3 - Test environment simulates production and test tools support concurrent completion of tasks to minimize redundancy.<br>5 - Test environment mirrors production environment and automated test tools are used to provide comprehensive test coverage throughout development and production. |
| Maintenance and Operations Support | Which of the following best describe the level of documentation created to support a newly integrated system's maintenance and ongoing operations?<br>1 - System operations documentation (Ops procedures, data flow, network and system topology) is not complete or it has not been created. There is no centralized repository of existing documentation or process in place to ensure updates are made. The support workflow is not documented nor understood.<br>3 - Systems operations documentation is developed and cataloged, however there is no process in place to maintain ongoing changes. The support workflow is not well understood.<br>5 - Systems operations and documentation have been developed and are cataloged in a centralized repository for access to all parties. Documentation is maintained as changes occur. Support workflow is well known.<br>Which of the following best describes the post-release transition from development to operational support?<br>1 - Development and maintenance teams are the same group or verbal hand off occurs from one team to the other with minimal training and documentations.<br>3 - Transition occurs with sufficient training and coordination. Operations team is trained on incident and change practices.<br>5 - Transition from development team to operations support team occurs with sufficient training and coordination. Operations team is fully trained on incident and change policies. Development team continues to work with Ops team to fix defects for several weeks following launch to production.<br>How are ongoing systems changes for integrated systems managed within your organization?<br>1 - Changes are made to the system in an ad hoc manner without proper controls, tracking, or communication to stakeholders.<br>3 - Changes are tracked, communicated and implemented through formal release process to minimize risk.<br>5 - All changes are tracked, and communicated through controlled processes that provides coordination and communication with all stakeholders while allowing timely implementation of changes via maintenance windows as well as releases.<br>Which statement best describes the backup and recovery measures your organization has in place for integrated systems?<br>1 - Back ups occur but there is no formal process to catalog and manage recovery, resulting in significant delays to the recovery process.<br>3 - All critical data and systems components are backed up based on business criticality. Back-ups are not cataloged and documented in order to recover in real time, requiring time to locate back-ups and complete the restore process.<br>5 - All critical data and systems components are backed up based on business criticality. Program libraries are maintained and data is stored offsite with automation in place to identify and back up data. Version control system is used to maintain data integrity.<br>How would you describe the (fail-over) redundancy of your newly integrated applications?<br>1 - Applications run on a single server and if server is down, the application is down.<br>3 - Applications run on a clustered environment and have local fail-over redundancy, but no proactive monitoring.<br>5 - Applications run on a clustered environment and have local fail-over redundancy. There is proactive server and network monitoring to notify support team of potential or real failures. |

Of course, it should be understood that the organization set forth in tables 8-11, as well as the questions and exemplars set forth therein, are intended to be illustrative only of a particular type of organization which could be used in an implementation of certain aspects of the teachings of this application, and should not be treated as limiting on claims included in this application or which claim priority from this application.

When the response interface shown in FIG. 3b is presented to the user, in addition to questions [301][302][303] the user is also provided with exemplars [304] which, in the exemplary implementation, are statements used to assign meaning to the numeric scores chosen by the SME for each question. As will be apparent to those of ordinary skill in the art, the exemplars could correspond directly to the exemplars set forth above in tables 8-11. Thus, in some implementations, there could be a direct correspondence between data stored in a manner shown in tables 8-11, with SMEs presented with those questions taken from rows of attributes relevant to the capabilities within the identified subject matter expertise. Once the SMEs have completed the questions presented to them the data would be stored at the server [201] for subsequent use in prioritizing capability enhancements.

Figure 3C:
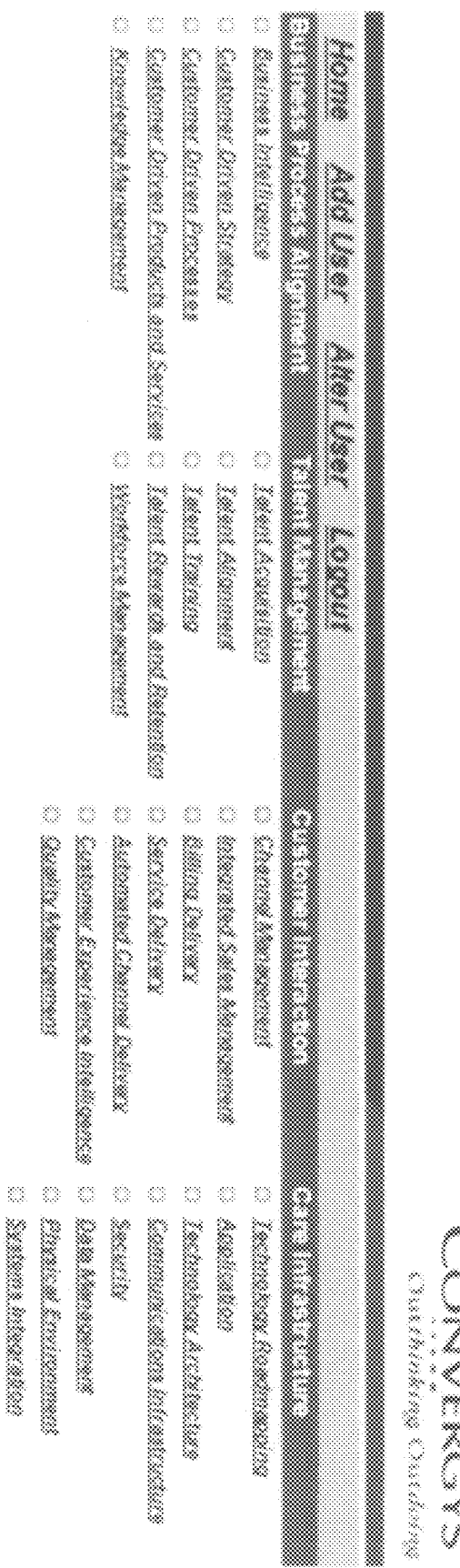
FIG. 3c depicts a capability selection screen which could be used in a computerized survey tool.
Figures 1, 3C:
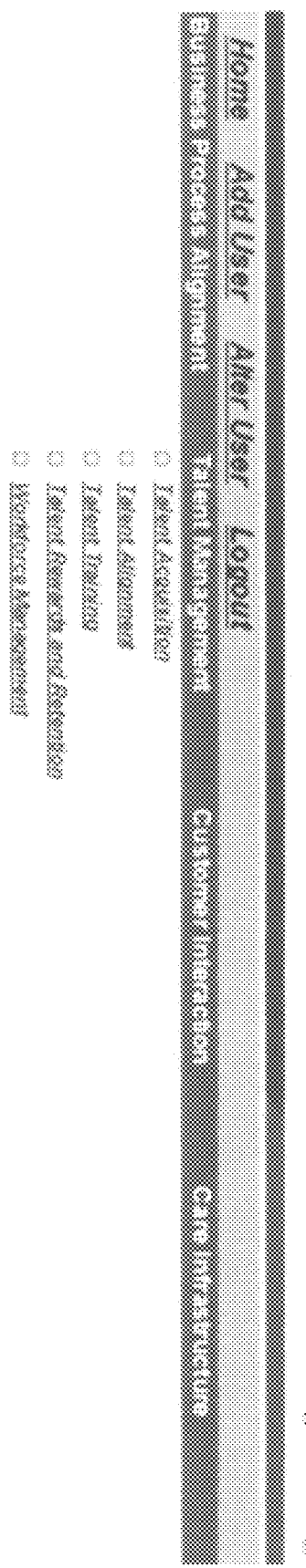
Figure 3D:
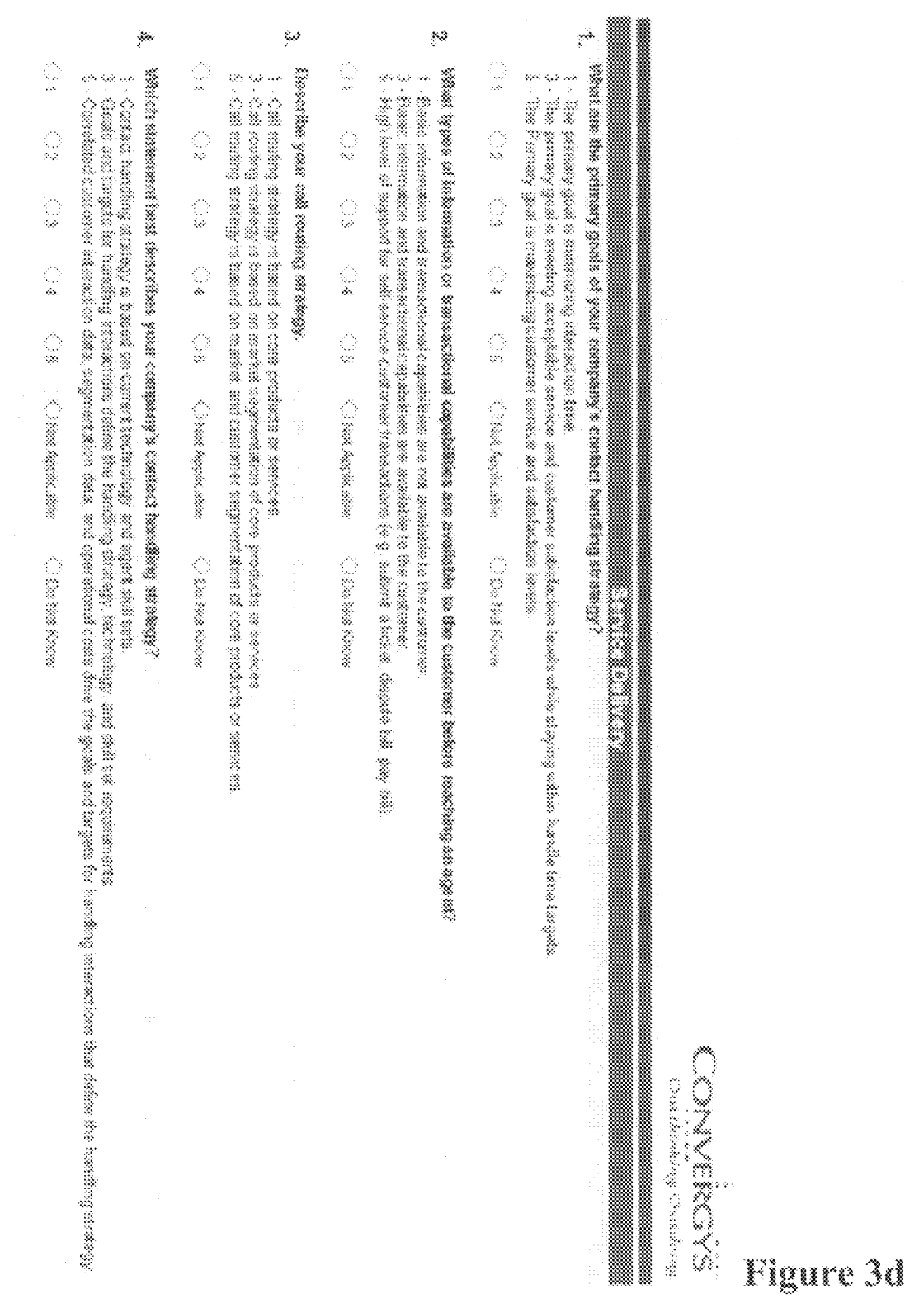
Figures 2, 4A:
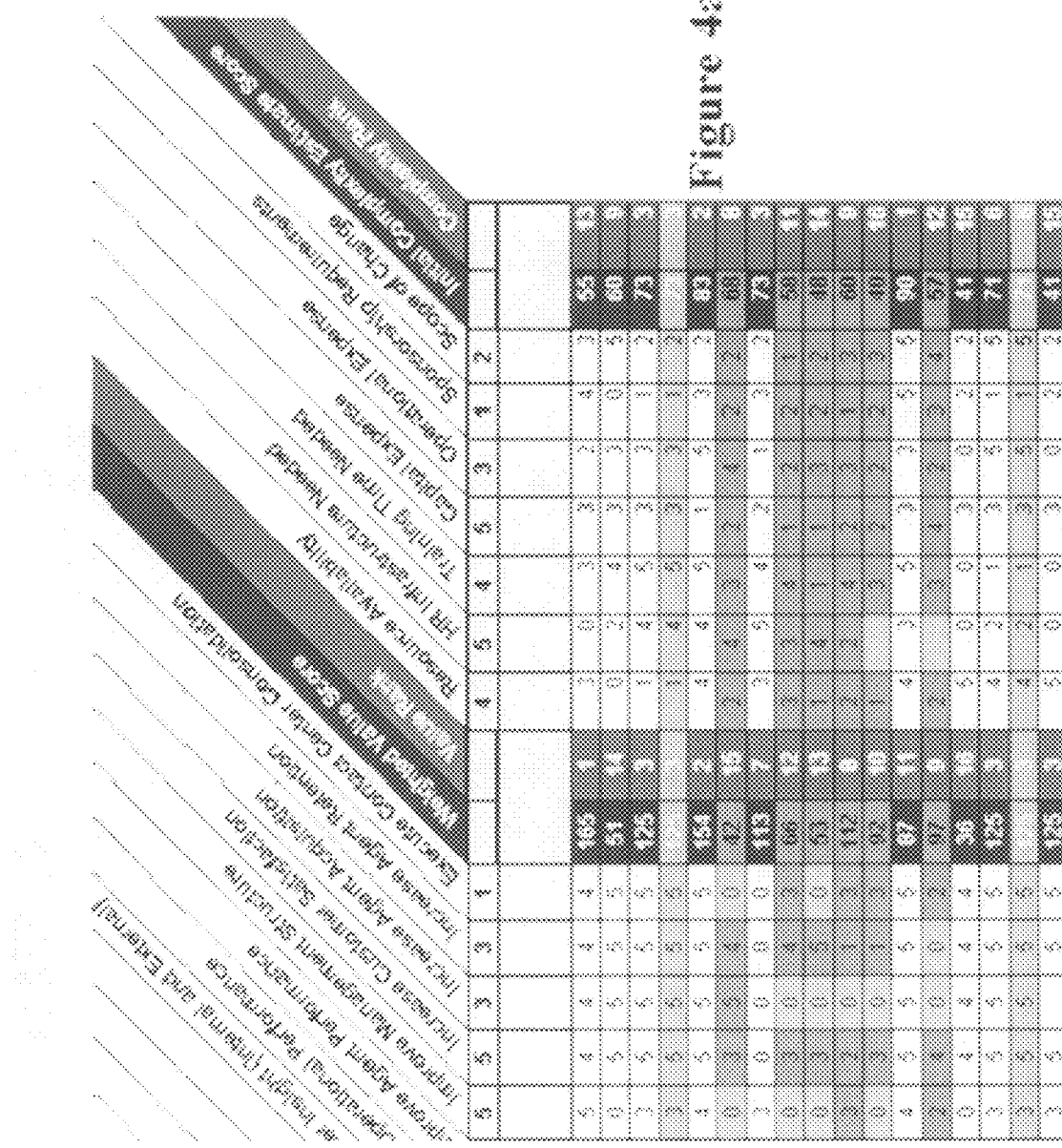
Figures 2, 4B:
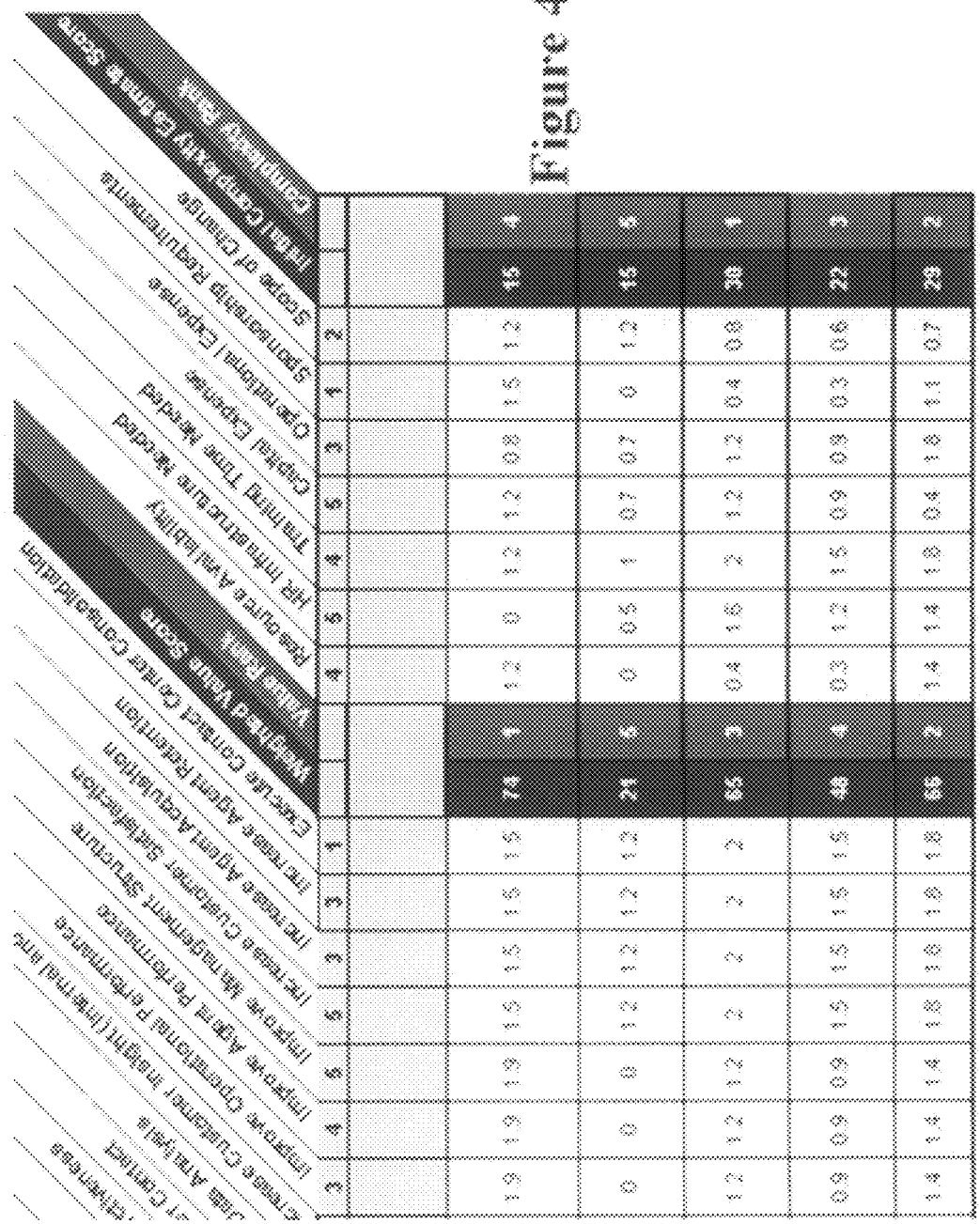
Figures 1, 4C:
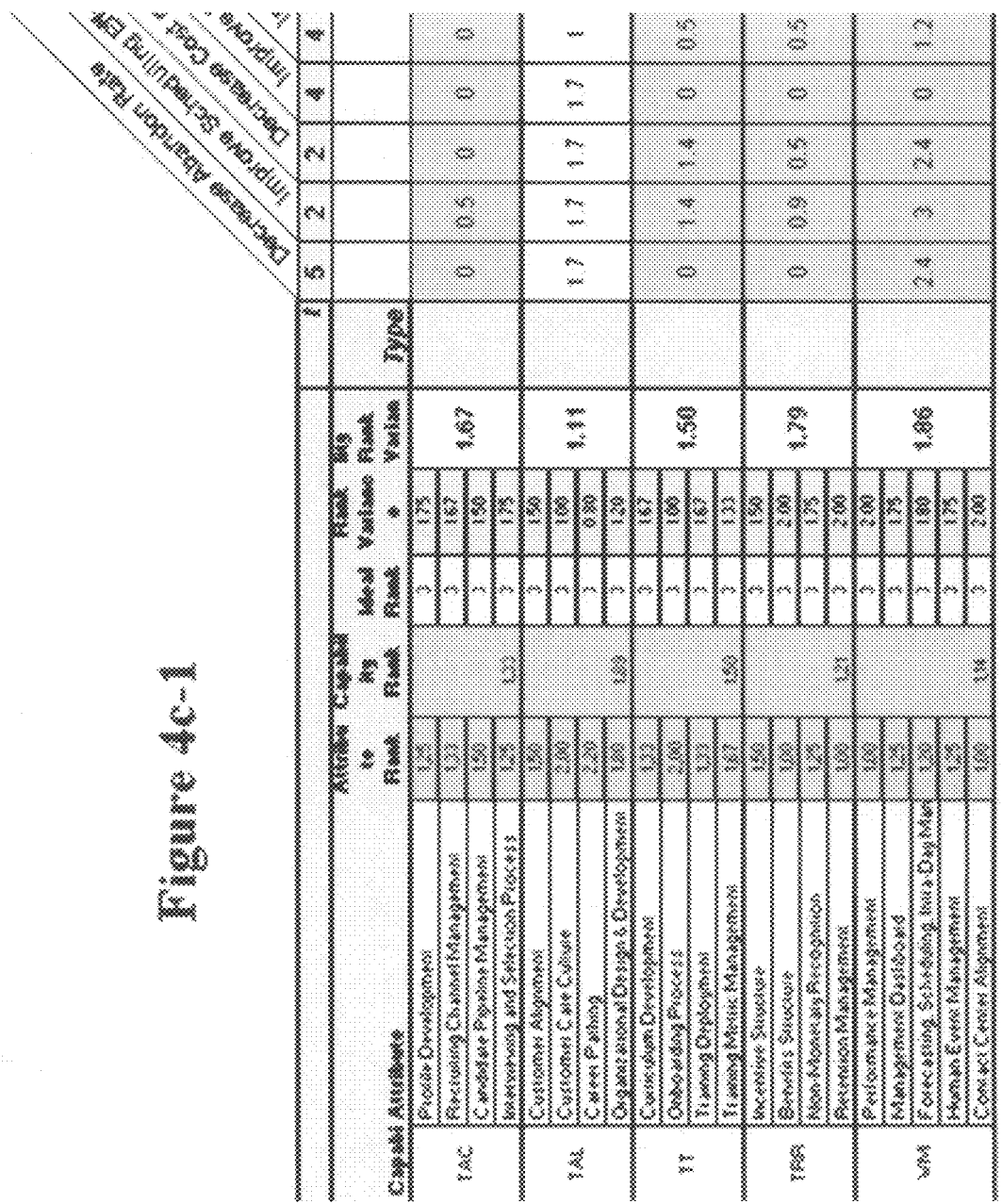
Figures 2, 4D:
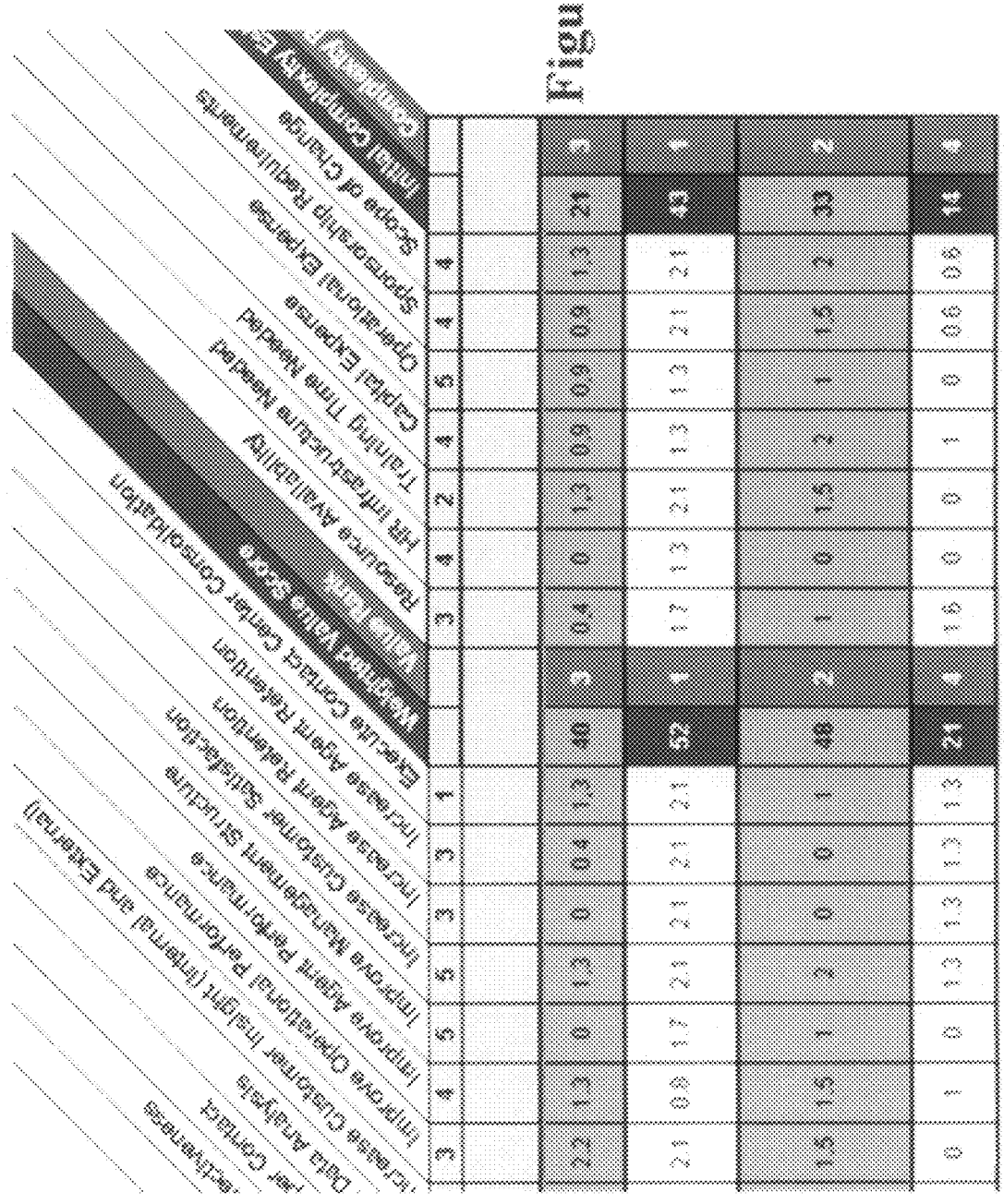
Figures 2, 4C:
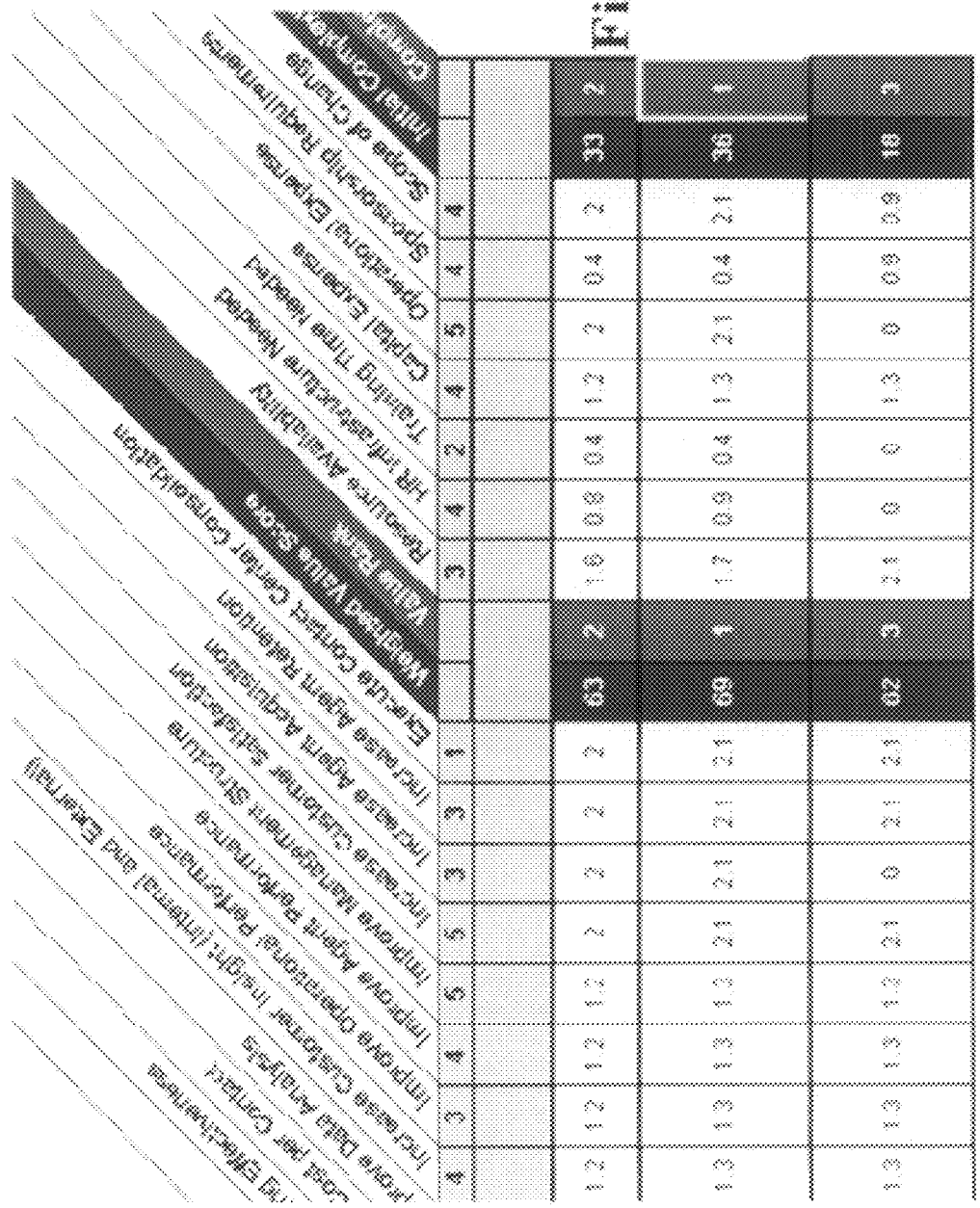

It should be understood that the discussion above, which describes survey distribution in the context of a browser based survey tool accessed through remote computers [203][204] [205] and driven by a server [201] is intended to be illustrative only, and not limiting on the potential computerized techniques for collecting raw data [104]. Variations on the described techniques are also possible. For example, instead of utilizing a browser-based survey tool driven by a server [201], raw data might be collected using survey applications which are locally stored on individual computers used by SMEs. The SMEs could take the surveys using the locally stored survey applications, and those applications would transfer the data to a central data warehouse for subsequent analysis. As yet another alternative, the SMEs could take the surveys using survey applications stored on local computers, and store the data collected in those surveys locally, with the data being collected when (and if) it is required in later analysis. Similarly, the response interface of FIG. 3*b*, and the capability selection screens of FIGS. 3*a* and 3*a*-1 are also intended to be illustrative only, and not limiting. Other capability selection screens, such as those shown in FIGS. 3*c* and 3*c*-1, or other response interfaces, such as that shown in FIG. 3*d* could also be implemented by one of ordinary skill in the art in light of this disclosure. Particular implementations of capability selection screens and response interfaces can be determined based on the specifics of a situation. For example, in some situations, the response interfaces could be designed with a high contrast between text and background, which could be intended to increase readability. Similarly, in some situations (e.g., where individuals might decide whether to purchase products or services based on the prioritization of capability enhancements), there might be specific background colors (e.g., blues and chromatic colors as shown in FIGS. 3*c*, 3*c*-1 and 3*d*) chosen to improve the aesthetic quality of the interfaces. As another example, in some situations, it might be preferable to have interfaces which include information, such as instructions or explanation, as shown in FIGS. 3*a* and 3*a*-1. Additional variations, and combinations of the above listed techniques are also possible. Of course, these alternatives are not intended to be limiting, and are instead intended to illustrate that a broad variety of techniques can be used for collecting raw data [104], even within the narrow subset of raw data collection techniques which utilize computerized surveys.

Figure 5:
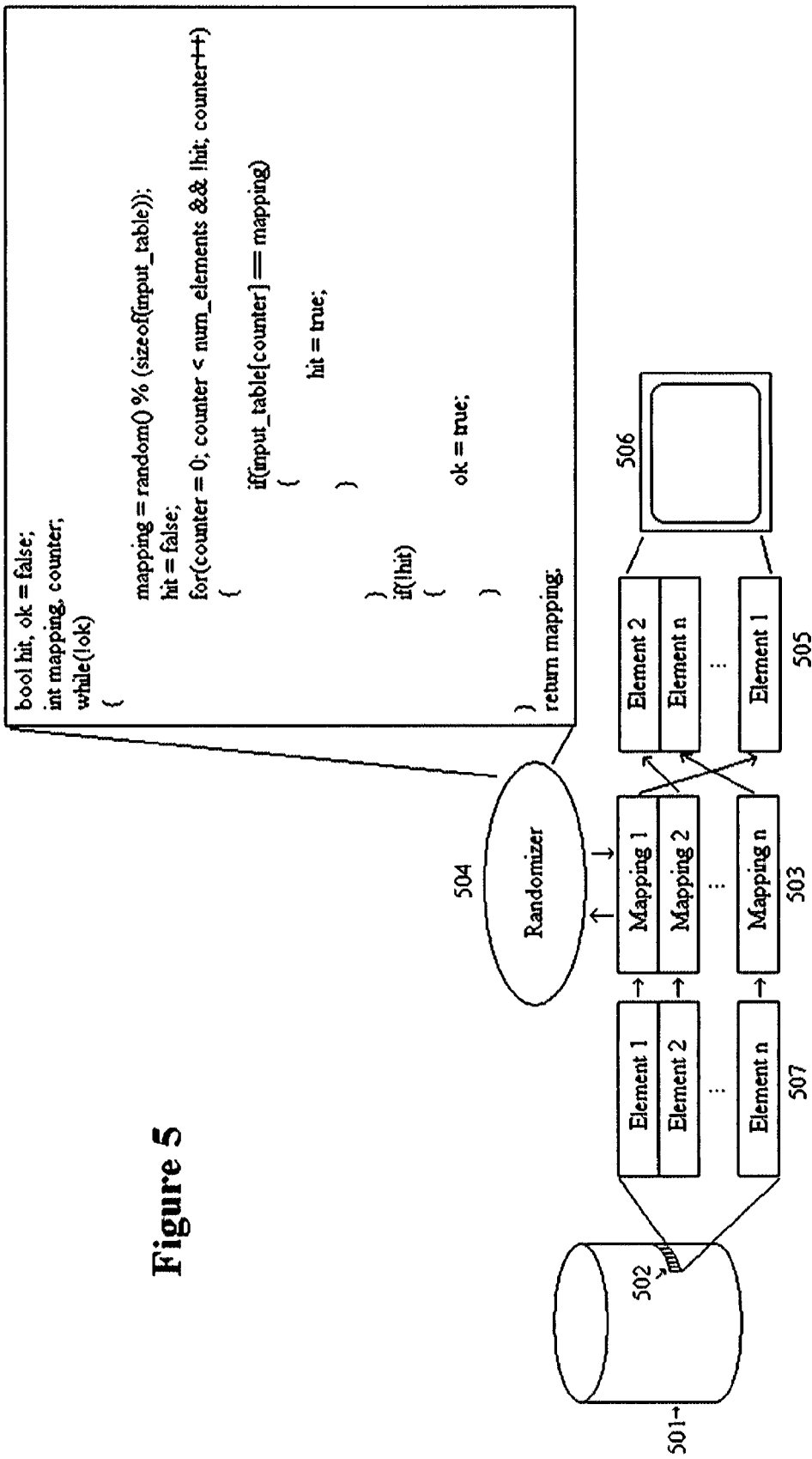
FIG. 5 depicts a process of randomizing questions presented to a subject matter expert.

Of course, it should be understood that the questions presented to an SME might not include the organization set forth above. For example, turning to FIG. 5, consider a scenario in which questions are stored as elements in a contiguous section [502] of a database [501] according to their content. To determine the order in which questions should be presented to an SME, the data from the contiguous memory [502] could be stored in an n element data array [507], with each element in the data array representing a single question. An n element mapping array [503] could then be used as a key for transforming the n element data array [507] into an n element presentation array [505]. The n element mapping array [503] might be populated by a randomizer function [504], an exemplary code snippet for which is set forth in FIG. 5. Once the n element data array [507] has been transformed into the n element presentation array [505] questions can be presented on a screen [506] in the order indicated by the n element presentation array [505]. In such an organization, each user of the survey might be presented with the questions in a different order, thereby minimizing the potential that the survey results will be skewed by the order in which the data is collected. Once the users have completed their surveys, the n element mapping array [503] for a user could be used to coordinate the user's answers with the underlying questions.

Of course, it should be understood that discussion of the database, randomization, mapping and data collection described above is intended to be illustrative only, and not limiting on the scope of claims included in this application, or which are filed subsequently claiming the benefit of this application. As examples of variations which could be made from the description above, the database might be a relational database with data stored in tables (e.g., tables of the type shown in tables 8-11) rather than organized in terms of continuous memory segments as described above. Similarly, different randomizer functions could be used, or the randomizer function could be replaced with some other type of mapping (e.g., a predefined hash table), or the questions could be presented in a manner which reflects their organization, as opposed to being randomized. Additionally, data collection might include not only collection of data regarding the organization's customer care capabilities, but might also include data collection regarding the individuals who are providing the data. For example, in the case of computer driven survey techniques, the individuals taking the surveys might be asked to answer questions such as their years of experience working for the organization and/or their years of experience working in the industry. Thus, the discussion above should be understood as illustrative only, and not limiting.

Returning to FIG. 1, the second sub-step in the secondary data collection [103] is to collect normalizing data [105], which should be understood to refer to the process of collecting data which is used in combination with the raw data, for example to provide context and/or verification. As was the case with the collection of raw data [104], the collection of normalizing data [105] can also utilize a variety of techniques. For example, in an implementation in which a consultant is involved in the collection of normalizing data [105], the consultant might collect that data through interviews, for example with subject matter experts, with focus groups, or both. Those interviews could be used to gather anecdotal data which is relevant to the same subject matter which is the focus of the raw data collection [104]. Alternatively, or in addition to the collection of interview data, the consultant might visit an organization's customer care facilities, to learn by direct observation what capabilities the organization has in place. The data gathered through interviews and/or observations could then be compiled by the consultant by taking the same surveys which were used to collect the raw data [104]. The data obtained through the collection of normalizing data [105] could then be compared with the data obtained through the collection of raw data [104]. If the normalizing data and the raw data diverged, then the steps of collecting raw data [104] and collecting normalizing data [105] could be repeated (e.g., by distributing surveys to different SMEs, by the consultant taking more observations and conducting more interviews, etc) until the divergence is eliminated or sufficient data is gathered to explain the divergence, thereby ensuring that the data used for prioritizing capability enhancements is valid.

Of course, it should be understood that the discussion above of certain techniques which could be used in the collection of normalizing data [105] is intended to be illustrative only, and not limiting. For example, in some implementations, the normalizing data might be obtained, rather than by using a consultant, by issuing additional surveys of the type used in the collection of raw data [104] (e.g., surveys could be issued to lower level employees, to ensure that the perspectives of upper and middle management were in agreement). The data obtained through the separate surveys might then be compared for validation. The uses and relationship of the data collected in the sub-steps of the secondary data collection [103] could also vary from the description above. For example, in some scenarios, rather than validating the raw data using the normalizing data, the normalizing data might simply be stored for use in later data analysis. This type of procedure, which omits the validation described above, might be appropriate in situations in which an organization wishes to prioritize capability enhancements, but wishes to minimize the time spent in arriving at the prioritization. As an example of an additional variation, in some embodiments, instead of utilizing the raw data for prioritizing the capability enhancements, while the normalizing data is used for validation or contextualization of the raw data, both the raw data and the normalizing data could be used for prioritizing capability enhancements (e.g., if the raw data collection [104] and the normalizing data collection [105] both comprise the step of collecting data using surveys, the results of those surveys could be combined and the combined results used for prioritizing capability enhancements. Additional variations on the above discussion are also possible, and could be implemented by those of ordinary skill in the art without undue experimentation in light of this disclosure. Therefore, the discussion above regarding the secondary data collection [103], and the sub-steps thereof ([104][105]), should be understood as illustrative only, and not limiting.

Continuing with the discussion of FIG. 1, as shown in that figure, after the secondary data collection [103], the process continues with derivation of capability scores [106]. Like the secondary data collection [103], the derivation of capability scores [106] comprises two sub-steps, the derivation of worst case scores [107], and the derivation of realistic scores [108]. For the purpose of clarity, those sub-steps are discussed separately below.

Turning now to the sub-step of deriving worst case scores [107], that sub-step refers to the process of deriving scores for each capability which show how much impact would be achieved for each goal and complexity lever identified in the initial data collection [101] if that capability were to move from a minimum to a maximum level (e.g., from a 1 to a 5, if capabilities are measured on a 1 to 5 scale). Various techniques could be used to derive the worst case scores. For example, the derivation of worst case scores [107] might take place using a database which includes information defining how much impact an improvement in a particular capability is likely to have. Such a database might have a variety of organizations. For example, it could be a relational database in which capabilities are associated with goals and complexity levers through tables, though other styles of organization, such as object oriented databases, could also be utilized. Further, in implementations which utilize a database for deriving worst case scores [107], the various scores might be identified in terms of industries, as well as in terms of capabilities. For instance, in some implementations there might be separate worst case scores for industries such as groceries, wireless, retail sales, which could reflect specific characteristics of those industries which could affect the mappings (e.g., improvements in technology architecture for an organization in the grocery industry might be given a lower impact or complexity worst case score than improvements in technology architecture for an organization in the wireless industry to reflect the differing technology requirements of grocers and wireless carriers).

However, deriving worst case scores [107] is not limited to database-centric techniques. A non-database centric technique which could be used to derive worst case scores [107] is to compare the characteristics of a capability with the particular goals and complexity levers identified as being applicable for an organization. For example, if an organization has a goal of improving data analysis, the capability of business intelligence might be given a high worst case score for that goal, because improving the use of customer interaction data to determine the health and effectiveness of an enterprise through the eyes of the customer would likely have a substantial positive effect on the organization's data analysis. By contrast, the capability of talent rewards and retention would likely be given a low worst case score for the goal of improving data analysis, because aligning salary, benefits, rewards and recognition to customer, market, and resource requirements would likely have only a small or nonexistent effect on the goal of improving data analysis. Of course, combined techniques are also possible. For example, use of information stored in a database might be combined with comparison of the characteristics of capabilities with goals and complexity levers. Alternatively, or in addition to the above, scores in a database could be modified for particular organizations based on the information gathered in the secondary data collection [103]. Further, one technique might be used to transition to another. For example, the comparison of capability features to goals and complexity levers could be used to build a database which would then be used for obtaining worst case scores. Thus, it should be understood that the techniques set forth herein are intended to be illustrative only, and not limiting on the scope of the claims included in this application, or in other applications which claim the benefit of this application.

The second sub-step in the derivation of capability scores [106] is the derivation of realistic scores [108]. This sub-step [108] refers to the process of obtaining scores which reflect the impact on each goal and complexity lever of moving a capability from an organization's current practices to a best practices level. As an example of how such a score might be derived, consider the scenario in which raw data collection [104] takes place by gathering computerized survey data asking SMEs to respond with a ranking of between 1 and 5 to a variety of questions regarding customer care capabilities. Initially, that data can be used to derive a capability score, that is, a score which represents the organization's current practices in the particular capability. Such a capability score could be derived from a process such as averaging of the responses given by the SMEs. Alternatively, in an implementation in which questions are associated with individual attributes, the scores could first be assembled into sub-scores for attributes, then the attribute sub-scores could be averaged. As yet another alternative, the normalizing data could be used to weigh the scores for certain attributes (e.g., those attributes where the normalizing data agrees with the raw data). Of course, these alternative calculation methods are provided to demonstrate that the capability score could be derived using a broad variety of techniques, and is not limited to derivation through any particular calculation.

Once the capability score has been derived, the next step is to derive a score representing the distance between the organization's current practices, and the organization's goal (e.g., best practices level). This score, referred to for the sake of convenience as a capability rank variance, can also be calculated in a number of manners. For example, the capability rank variance could be calculated by taking the capability score for a particular capability, and subtracting that score from a score representing the organization's goal (e.g., best practices). For example, using this method of calculation, if an organization has a capability score of 2.19 in a particular capability, and the best practices level for that organization is defined as a 3, then the organization's capability rank variance for that capability would be equal to 3−2.19=0.81. As a second example of how a capability rank variance could be calculated, it is possible that, for some capabilities, the real "distance" (e.g., in terms of difficulty in implementation, or expected benefits achieved from making a step increase) between steps might not be constant. For example, in a scenario in which capabilities are ranked on a one to three scale, with scores of one representing baseline practices, scores of two representing industry parity practices, and scores of three representing industry best practices, the expected benefit of moving from a one to a two might be different from the expected benefit of moving from a two to a three. Thus, it is possible that the capability rank variance might be calculated using an expected benefits curve, wherein the capability rank variance could be calculated by taking a definite integral of the expected benefits curve between the organization's current practices and the organization's goal practices. As a third example of how a capability rank variance could be calculated, it is possible that, as part of calculating the capability rank variance, the scale used for measuring the capability score could be modified. For example, an organization might have calculated a score for a particular capability by collecting data on a one to five scale. However, calculating the capability rank variance, the scale used to measure the rank might be transformed from a one to five scale, to an alternative scale, for example, a one to three scale, to reflect the fact that the organization being evaluated might be in an industry where a practice level of five would be unnecessary and/or unhelpful (e.g., a particular practice might require supporting infrastructure which would be an unnecessary cost or distraction for the business). Thus, by refining the scale used for the capability score, the capability rank variance might be reduced from a relatively high number (e.g., 5−2.8=2.2) to a relatively low number (e.g., 3−2.8=0.2). Of course, as stated previously, the discussion of these alternate techniques is intended to show that the calculation of the capability rank variance is not restricted to one particular technique or set of equations, and that a variety of equations might be used, as would be appropriate for a particular scenario.

After a capability rank variance for a capability has been determined, to determine a realistic score for the capability, a determination is made as to the effect which dropping the capability rank variance to zero would have on a goal for the organization. As set forth previously, the potential improvement which could take place for each goal from moving a capability from a minimum to a maximum level was identified as the worst case score for that capability. Using the worst case score, it is possible to determine the impact which will take place if an organization moves from its current practices in a capability to its goal in that capability, by finding a conversion formula between the scale used to measure the organization's practices and the scale used to measure the worst case score. One method of making this conversion is to find the value of each step for an improvement in the capability by taking the maximum value possible in the scale used to measure the capability score, then dividing that value by the number of steps in that scale. For example, if the capability score is measured on a one to three scale, then the maximum value for that scale would be three, while the minimum value for that scale would be one. Thus, the value for each step on the scale would be $(3/(3−1))=3/2=1.5$ units. Once the value for each step in the scale used to measure the capability score had been determined, that scale can be converted into the scale used to measure the worst case scores. A similar technique can be used for that conversion. For instance, the value for each step on the scale used to measure the capability score can be multiplied by the ratio of the worst case score as determined for a particular capability or goal to the maximum possible score on the worst case scale. Thus, to continue the previous example, assume that a particular capability has been assigned a worst case score for a particular goal of two on a zero to five scale. In such a scenario, it would be possible to convert between the scale used to measure the capability score to the scale used to measure the worst case scores by multiplying the value of each step on the capability score scale (1.5) with the ratio of the actual and maximum worst case scores (2/5=0.4). The resulting value (0.6) could then be multiplied by the capability rank variance (0.81) to determine a realistic score for that capability and goal (i.e., 0.81*0.6=0.486). The same process would then be performed for each goal and complexity lever for each capability, yielding a realistic score for each capability relative to each goal and complexity lever.

Of course, it should be understood that the explanation and equations used above are intended to be illustrative only, and not limiting on the scope of claims included in this application, or included in other applications which claim the benefit of this application. There are a wide variety of techniques contemplated which could be used in addition to, or as substitutes for, the techniques described above. For example, while the above discussion focused on determining realistic scores by converting between scales used to measure an organization's practices and scales use to measure worst case scores using a constant ratio of step values, it is also possible that more complicated, or different, formulae for obtaining realistic scores could be used. Such techniques might be used based on a judgment that the impact and difficulty associated with modifying an organization's practices might vary depending on the organization's current level. For instance, the value of distances between steps in the scale used to measure an organization's practices might be determined using an expected benefits or an expected complexity function, which could be defined in a manner which expresses the different values between steps (e.g., an upward sloping expected complexity function could represent a judgment that it would be harder to move from industry standard practices to best practices than it would be to move from lagging practices to industry standard practices). Similarly, while the conversion between the scale used to measure an organization's practices and the scale used to measure worst case scores could be performed in the same manner for each capability and worst case score, in some implementations, the conversion could be made by using individual formulae for each capability or each goal or complexity lever (or both) (e.g., a capability could have an upward sloping expected complexity function for one complexity lever, and a downward sloping expected benefits function for one goal, etc.). Combinations of these techniques could also be used. Thus, it is expected that those of ordinary skill in the art will easily be able to implement the techniques discussed above, as well as others which might be appropriate for particular situations without undue experimentation in light of this disclosure.

Returning to the diagram of FIG. 1, regardless of the particular technique(s) used, after the derivation of capability scores [106], the process depicted in that figure continues with the prioritization of capability enhancements [109]. This prioritization could be performed by utilizing the realistic scores for each capability relative to the goals and complexity levers identified for the organization to identify which capability enhancements would result in the greatest benefit at the lowest relative expenditure of effort and/or resources. For the purpose of clarity, the discussion of prioritizing capability enhancements [109] assumes that the prioritization will be made on a two dimensional basis, with enhancements to each capability being provided with an overall impact score, and an overall complexity score. The overall impact score would represent the overall impact of bringing a particular capability from its current level to a best practices level, given the goals which are identified as meaningful for a particular organization. The overall complexity score would represent the overall difficulty which bringing a capability from its current level to an organization's goal level would likely have. One method which could be used for calculating those scores is to, for each capability, take each realistic score for each goal and complexity lever for that capability and multiply that score by the weight assigned to the appropriate goal or complexity lever. The resulting products for each goal and complexity lever would then be summed to obtain the overall complexity or impact score for the capability.

To put the above discussion in concrete terms, and connect it with the previous discussion of deriving capability scores [106], the following equation could be used to determine an overall impact score for a particular capability:

$$O = \sum_{i=1}^{n} (W_i * I_i * (C_{var} * (S_{max} / (S_{max} - S_{min}))/I_{range}))$$

Equation 1
where O stands for the overall impact score, n stands for the number of identified goals for the organization, $W_i$ stands for the weight assigned to the $i^{th}$ goal, $I_i$ stands for the worst case score assigned to the capability for the $i^{th}$ goal identified for the organization, $C_{var}$ stands for the capability rank variance for the particular capability, $S_{max}$ stands for the scale maximum value used to measure the capability score, $S_{min}$ stands for the scale minimum value used to measure the capability score, and $I_{range}$ stands for the maximum value of the range used when determining the worst case score for that capability. Similarly, the same formula could be used to obtain the overall complexity score, though the variables in the formula would have different meanings. For example, in modifying the above equation for derivation of an overall complexity score, O would refer to the overall complexity score, n would stand for the number of complexity levers identified as applicable to the organization, $W_i$ would stand for the weight assigned to the $i^{th}$ complexity lever, $I_i$ would stand for the complexity impact assigned to the capability for the $i^{th}$ complexity lever, $C_{var}$ would refer to the capability rank variance for the capability as relevant for measuring the impact on a complexity lever, $S_{max}$ would stand for the scale maximum value used to measure the capability score for that complexity lever, $S_{min}$ would stand for the scale minimum value used to measure the capability score for that complexity lever, and $I_{range}$ would stand for the maximum value of the range used when determining the worst case score for that capability.

Of course, it should be understood that, while discussion of the equations for determining overall complexity scores and overall impact scores proceeded with the assumption that variables represented with the same symbols could have different values between equations, it is also possible that one or more of the variables might have the same values. For example, $C_{var}$ as used in the equation for the overall impact score could be the same number as used for $C_{var}$ in the equation for the overall complexity score. Similarly, it is possible that other variables could have the same values as well. For example, it might be the case that the same number of goals and complexity levers were identified for an organization (leading to the value for n in the two equations to be the same), that the scales used to measure the capability score in terms of complexity levers and goals is the same (leading to $S_{max}$ and $S_{min}$ being the same between the two equations) and that the same range of values was used for the worst case scores for both goals and complexity levers (leading $I_{range}$ to be the same across the above equations). Thus, it should be understood that the calculation of overall scores for goals and complexity levers is not limited to techniques using divergent equations, and that techniques using the same equations could be substituted as well.

Figure 6:
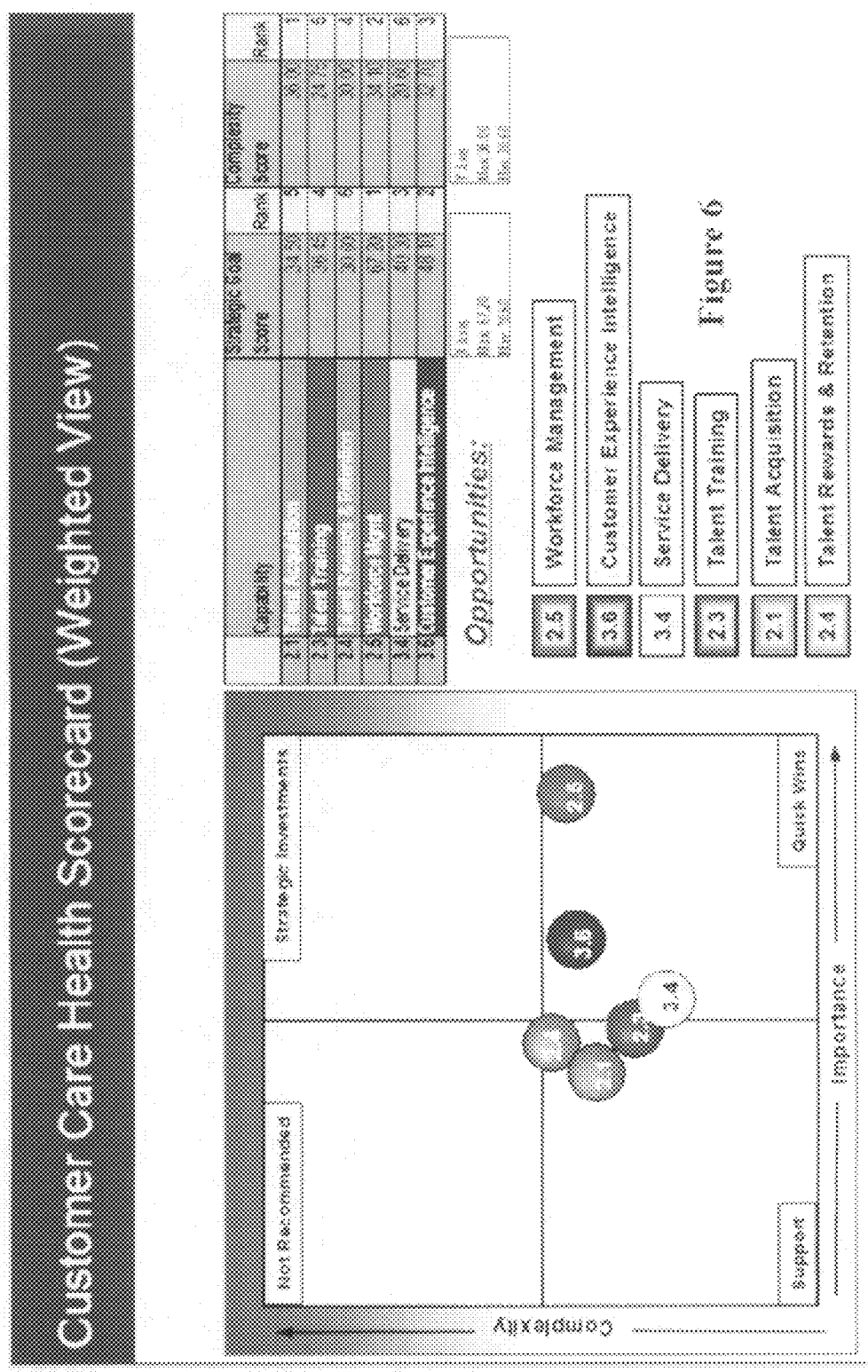
FIG. 6 depicts a graph showing relative impacts and complexities for various capability enhancements.

Continuing with the discussion above, after overall impact and complexity scores have been determined, the prioritization of capability enhancements [109] could continue with the placement of the capability enhancements on a two dimensional scale, with their coordinates controlled by the overall scores discussed above. For example, FIG. 6 depicts a graph in which enhancements to the capabilities of talent acquisition, talent training, retention, workforce management, service delivery, and intelligence have been placed in context with one another in a manner which depicts the relative difficulties and expected impacts of enhancements to those capabilities. Thus, in the graph depicted in FIG. 6, the greater the overall impact score for a particular capability, the farther to the right that capability will be depicted. Similarly, the greater the overall complexity score for a capability, the farther up on the graph that capability will be depicted. Of course, it is also possible that, instead prioritizing capability enhancements [109] using a two dimensional scale, the step of prioritizing capability enhancements could be prioritized on a one dimensional scale as well. For example, using the data collected for the particular capabilities, a one dimensional scale based on expected return on investment for investments in that capability could be created. As yet another alternative, a scale having more than two dimensions could be presented. For example, there might be a four dimensional scale in which capability enhancements are measured in terms of expected monetary cost, expected time to implementation, expected increases in customer satisfaction, and expected reductions in operating costs. Other scales could also be used.

It should also be understood that various types of tools could additionally be used in the prioritization of capability enhancements [109]. For example, the prioritization could be accomplished through the use of data structures such as the pivot table linked spreadsheets such as are depicted in FIGS. 4a-1 to 4e-2 (when reviewing those figures, it should be noted that the individual spreadsheets have been split into complimentary portions. Thus, FIGS. 4a-1 and 4a-2 actually represent one spreadsheet, which can be obtained by combining those figures. The other figures (i.e., 4b-1 and 4b-2, 4c-1 and 4c-2, 4d-1 and 4d-2 and 4e-1 and 4e-2) can be combined similarly). In some implementations which use such spreadsheets or other similar data structures, the data structures might be linked to the tools used in the secondary data collection [103] in such a manner that some or all of the data could be populated automatically. For example, if the secondary data collection [103] used a computerized survey tool for the collection of raw data [104], the data gathered by the computerized survey tool could be automatically uploaded into the spreadsheets. Additionally, the spreadsheets themselves might be populated with formulae (e.g., equation 1) for prioritizing the capability enhancements. Of course, it should be understood that the depiction of the spreadsheets in FIGS. 4*a*-1 to 4*e*-2 is not intended to be limiting, and that other tools could similarly be used by those of ordinary skill in the art without undue experimentation in light of this disclosure.

Figure 7:
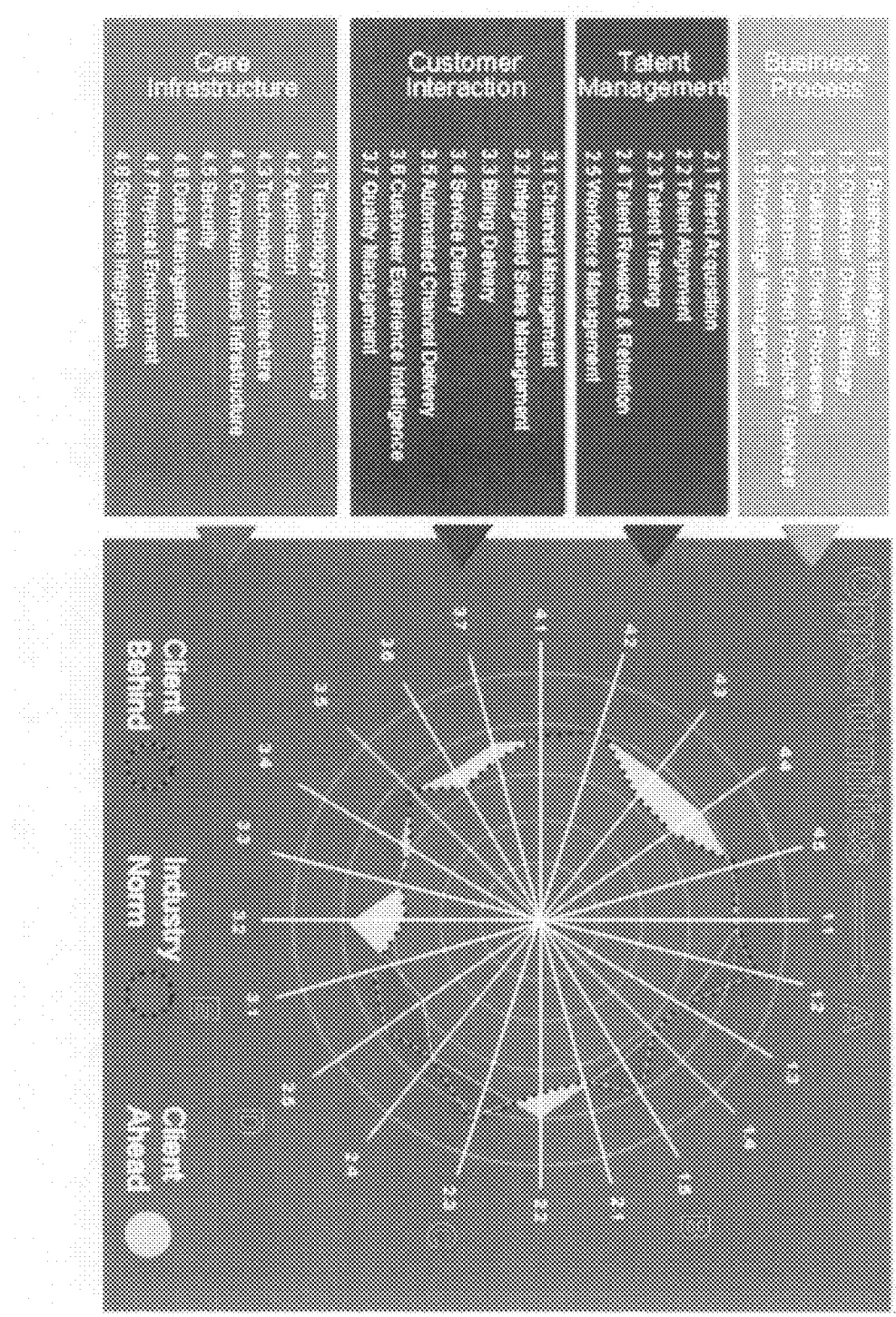
FIG. 7 depicts a graphic presenting an organization's standing relative to industry practices.

Finally, in the process of FIG. 1, after the capability enhancements have been prioritized [109], the results of the process are presented [110]. This presentation process can take a number of forms. For example, in a scenario in which the process of FIG. 1 is performed by a consultant, the presentation of results [110] might consist of the consultant providing a report on the organization, accompanied by a slide show or other type of presentation explaining the results. The report on the organization could consist of simply the prioritization for enhancements to each capability as set forth above, or it could include other information, such as a diagram depicting the organization's capabilities relative to their industry's standard, as shown in FIG. 7. If the report is accompanied by a presentation, the presentation could explain what the industry standards mean, and might also explain the data which was collected. For example, in a scenario in which the secondary data collection [103] included both the steps of collecting raw data [104] and collecting normalizing data [105], the presentation could explain any discrepancies between the raw data and the normalizing data (e.g., if the SMEs rated the company at a high level, while a consultant rated the company at a low level, this discrepancy might be pointed out during the presentation, and the consultant might explain why he or she believes that the rating provided by the SMEs was incorrect). Of course, it is also possible that the presentation of results [110] might not include a presentation by a consultant. For example, the results might be presented by simply providing a report to the organization which was evaluated, which report might or might not be accompanied by an executive summary of the findings contained therein.

Figure 8:
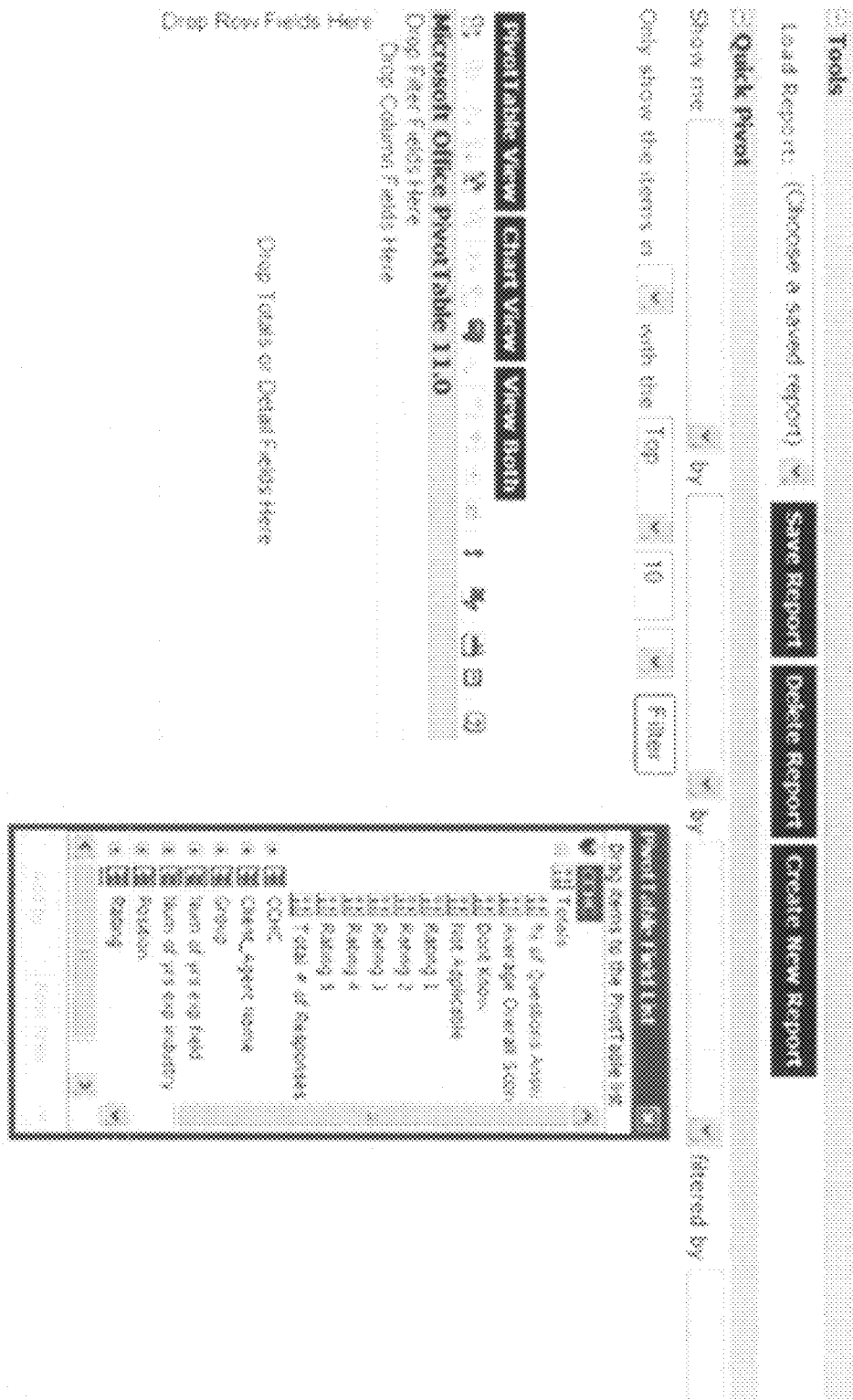
FIG. 8 depicts an interface which could be used for the analysis of data.

As set forth above, FIG. 1 presents an illustrative process which can be used in the prioritization and presentation of capability enhancements. It should be understood that FIG. 1 is not intended to imply that all claims in this application, or other applications claiming the benefit of this applications are directed to processes for the prioritization and presentation of capability enhancements. Similarly, it should be understood that the discussion of FIG. 1 is intended to be illustrative only of a process for prioritizing and presenting capability enhancements, and that divergences from that process will be immediately apparent to those of ordinary skill in the art. One example of a divergence which was explicitly presented was the combination of the initial data collection [101] and the weighing of goals and complexity levers [102]. However, other divergences are also possible. For example, while not depicted in FIG. 1, a process for prioritizing and presenting capability enhancements could also include a step of analyzing collected data. Such a step might include, for instance, assembling the data obtained through the secondary data collection [103] in a central data warehouse, where it could be stored in OLAP (on-line analytical processing) cubes. Analysts could use the OLAP cubes to drill down and find information and relationships which could be useful in the derivation of capability scores [106] (e.g., the worst case scores or the capability scores could be adjusted to reflect information discovered in the data analysis). Alternatively, information discovered during data analysis could be presented separately as part of the result presentation [110]. For example, FIG. 8 depicts an interface in which an analyst could examine data with regard to years of experience of the individuals providing the data. This might demonstrate that the individuals who have been in their positions a shorter time have a uniformly more negative view of an organization's capabilities than individuals who have spent a significant portion of their career with the organization.

Similarly, the process described above in relation to FIG. 1 could be modified by the inclusion of various types of feedback loops. For example, as set forth above, data such as specific goals and complexity levers, which is gathered in one engagement can, in some implementations, be used to facilitate future engagements (e.g., goals and complexity levers identified in a first engagement can be used as samples for a second engagement). However, it is also possible the data used might be altered, as opposed to simply being augmented. For example, in an implementation in which the exemplars used in the secondary data collection [103] are used to indicate baseline, parity, and best practices levels for a particular capability, the exemplars could be revised to take into account information gained in evaluating particular organizations (e.g., if an organization has a particularly useful practice for a capability, the best practices exemplar for that capability could be modified to reflect that fact). Such modification might be done each time a new organization is evaluated, or it might be done on a quarterly, or other periodic basis.

Of course, these examples are not intended to be an exhaustive list of the types of variations which could be made on the illustrative process of FIG. 1. Instead, these examples are intended only to demonstrate that the process of FIG. 1 is meant to be illustrative only, and not limiting. It is further intended that the claims of this application include all systems, methods, apparatuses and compositions of matter which fall within their literal terms, or which are insubstantially different therefrom.

Accordingly, we claim:

1. A method comprising:
   a) collecting a set of data from one or more executives of an organization, wherein said set of data comprises a plurality of goals and a plurality of complexity levers;
   b) determining:
      i) a goal weight for each goal from said plurality of goals; and
      ii) a complexity weight for each complexity lever from said plurality of complexity levers;
   c) obtaining a first set of information by requesting that each individual from a plurality of identified subject matter experts complete a survey comprising a plurality of questions corresponding to one or more customer care capabilities from a plurality of customer care capabilities;
   d) deriving a plurality of scores for each capability from said plurality of customer care capabilities, wherein:
      i) for each said capability, said plurality of scores comprises a plurality of realistic scores based at least in part on the first set of information; and
      ii) the step of deriving a plurality of scores for each said capability from the plurality of customer care capabilities comprises utilizing a database to determine a plurality of worst case scores for each said capability from said plurality of customer care capabilities; and
   wherein deriving said plurality of scores for each said capability further includes:
      iii) determining a capability rank variance score representing a distance between the organization's current customer care capabilities and the organization's goals; and
      iv) determining an impact which will take place if an organization moves from its current practices in a capability to its goal in that capability, wherein said determining impact is based on at least a number of goals in a plurality of goals relevant to the organization, the goal weight for the plurality of goals, a worst case score for the plurality of goals and a capability rank variance for a customer care capability, wherein said determined impact is at least based on the number of goals in a plurality of goals relevant to the organization, a goal weight for a goal in the plurality of goals, a worst case score for the goal in the plurality of goals and a capability rank variance for the customer care capability;

e) prioritizing an enhancement for each said customer care capability from said plurality of customer care capabilities, wherein said prioritization is based on a set of factors comprising:

i) the goal weight for each said goal from said plurality of goals;

ii) the complexity weight for each said complexity lever from said plurality of complexity levers; and iii) the plurality of realistic scores for the capability from the plurality of customer care capabilities corresponding to the enhancement;

f) presenting a set of results based at least in part on the prioritization of the enhancements; and g) updating said database based on the worst case scores for each said capability from the plurality of customer care capabilities.

2. The method of claim 1, wherein the set of data comprises:

a) a goal list, wherein the goal list comprises a relative goal rank for each said goal from said plurality of goals; and b) a complexity lever list, wherein the complexity lever list comprises a relative complexity rank for each said complexity lever from said plurality of complexity levers.

3. The method of claim 1 further comprising obtaining a second set of information by performing one or more additional steps, said one or more additional steps comprising requesting anecdotal data regarding the organization's customer care capabilities, wherein said presenting the set of results comprises:

a) presenting the prioritization of the enhancements to the customer care capabilities; and b) identifying one or more discrepancies between said first set of information and said second set of information.

4. The method of claim 3 wherein said presenting the set of results comprises presenting a display depicting the organization's practices in the plurality of customer care capabilities relative to industry standard practices.

5. The method of claim 1 further comprising defining the plurality of customer care capabilities by determining, from a list of potential customer care capabilities, two or more customer care capabilities which are relevant to the organization.

6. The method of claim 1 wherein said capability rank variance score is calculated using an expected benefits curve.

7. The method of claim 1 wherein said capability rank variance score is scaled according to an organization's preferred scale.

8. The method of claim 1 wherein said determining an impact comprises calculating, on a computer processor programmed with a set of computer-executable instructions, a score based on the following formula:

$$O = \sum_{i=1}^{n} (W_i * I_i * (C_{var} * (S_{max} / (S_{max} - S_{min})) / I_{range}))$$

wherein

O is the overall impact score;

n is the number of goals in a plurality of goals relevant to the organization;

$W_i$ is a goal weight for the $i^{th}$ goal in the plurality of goals;

$I_i$ is a worst case score for the $i^{th}$ goal in the plurality of goals;

$C_{var}$ stands for a capability rank variance for the customer care capability;

$S_{max}$ stands for the maximum value on a scale used to measure a capability score for the customer care capability;

$S_{min}$ stands for the minimum value on the scale used to measure the capability score for the customer care capability; and $I_{range}$ stands for the maximum value of a range used to express the worst case score $I_i$.

* * * * *